United States Patent
Burton et al.

(10) Patent No.: US 8,843,155 B2
(45) Date of Patent: Sep. 23, 2014

(54) MULTI-BAND RADIO FREQUENCY DETECTION AND LOCATION SYSTEM

(75) Inventors: Mitch Burton, Coquitlam (CA); Mark Wilson, Anmore (CA); Mark Bauer, Belmont, CA (US); Tim Thompson, Port Coquitlam (CA); Osvaldo Diaz, Miami Lakes, FL (US)

(73) Assignee: AirPatrol Corporation, Maple Lawn, MD (US)

( * ) Notice: Subject to any disclaimer, the term of this patent is extended or adjusted under 35 U.S.C. 154(b) by 426 days.

(21) Appl. No.: 13/009,834

(22) Filed: Jan. 19, 2011

(65) Prior Publication Data

US 2011/0183685 A1 Jul. 28, 2011

Related U.S. Application Data

(60) Provisional application No. 61/296,771, filed on Jan. 20, 2010.

(51) Int. Cl.
*H04W 24/00* (2009.01)

(52) U.S. Cl.
USPC ..... 455/456.1; 455/454; 455/266; 455/456.2; 455/456.3; 455/456.4; 370/352

(58) Field of Classification Search
CPC .............................. G06F 21/316; G06F 21/552
USPC ........................ 455/456.1, 454, 266; 370/352
See application file for complete search history.

(56) References Cited

U.S. PATENT DOCUMENTS

| | | | | |
|---|---|---|---|---|
| 2002/0164995 | A1* | 11/2002 | Brown et al. | 455/456 |
| 2005/0233748 | A1* | 10/2005 | Robinson et al. | 455/440 |
| 2006/0286930 | A1* | 12/2006 | Rathus et al. | 455/26.1 |
| 2011/0096770 | A1* | 4/2011 | Henry | 370/352 |
| 2012/0208558 | A1* | 8/2012 | Bajko et al. | 455/456.1 |

FOREIGN PATENT DOCUMENTS

WO WO-2011091087 A1 7/2011

OTHER PUBLICATIONS

"International Application Serial No. PCT/US2011/021776, International Search Report mailed Jul. 8, 2011", 3 pgs.
"International Application Serial No. PCT/US2011/021776, Written Opinion mailed Jul. 8, 2011", 5 pgs.
"International Application Serial No. PCT/US2011/021776, International Preliminary Report on Patentability filed Jul. 24, 2012", 6 pg.

* cited by examiner

*Primary Examiner* — Shahriar Behnamian
(74) *Attorney, Agent, or Firm* — Schwegman Lundberg & Woessner, P.A.

(57) ABSTRACT

A method is provided that comprises: providing a rules storage that provides one or more rules to determine authorized wireless device usage at a site; using a wireless communications sensor system to determine use of a wireless device at the at the site; and using the one or more rules to determine whether the determined use of wireless device use is authorized.

16 Claims, 52 Drawing Sheets

System Diagram

System Diagram

Linux overview

CPU Board Data

CPU Board runcap script

CPU Board apc_cap process

CPU Board apc_svr process

CPU Board 802.11 packet decoding process

RF Sensor Bootloader

RF Sensor Data Flow

RF Sensor main

RF Sensor Low Level Tasks

RF Sensor Low UART Polling task

RF Sensor Low UART command extraction

RF Sensor Low UART command parser

RF Sensor Narrowband receiver control task

RF Sensor Input capture interrupt

RF Sensor polling for wideband data

RF Sensor wideband data processing

RF Sensor Data response

RF Sensor Narrowband RF Reporting

Rapid Deployment System (RDS)

Data Processing Server Application

User Interface Screenshot

Sensor Management

Sensor Discovery

Cell Data Processing

Site Management

Floor Plan Calibration

Alert Zone Creation

Alert Zone Creation

Temporary "Mouse Hover" informational display

Contextual Device Configuration Menu

User "click and drag" of a device/sensor

Antenna with Directional Gain Pattern Located at Position X

Aproximated with with an omni-directional Gain Pattern antenna located at Position Y, offset in the direction of highest gain.

Alert Handling

Manual Report Generation

Automatic Report Generation

Productivity Monitoring System Architecture

User Defined Time Threshold Subsystem

User Defined Location Subsystem

Business Device Asset Unique Identifier Subsystem

Business User Unique Identifier

| Report Output Types |
| --- |
| Bar Chart |
| Line Chart |
| Scatter Plot Chart |
| Tabular Text |
| XML |
| CSV (Comma Separated Values) |
| Tab Separated Values |

Report Output Types

Fig. 48

MULTI-BAND RADIO FREQUENCY DETECTION AND LOCATION SYSTEM

RELATED APPLICATIONS

This patent application claims the benefit of priority, under 35 U.S.C. §119(e), to U.S. Provisional Patent Application Ser. No. 61/296,771, filed Jan. 20, 2010.

FIELD OF THE INVENTION

The present invention relates to a detecting and locating multi-band radio frequency transmitters.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 48 is a chart showing report output types in accordance with one or more embodiments.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Example embodiments are described herein according to the following outline:

1.0 FUNCTIONAL OVERVIEW
2.0 SYSTEM ARCHITECTURE
3.0 DATA PROCESSING SERVER APPLICATION
4.0 PRODUCTIVITY MONITORING APPLICATION
5.0 IMPLEMENTATION MECHANISMS—HARDWARE OVERVIEW
6.0 EQUIVALENTS, EXTENSIONS, ALTERNATIVES AND MISCELLANEOUS

Several features are described hereafter that can each be used independently of one another or with any combination of the other features. However, any individual feature might not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

1.0 Functional Overview

Figure 1:
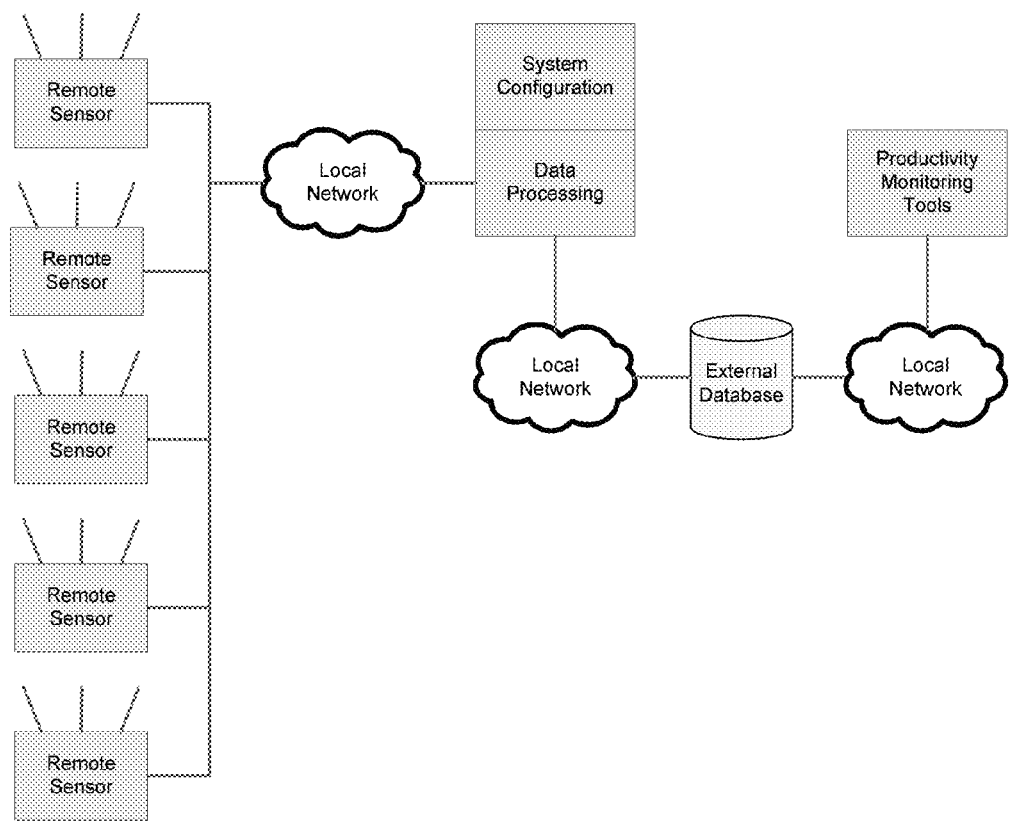
FIG. 1 is a block diagram showing a high-level block diagram of a multi-band RF detection and location system in accordance with one or more embodiments.
Figure 2:
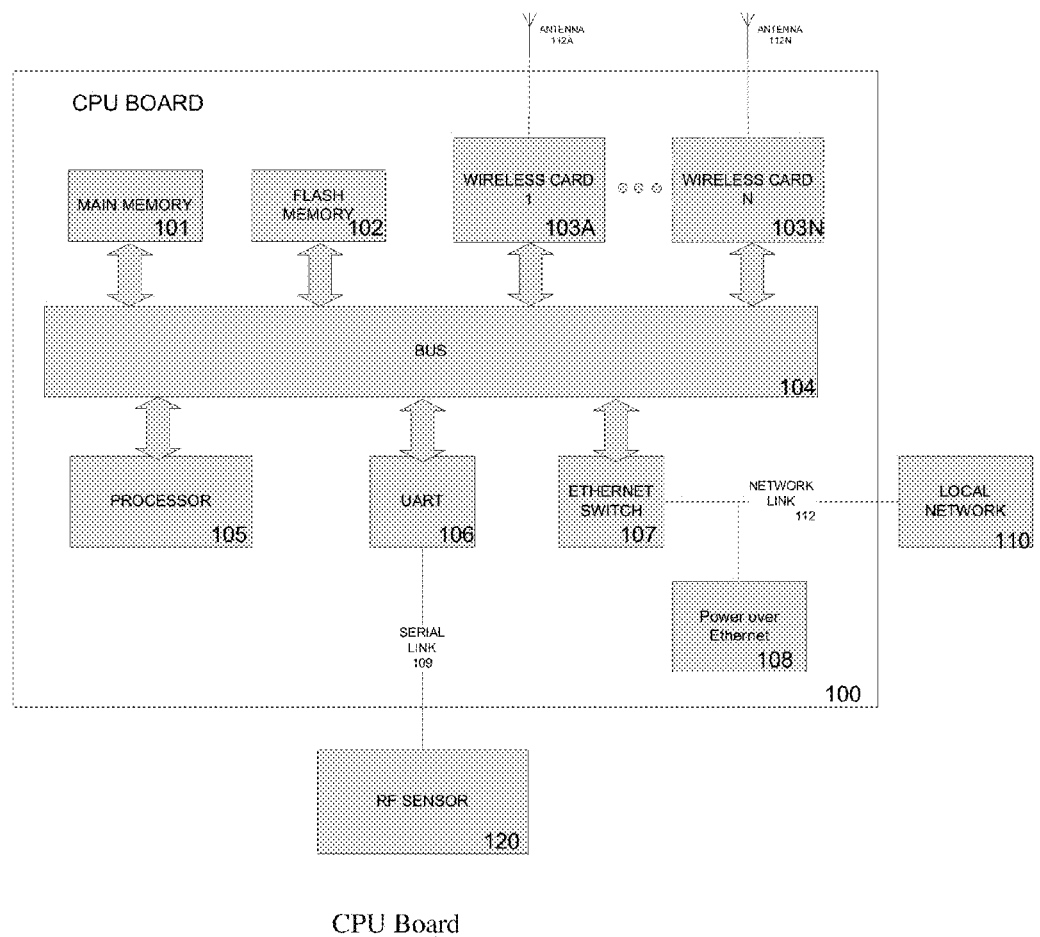
FIG. 2 is a block diagram showing hardware components of a CPU board used in the sensor in accordance with one or more embodiments.
Figure 3:
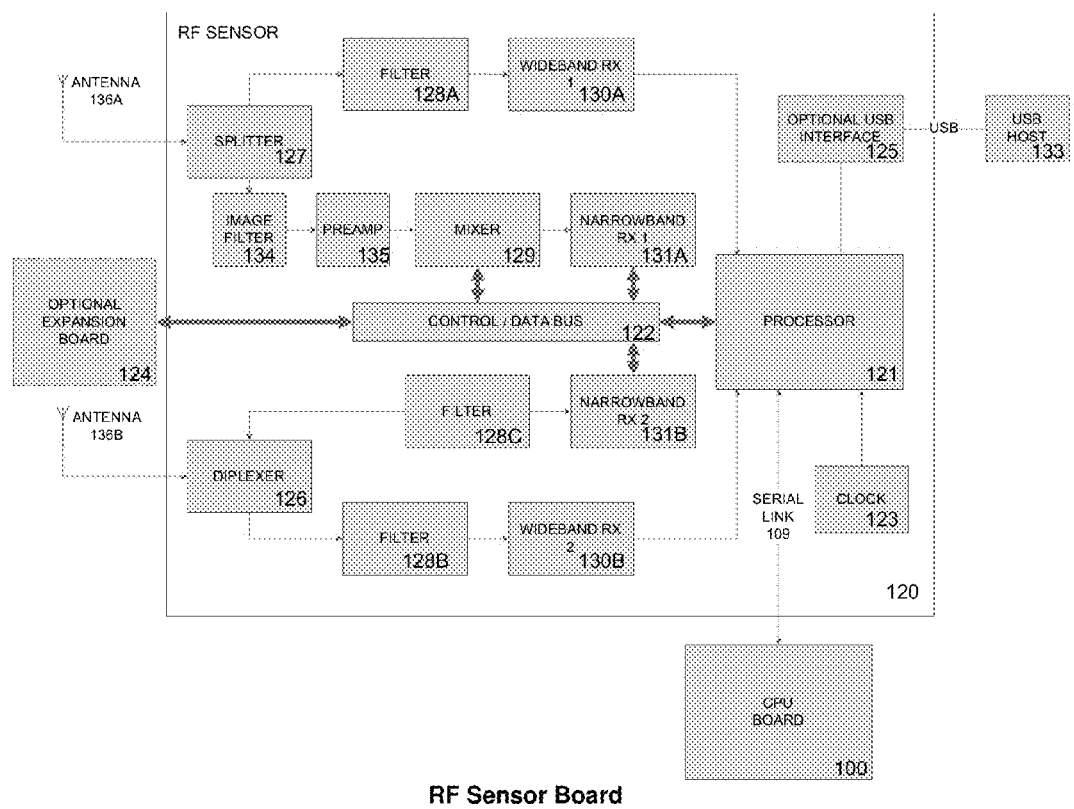
FIG. 3 is a block diagram of an RF sensor board used in the sensor in accordance with one or more embodiments.
Figure 4:
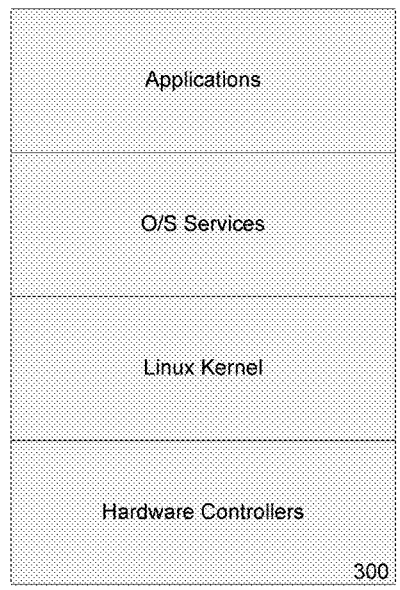
FIG. 4 is a block diagram showing the layers of software within a Linux system in accordance with one or more embodiments.
Figure 5:
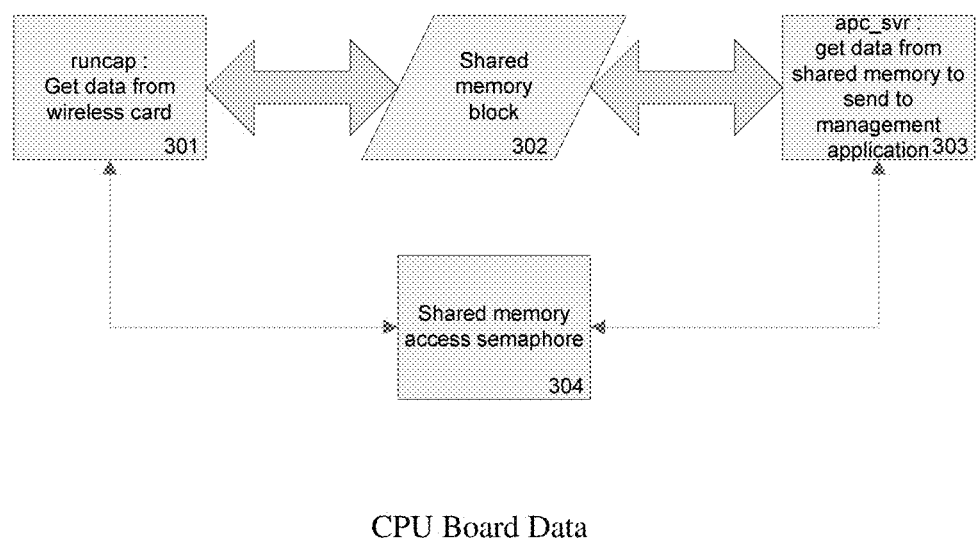
FIG. 5 is a block diagram showing a general flow of data within the 802.11 sensor in accordance with one or more embodiments.
Figure 6:
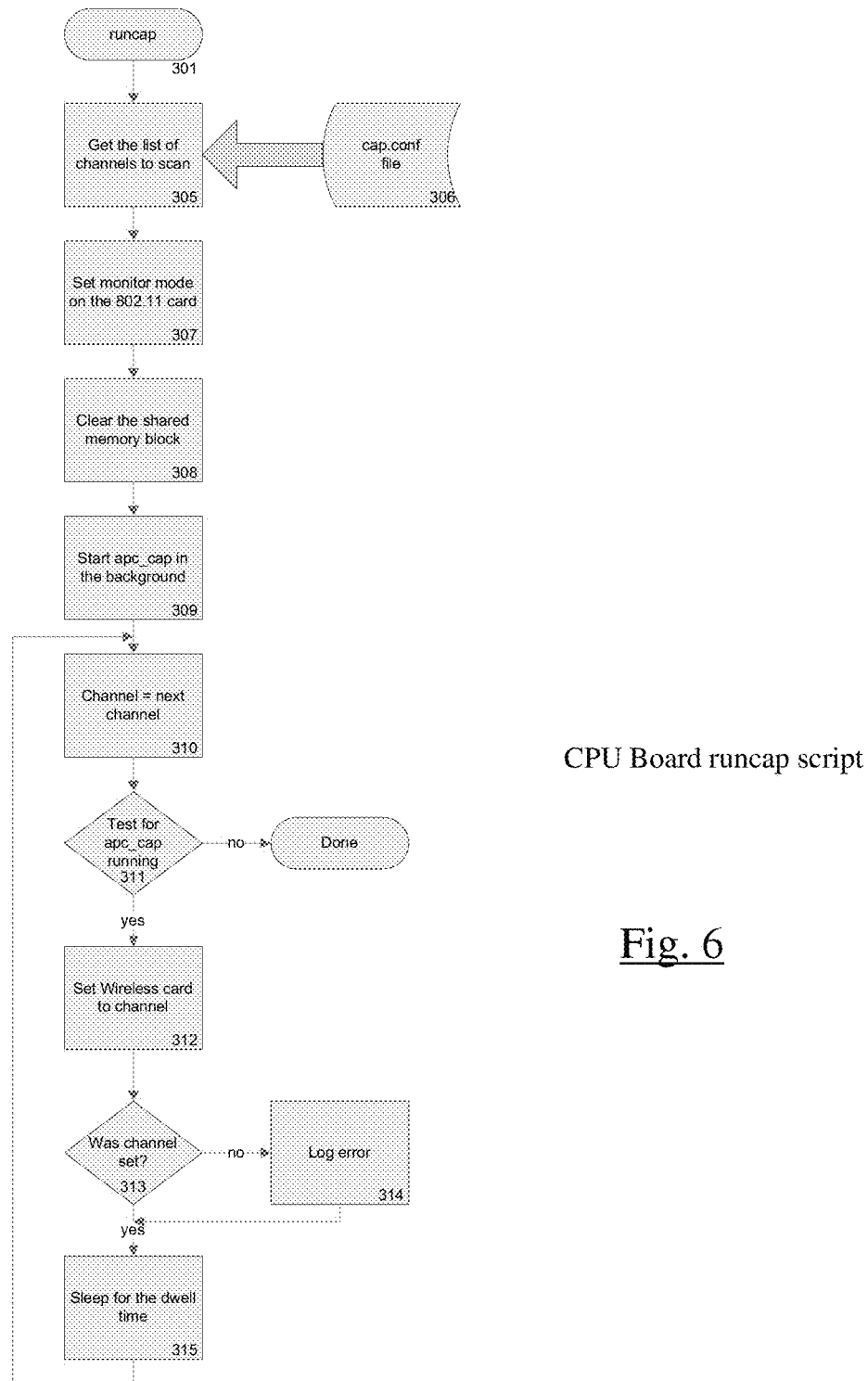
FIG. 6 is a flow chart showing the operation of a runcap script which initializes and controls the channel to scan on the 802.11 sensor in accordance with one or more embodiments.
Figure 7:
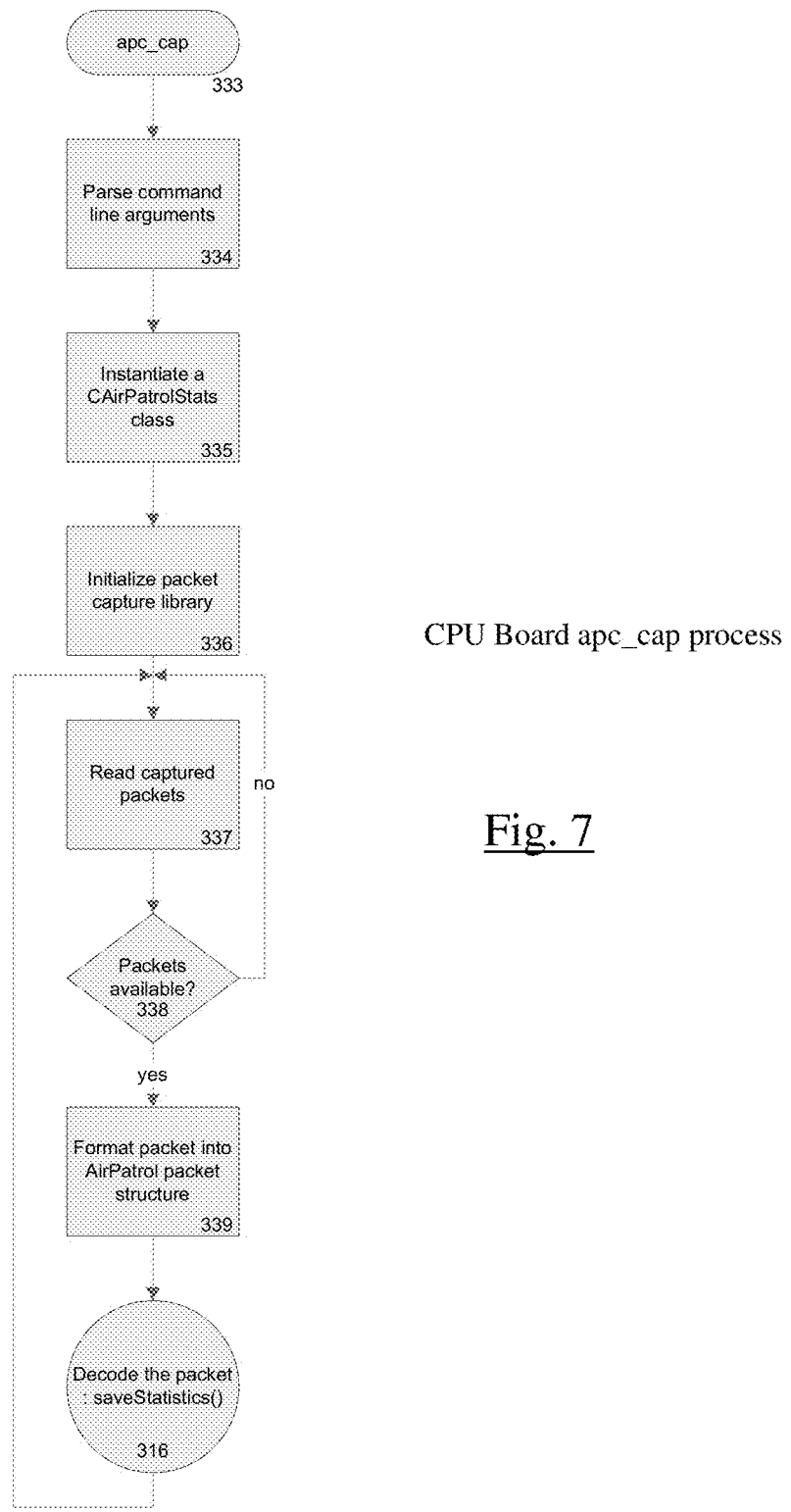
FIG. 7 is a flow chart showing an operation of the apc_cap process which captures 802.11 packets executes on the 802.11 sensor in accordance with one or more embodiments.
Figure 8:
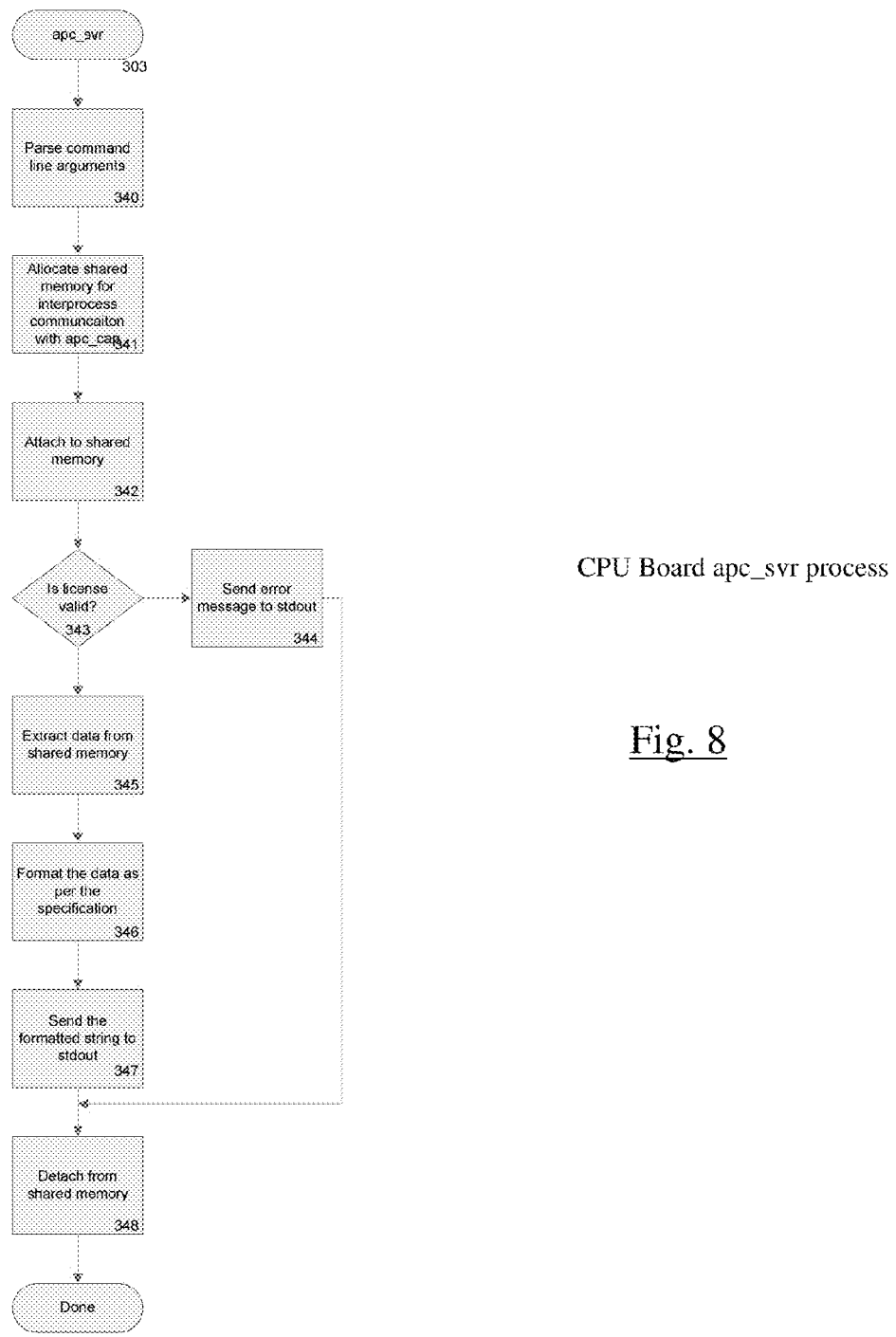
FIG. 8 is a flow chart showing an operation of the apc_svr process which is used to return detected 802.11 data to the calling application in accordance with one or more embodiments.
Figure 9:
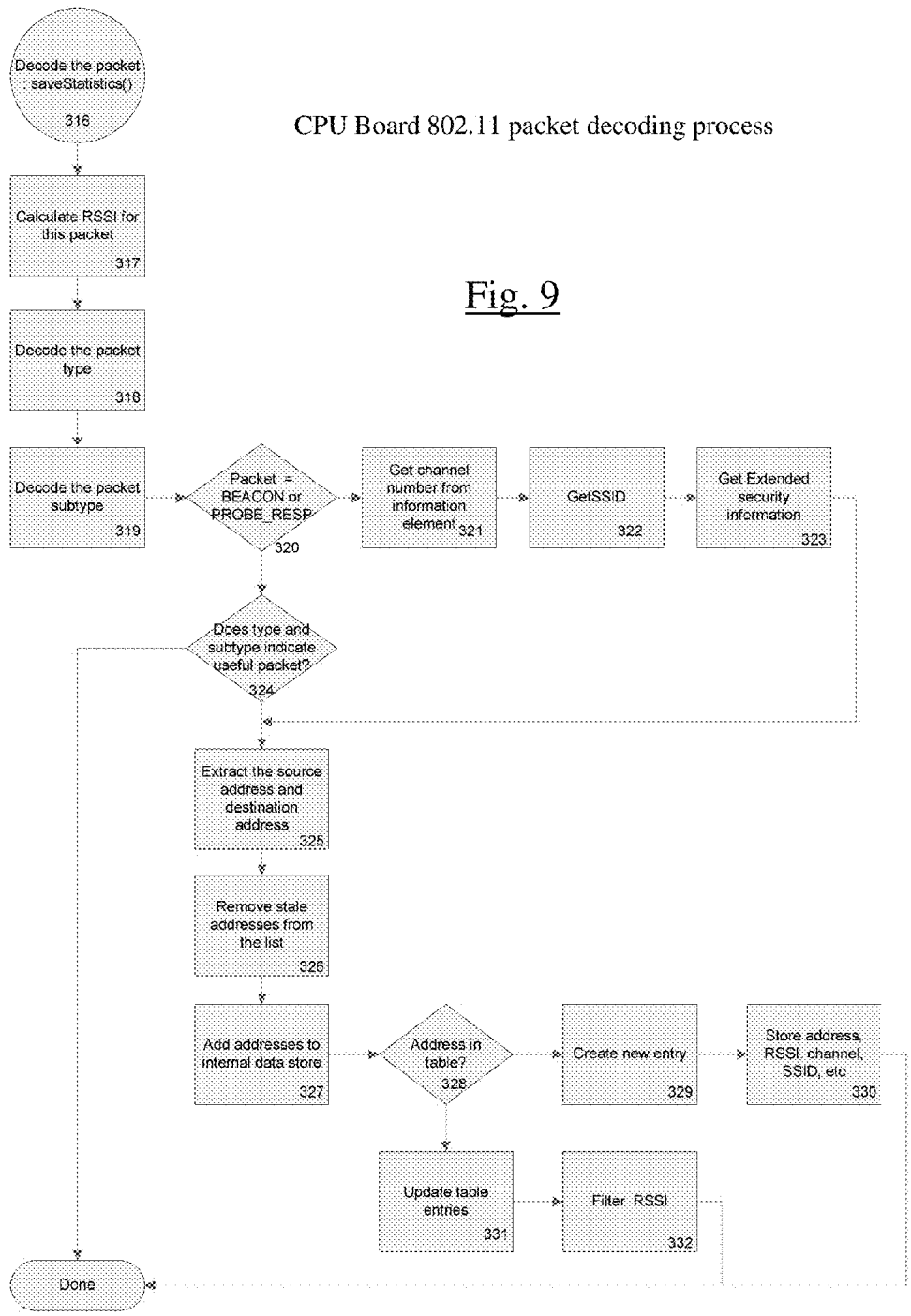
FIG. 9 is a flow chart showing an 802.11 packet decoding process in accordance with one or more embodiments.
Figure 10:
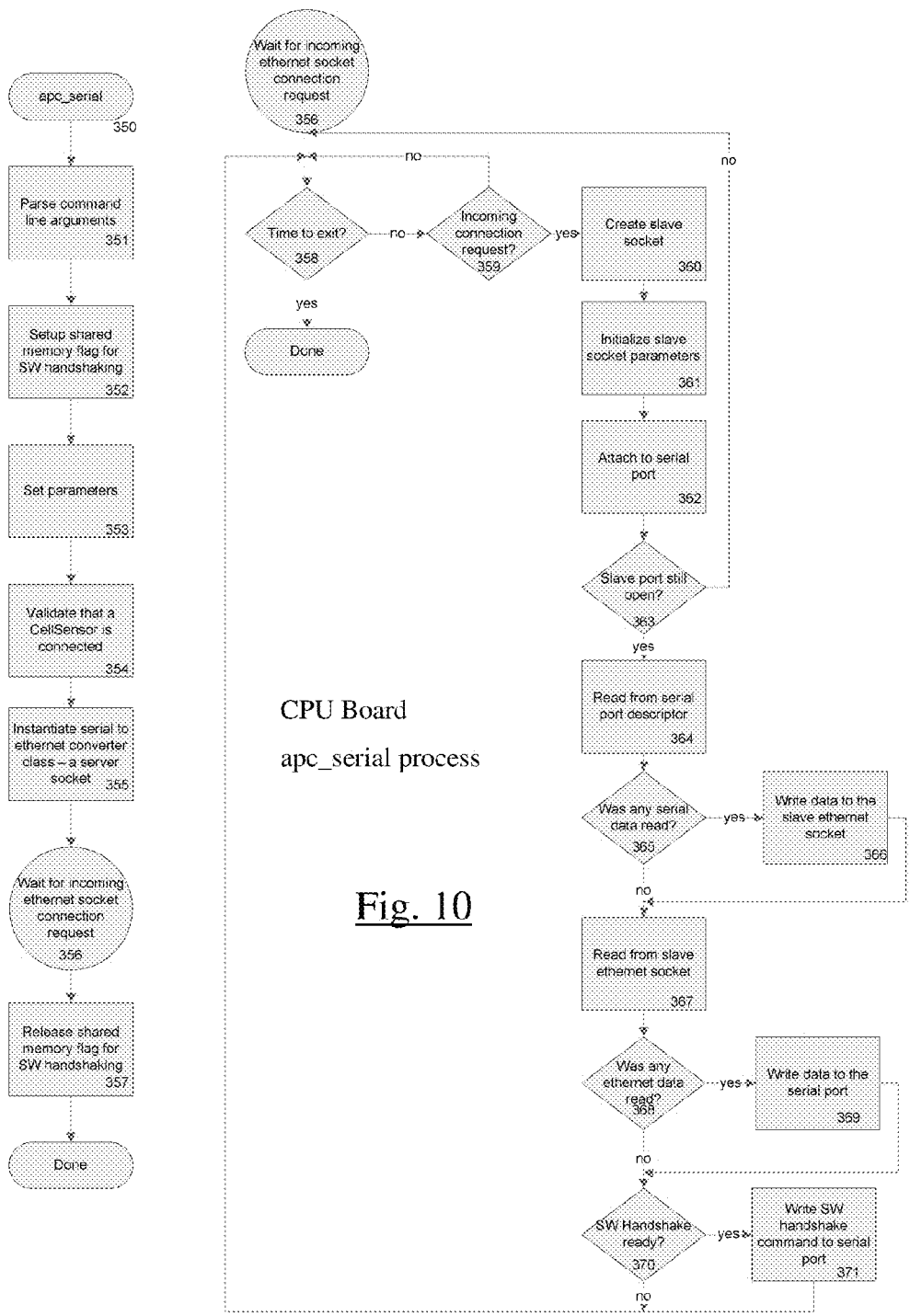
FIG. 10 is a flow chart showing an operation of the Ethernet to serial converter process that is used to connect the RF sensor to an Ethernet socket via the main CPU board in accordance with one or more embodiments.
Figure 11:
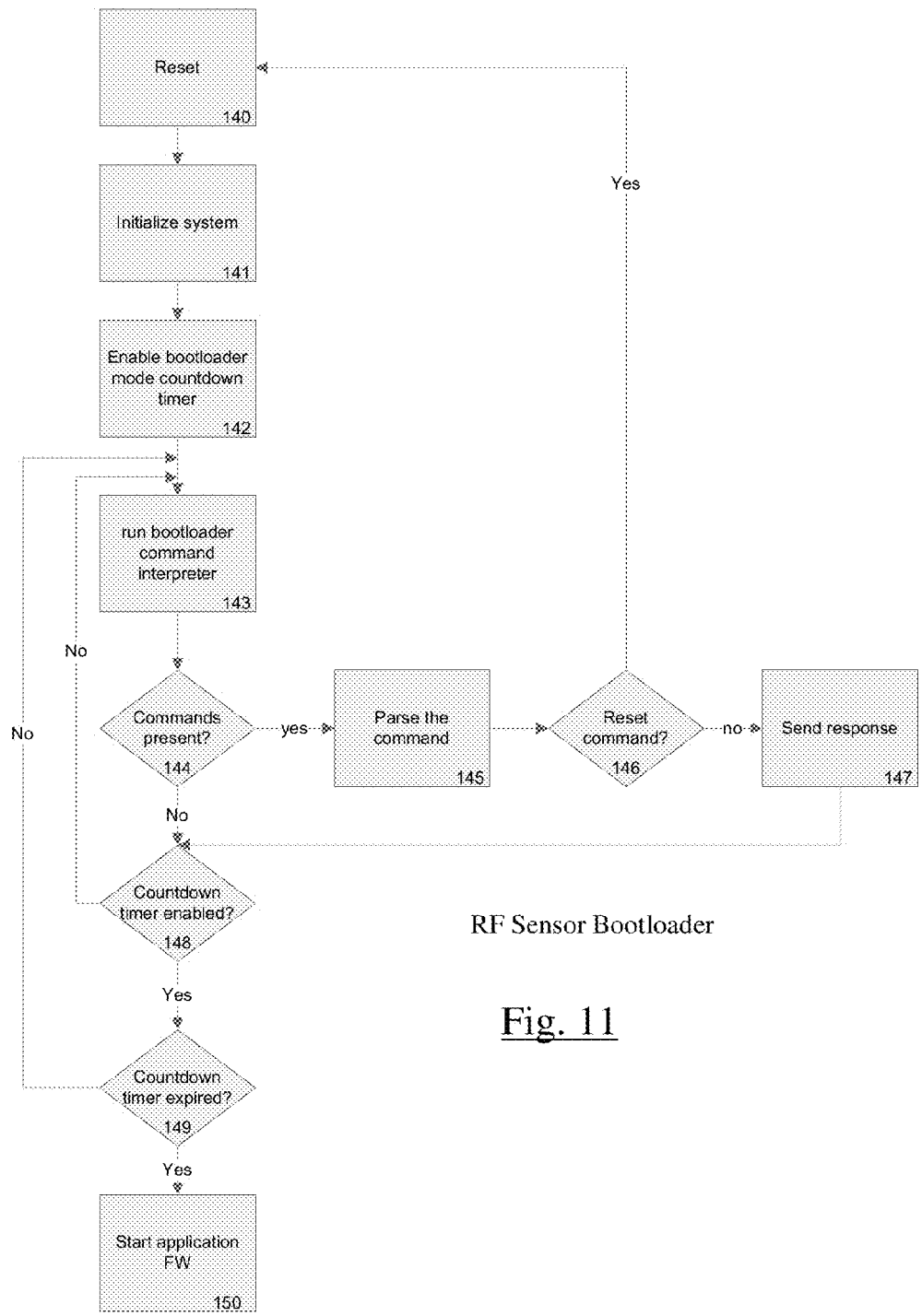
FIG. 11 is a flow chart showing a general operation of the bootloader process that runs on the RF Sensor in accordance with one or more embodiments.

As seen in FIG. 1, an embodiment consists of three or more sensors, spaced roughly equidistant throughout the area of desired coverage. The sensors are spaced such that any radio transmitter that is to be detected and tracked, transmitting at its lowest signal level, can still be detected by at least three adjacent sensors. The sensors communicate with the central Data Processing Server Application over the local computer network. The Data Processing application in turn stores a record of all detected and tracked 802.11 and cellular devices in an external commercially available SQL database. This database is accessed by the Productivity monitoring tools in order to display and generate consolidated reports on the devices tracked by the embodiment.

Although specific components are recited herein as performing the method steps, in other embodiments agents or mechanisms acting on behalf of the specified components may perform the method steps. Further, although some aspects of the invention are discussed with respect to components on a system, the invention may be implemented with components distributed over multiple systems. Embodiments of the invention also include any system that includes the means for performing the method steps described herein. Embodiments of the invention also include a computer readable medium with instructions, which when executed, cause the method steps described herein to be performed.

2.0 System Architecture

Although a specific computer architecture is described herein, other embodiments of the invention are applicable to any architecture that can be used to perform the functions described herein.

SPI—serial peripheral interface. This is a synchronous serial 8-bit bi-direction connection bus that uses 3 or more lines to transfer data—one clock, one data, and one selection signal for each device on the bus. This is a master/slave arrangement with one master and multiple slaves on the bus.

UART—universal asynchronous receiver transmitter. This is a asynchronous serial communications block that is bidirectional—one line for transmission in each direction.

Diplexer—This is a one input to two outputs dual-filter splitter circuit (may also be used in reverse direction as a combiner) that splits the outputs based on frequency criteria. One output is a low-pass (below transition frequency), and the other output is a high-pass (above transition frequency).

Mixer—A RF circuit which combines two inputs in non-linear fashion to produce an output which consists of the two inputs plus 'mixing products', the most useful of which are frequencies corresponding to the differences between the two input frequencies.

Image Frequency—An unwanted input that when combined in a mixer produces an output which interferes with the desired signal. Filters must be used to reduce or eliminate image frequencies before a mixer stage.

RF—Radio Frequency.

RSSI—Received signal strength indicator. This is used to refer to the magnitude of RF signal measured at an antenna input.

CPU Board Operational Description

The CPU board 100 embodies a processor 105 with random access memory 101 and non-volatile flash memory 102, supported by bus 104. Bus 104 also supports peripherals, multiple wireless cards 103A to 103N, a UART 106, and a multi-port ethernet switch 107. Processor 105 is embodied with an Infineon ADM5120. Random access memory 101 is 16 Mbytes, and flash memory 102 is 4 Mbytes.

Local network 110 is a wired connection via network link 112 to the ethernet switch 107 on CPU board 100. This network link 112 provides both data communications to processor 105 as well as power for CPU board 100 via power over ethernet 108. Ethernet switch 107 may also provide network link 112 to other network devices, passing data through the switch 107 to the local network 110 that is unrelated to activities on CPU board 100.

Serial link 109 provides communications between the RF sensor 120 and the CPU board 100. Power is also provided from power over ethernet 108 through serial link 109 to RF sensor 120. Additional control signals within serial link 109 allow processor 105 to reset RF sensor 120.

Wireless card 103A receives RF signals through antenna 112A, demodulating, decoding, and reporting identification information such as transmission MAC address, RF channel used, RSSI, and time of activity. The primary embodiment of wireless card 103A is a dual-band 2.4 GHz and 5 GHz 802.11a/b/g/n card. Wireless cards may also be added to the bus 104 to support reception of Bluetooth, WiMax, Zigbee, or other RF signals. Wireless cards 103A are controlled by processor 105 through bus 104.

Bus 104 is embodied with a standardized mini-PCI configuration to allow use of many different types of wireless cards 103A through 103N.

RF Sensor Operational Description

The RF sensor board 120 embodies four independent RF receivers; a low-band wide-band 128A-130A, a high-band wide-band 128B-130B, a low-band narrow-band 128C-131B, and a high-band narrow-band 134-135-129-131A receiver.

Processor 121 is embodied with a Microchip Technologies PIC24HJ256GP126 16-bit microcontroller with 256 kbytes of program memory, 16 kbytes of data memory, a multichannel 12-bit analog to digital converter, 9 timers, a UART 109, two SPI interfaces 122, an internal core voltage regulator, and a configurable PLL clock multiplier. This processor performs all control, measurement, and operations of the RF sensor board.

The control bus 122 is embodied with two SPI interfaces, connecting to an optional expansion board 124, the high-band mixer 129, low 131B and high 131A band narrow-band receivers, and the frequency dividers of wide band receivers 130A and 130B. This control bus operates at 5 MHz, and is used to transfer all commands and data to and from each of the attached sections.

The master clock 123 is a temperature-compensated crystal oscillator operating at a precise 26.0 MHz frequency. This master clock drives the PLL clock multiplier of processor 121 for accurate timing and frequency measurement of RF signals, as well as general processor operation.

Serial link 109 provides communications between the RF sensor 120 and the CPU board 100. This serial link uses the UART in processor 121, with timing provided by clock 123.

The expansion board 124 is provided to allow future expansion of RF sensing and/or receiving functions of RF sensor board 120.

The USB interface 125 is provided to replace serial link 109 in applications where RF sensor 120 is not combined with CPU board 100. This configuration is not implemented in the present embodiment.

Diplexer 126 splits the RF signal from antenna 136B in to a low band portion for narrow-band receiver 131B and a high band portion for wide-band receiver 130B. The transition point between bands is 1.25 GHz—frequencies lower than this go to 128C, and frequencies higher than this go to 128B. At the bands of interest at each receiver, signal loss from the diplexer is approximately 1 dB.

Splitter 127 splits the RF from antenna 136A in to a portion for narrow-band receiver 131A and a portion for wide-band receiver 130A. This split is equal on each side, with a loss to each side from the antenna input of approximately 4 dB. The splitter is a low-pass configuration, with frequency response of 300 MHz up to 2.0 GHz.

Filters 128A and 128B are SAW filters for band selection of wide-band receivers 130A and 130B. This embodiment may use frequencies of 824-849 MHz for the low band, 1850-1910 MHz for the high band in one configuration, or 880-915 MHz for the low band, 1710-1785 MHz for the high band in another configuration, or other frequency ranges as required for specifics of the RF sensing required.

Image filter 134 works in conjunction with the low-pass characteristic of splitter 127 to provide image rejection for mixer 129. This image rejection is the characteristic of a pass-band of 300 MHz to 2.0 GHz, and a stop-band of 2.7 GHz and above. The embodiment of filter 134 is an elliptic filter type with a stop band zero at 3.0 GHz. Image rejection is 19 dB at 2.7 GHz and 40 dB at 3.0 GHz.

Preamp 135 provides wide-band gain of 18 dB to improve noise figure of high-band narrow-band receiver 131A. The gain level of this amplifier may be controlled by processor 121 to allow for high signal-level environments or for noise-floor measurement.

Mixer 129 provides a frequency band-shift to allow narrow-band receiver 131A to operate over a range of 698 MHz to 2.0 GHz. A preferred embodiment is to use an intermediate frequency of 800 MHz between mixer 129 and receiver 131A. As an example, to convert an RF input at antenna 136A of 1750 MHz to the intermediate frequency of 800 MHz, the mixer operates at a 'high-side' frequency of 2550 MHz. The difference between mixer frequency of 2550 MHz and input frequency of 1750 MHz is the 800 MHz intermediate frequency, which is then received by narrow-band receiver 131A.

Narrow-band high-band receiver 131A utilizes a highly integrated CC 1101 chip which includes required filters, mixer, down-conversion, demodulation, and signal monitoring for reception of many types of RF signals. The receiver 131A operates on intermediate frequencies from the output of mixer 129, which are band-shifted signals. The intermediate frequency may be selected from a range of 387 to 464 MHz or 779 to 928 MHz, whichever most suits the input frequency and band conversion selection of the mixer. The configuration of the frequency and reception parameters is controlled by processor 121 via the interface bus 122. Processor 121 records the received signal strength and frequency at 0.1 ms intervals from receiver 131A, reporting the results to CPU board 100 through serial link 109

Wide-band low-band receiver 130A receives the entire band selected by input filter 128A. When presented with the expected mode of operation of a multitude of narrow-band signals within this band, the strongest signal at any given point in time is measured. Processor 121 uses analog to digital and timer resources to record the received signal strength and frequency at 0.1 ms intervals from receiver 130A, reporting the results to CPU board 100 through serial link 109.

Filter 128C combines a 928 MHz low-pass filter with an unbalanced to balanced conversion from diplexer 126 output to narrow-band receiver 131B. This conversion is a requirement of the CC1101 narrow-band receiver chip 131B.

Narrow-band low-band receiver 131B utilizes a highly integrated CC1101 chip which includes required filters, mixer, down-conversion, demodulation, and signal monitoring for reception of many types of RF signals. The configuration of the reception parameters is controlled by processor 121 via the interface bus 122. Processor 121 records the received signal strength and frequency at 0.1 ms intervals from receiver 131B, reporting the results to CPU board 100 through serial link 109.

Wide-band high-band receiver 130B receives the entire band selected by input filter 128B. When presented with the expected mode of operation of a multitude of narrow-band signals within this band, the strongest signal at any given point in time is measured. Processor 121 uses analog to digital and timer resources to record the received signal strength and frequency at 0.1 ms intervals from receiver 130B, reporting the results to CPU board 100 through serial link 109.

802.11 Sensor FW Detailed Description

A functioning sensor system requires both the sensor hardware and the accompanying firmware to perform the required tasks. The required tasks in this implementation are wireless card setup, wireless card RF data extraction, RF data processing and RF data reporting to a management system.

The firmware is implemented on an embedded Linux operating system (OS). A Linux based system has four software layers 300. The implementation of the sensor firmware is at the application layer.

A script named runcap 301 executes on the sensor which initializes the system and then executes a loop to periodically change 802.11 channels. The list of these channels is maintained in a file cap.conf 306. The dwell time 315 on these channels is also stored in the cap.conf 306. The scrip 'runcap' 301 then sets the wireless card into monitor mode 307 to allow all detected RF packets to be passed up from the hardware controllers 300 for further processing. A shared memory block 302 is initialized 308 and a process to capture wireless packets, apc_cap 333 is started as a background process on the OS. At this point the loop to allow scanning on different channels starts. The channel is selected 310 followed by a test to ensure that apc_cap 333 is operating normally. Then the channel is set on the wireless card 312. A check to ensure the channel was changed is performed 313 and an error is logged 314 if the channel was not set. The script then sleeps or waits for a predetermined amount of time, called the dwell time 315, before starting the loop. During the dwell time, data is extracted by apc_cap 333.

The process apc_cap 333 which is started by the runcap script 301 is responsible for acquiring the RF packets which are returned by the hardware controller 300. The process apc_cap 333 parses command line arguments 334 to determine what values to use in the process. Another processing class is instantiated at this time 335 which is responsible for decoding the 802.11 packets. A low level packet capture library is initialized 336 which works with the hardware level to extract all the unprocessed 802.11 packets. A loop is started which starts with reading the packets 337 and if packets are available 338, they are formatted into a structure 339 and passed to a routine in the processing class 316.

The routine saveStatistics 316 is the packet decoding engine. Raw packet data is passed in from apc_cap 333 and the rssi for the packet is calculated 317. The packet type and subtype are decoded from the 802.11 packet header 318, 319. If the packet is of the appropriate type and subtype 320, specific information such as the channel number 321, 802.11 SSID 322 and security information 323 can be retrieved. If the packet is of another type and subtype that contains important information 324, the source and destination addresses can be retrieved from the packet header 325. A list of previously detected 802.11 devices is then examined to see if any stale data exists and is removed if necessary 326. The 802.11 addresses are then added to the internal data store 327. If the address is already in the table 328, the table entries are updated with any new information 331 and the RSSI value is filtered 332. Otherwise a new table entry is created 329 and the values of RSSI, SSID, channel, etc are stored 330.

Data from the packet decoding engine 316 is stored in a shared memory block 302. This shared memory block is also used by the routine apc_svr 303 which is called by an external process to retrieve the data. Access to the shared memory block is arbitrated with a semaphore 304 to prevent multiple simultaneous access.

The routine apc_svr 303 is called by an external process to retrieve the data. Data from the detected wireless devices such as BSSID, SSID, channel, RSSI, security state, association state and device type are stored. Initially, any command line arguments are parsed 340 and the shared memory block is allocated (if it is not already allocated) and the process attaches to the memory block 341,342. A licensing scheme is implemented to ensure that a sensor is authentic and that license is checked 343. If an invalid license, or no license is found and error message is generated to the calling process 344. If the license is valid, the wireless device data is extracted from the shared memory 345 and formatted to the correct specification 346. The formatted information is then sent out to the calling process 347. The routine then detaches from the shared memory 348 and exits.

The other major process running on the CPU board is apc_serial 350. This process is a serial to Ethernet and Ethernet to serial converter. Serial data from the RF sensor board is buffered and sent out an Ethernet socket, while incoming Ethernet data from an attached socket is buffered and then sent to the serial port on the RF sensor board.

In order to efficiently transfer serial data from the RF Sensor 120, a process running on the CPU board 100 is implemented to provide a bridge between an Ethernet socket and a serial port 350. On system boot, the process apc_serial 350 is started and any command line arguments are parsed 351. Parameters to control which ports to use are set 353 and a shared memory space for a handshaking flag 352 is created. Once it is validated that an RF Sensor 120 is present in the system, a server socket to the Ethernet port is established 355 to listen for incoming socket connection requests 356. If there is a request to exit the program 358, the shared memory is released 357. If an incoming connection request is made 359, a slave socket is spawned from the server socket 360. The parameters for the slave socket are initialized 361 and the process attaches to the serial port 362 to form a bridge. While the slave port is open 363, the process reads from the serial port 364 to determine if any data has been sent from the RF Sensor 120. If serial data is available 365 it is written without any translation to the Ethernet socket port 366. An attempt to read data from the Ethernet port is performed 367 and if data is present 368 it is transmitted out the serial port 369 to the RF Sensor 120. If the process detects that it is necessary to temporarily stop data coming from the RF Sensor 370, a handshake command is sent to the RF sensor 371. This loop continues until there is an exit request 358.

RF Sensor Detailed Description

The RF sensor is used to accurately detect and analyze various RF signals over a wide range of frequencies without the requirement to demodulate and decode the underlying signals. The RF sensor is managed through an external serial port that is used for incoming command data, outgoing responses and RF reporting data.

Figure 12:
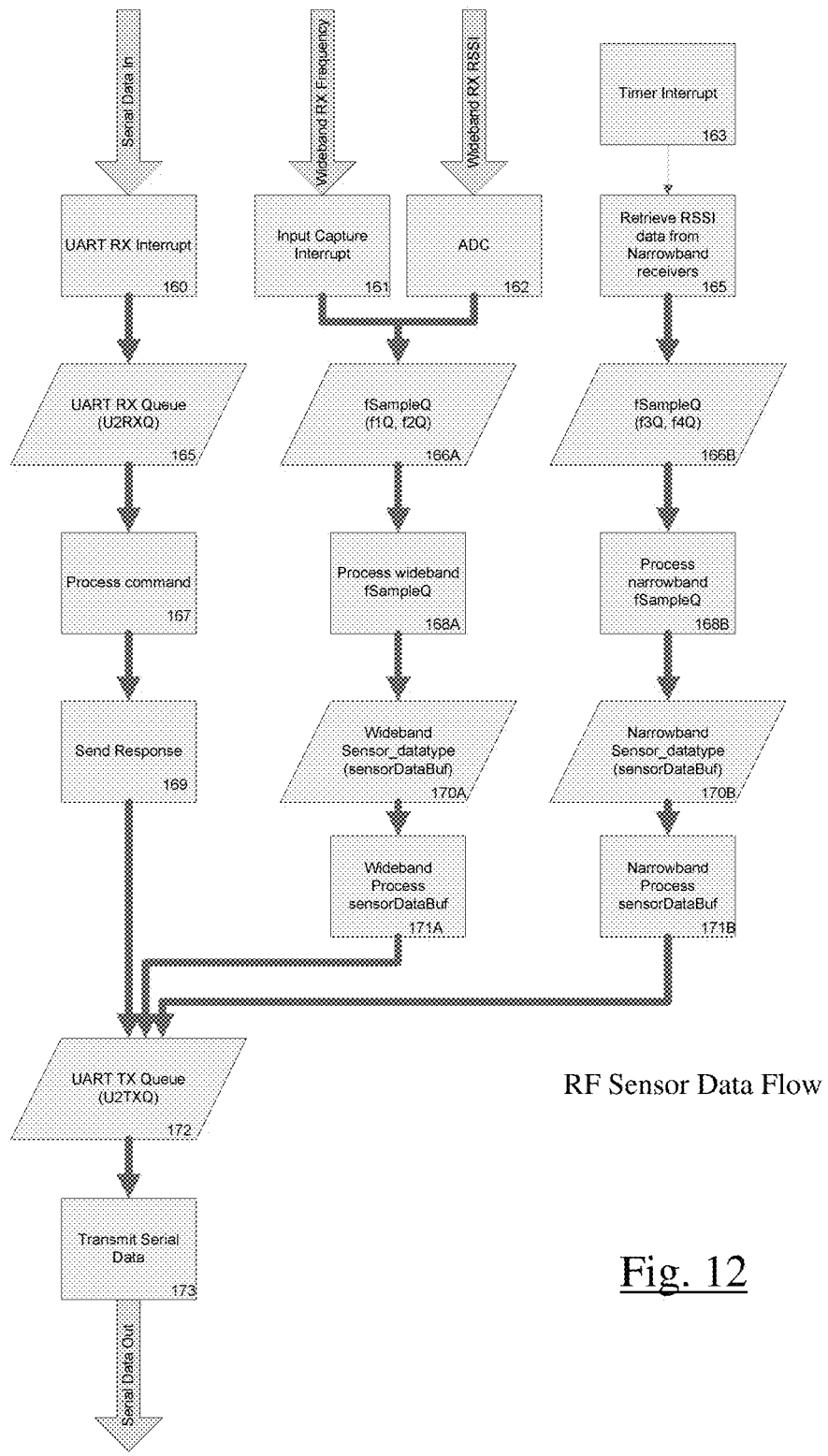
FIG. 12 is a block diagram showing a general data flow on the RF Sensor in accordance with one or more embodiments.
Figure 13:
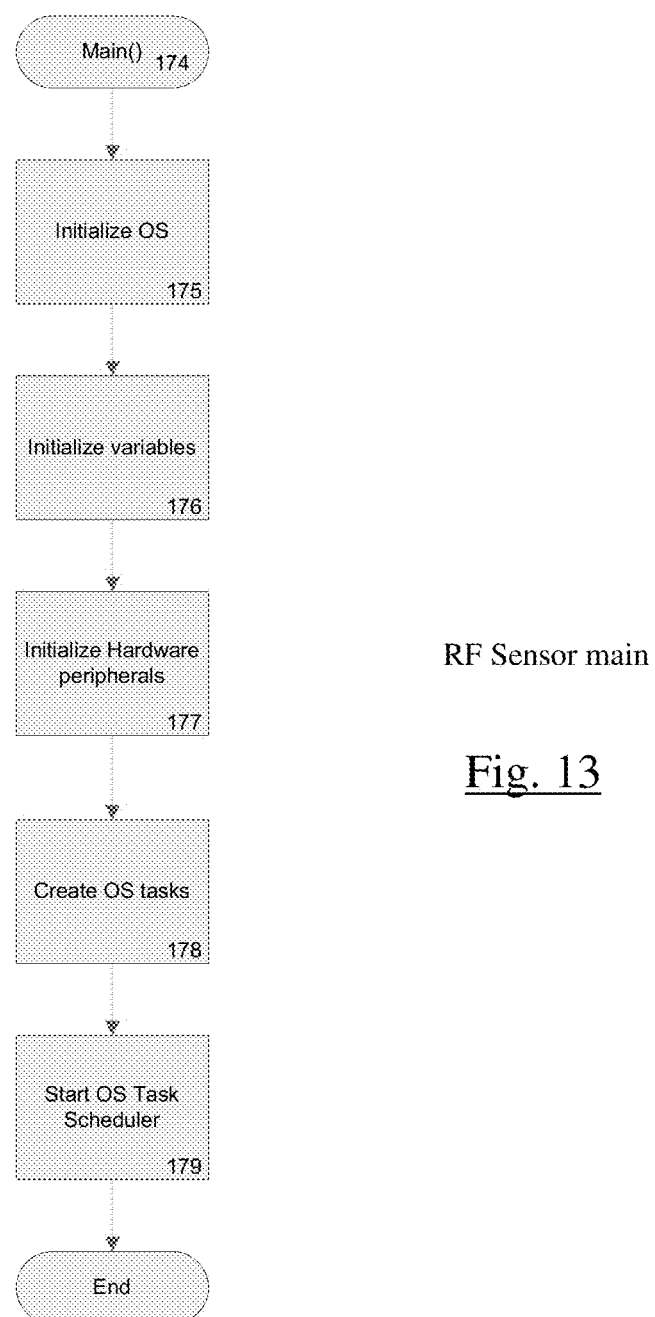
FIG. 13 is a flow chart showing a main process of the RF Sensor in accordance with one or more embodiments.
Figure 14:
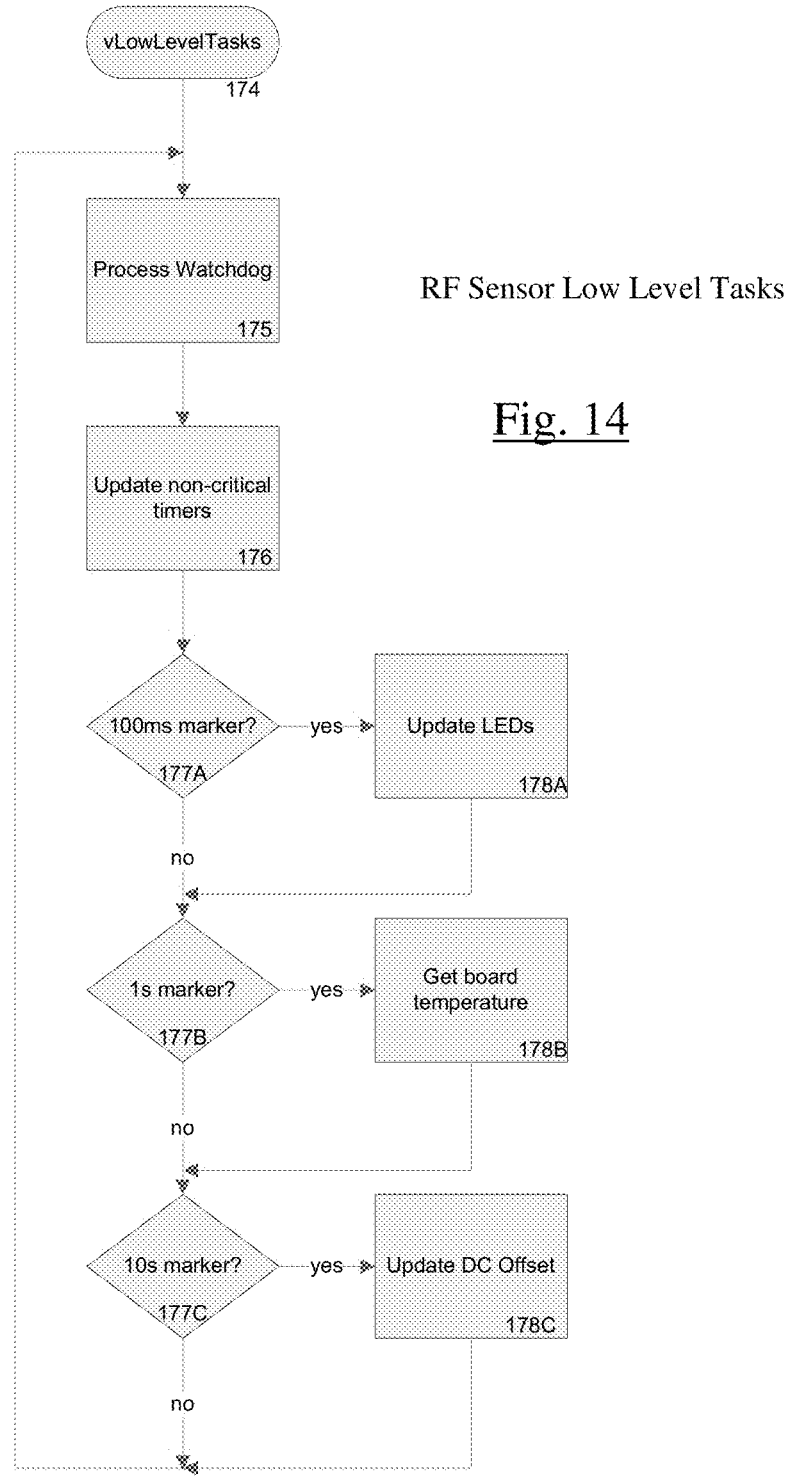
FIG. 14 is a flow chart showing an operation of the low level tasks on the RF Sensor in accordance with one or more embodiments.
Figure 15:
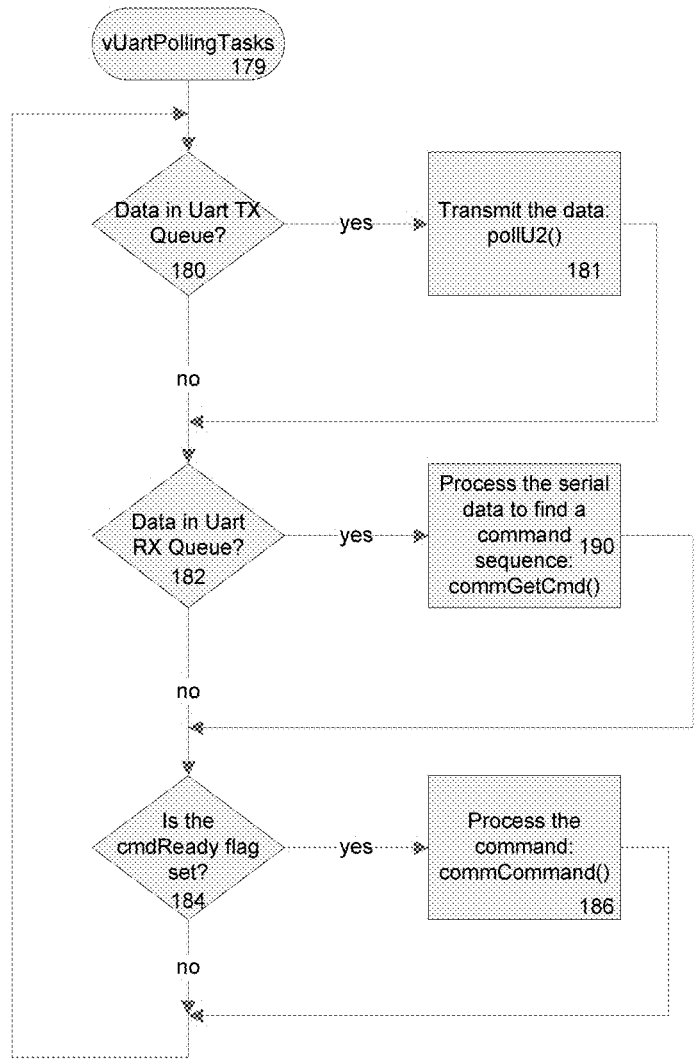
FIG. 15 is a flow chart showing an operation of the UART polling task which is responsible for transferring data to and from the serial port on the RF sensor in accordance with one or more embodiments.
Figure 16:
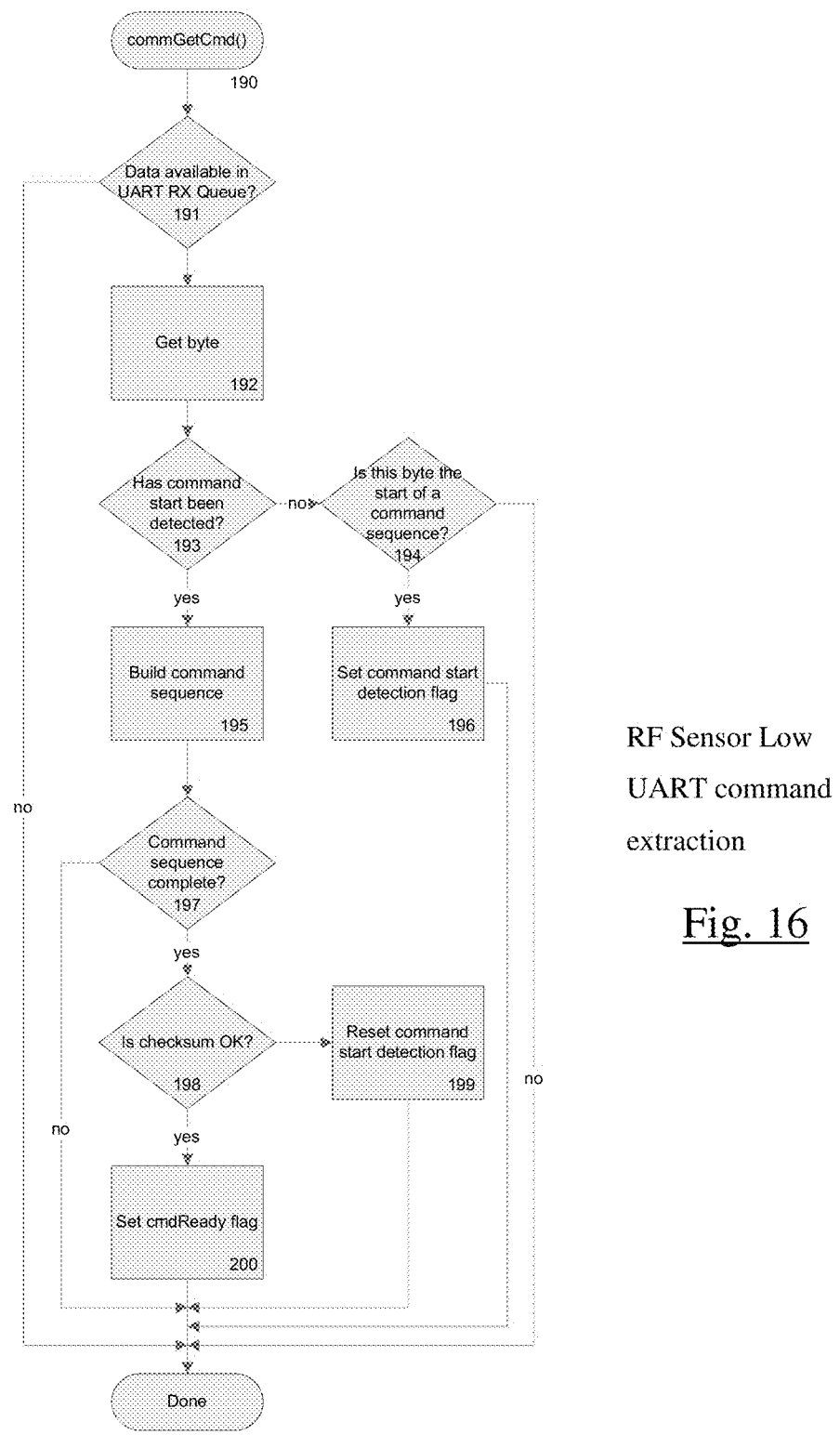
FIG. 16 is a flow chart showing a process that extracts commands from the serial port in accordance with one or more embodiments.
Figure 17:
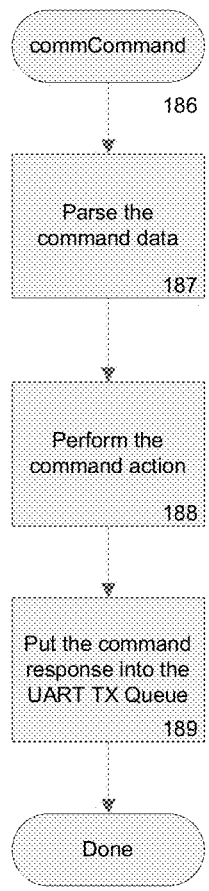
FIG. 17 is a flow chart showing a process to parse the commands from the serial port in accordance with one or more embodiments.
Figure 18:
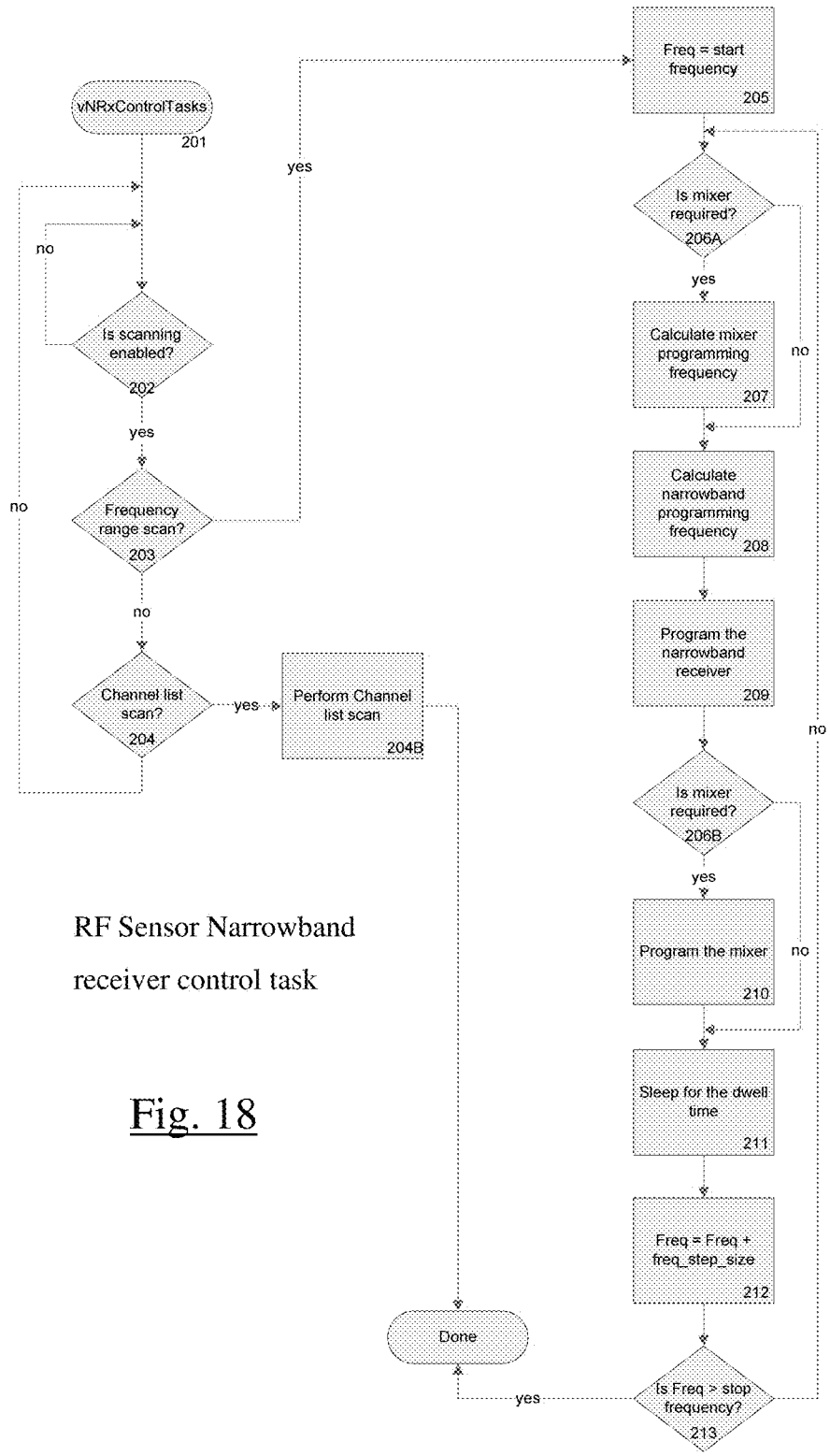
FIG. 18 is a flow chart showing a narrowband receiver control task in accordance with one or more embodiments.
Figure 19:
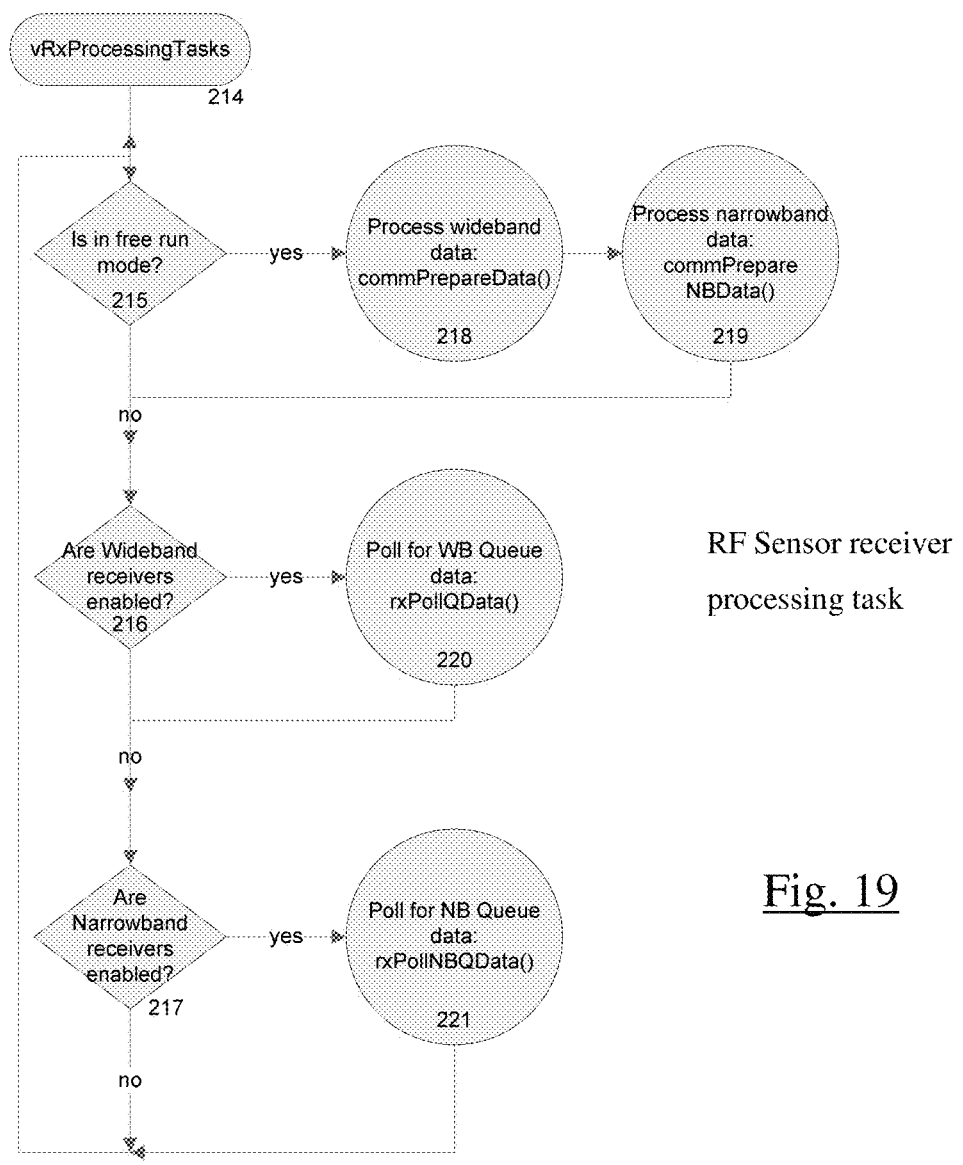
FIG. 19 is a flow chart showing an RF sensor received RF data processing task in accordance with one or more embodiments.
Figure 20:
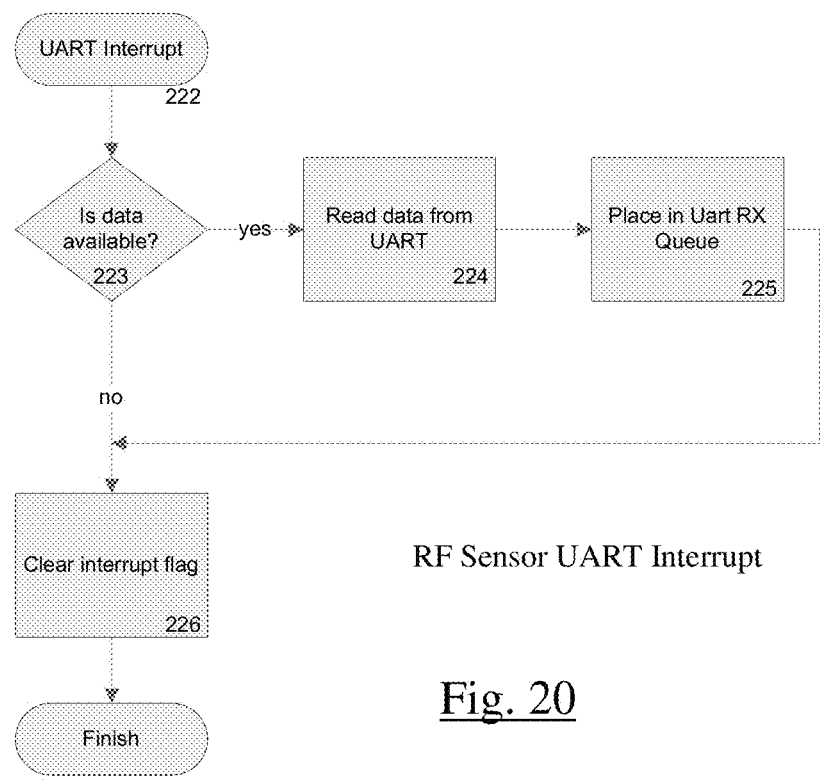
FIG. 20 is a flow chart showing an RF sensor UART Interrupt in accordance with one or more embodiments.
Figure 21:
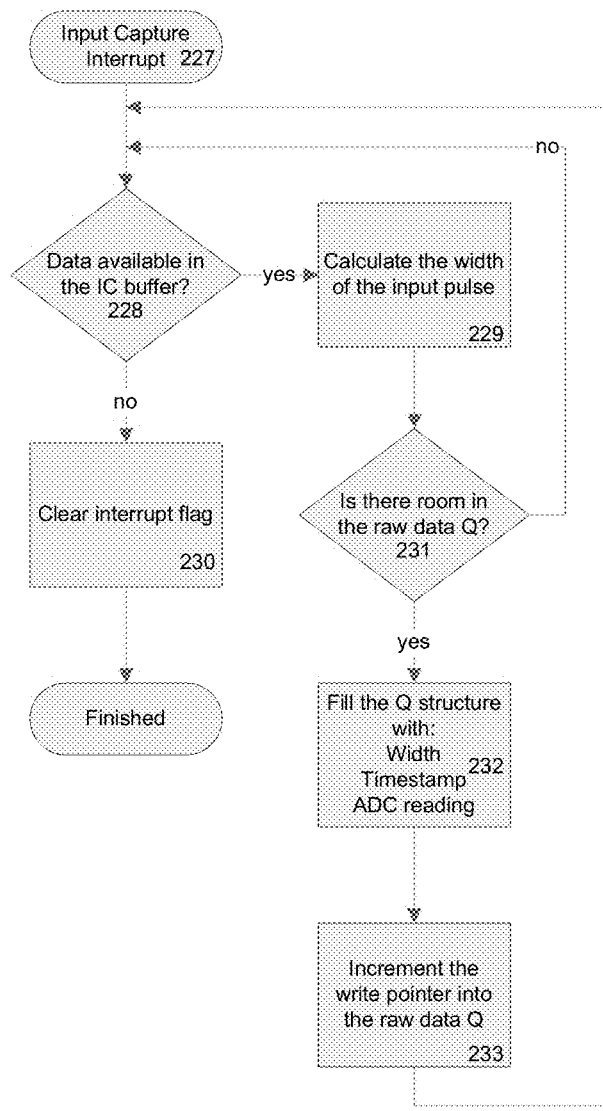
FIG. 21 is a flow chart showing an RF sensor input capture interrupt which is used to determine the frequency of the data from the wideband receivers in accordance with one or more embodiments.
Figure 22:
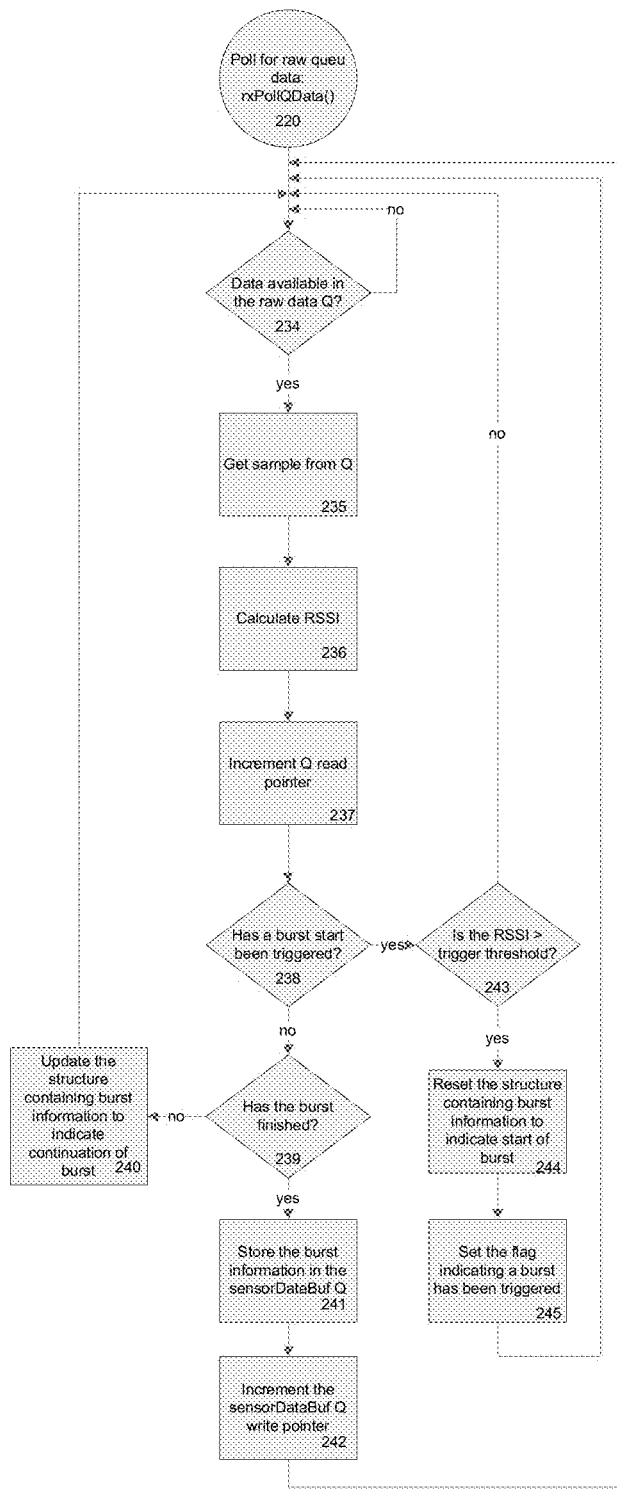
FIG. 22 is a flow chart showing a method for polling for wideband RF data stored in a queue filled from the input capture interrupt in accordance with one or more embodiments.
Figure 23:
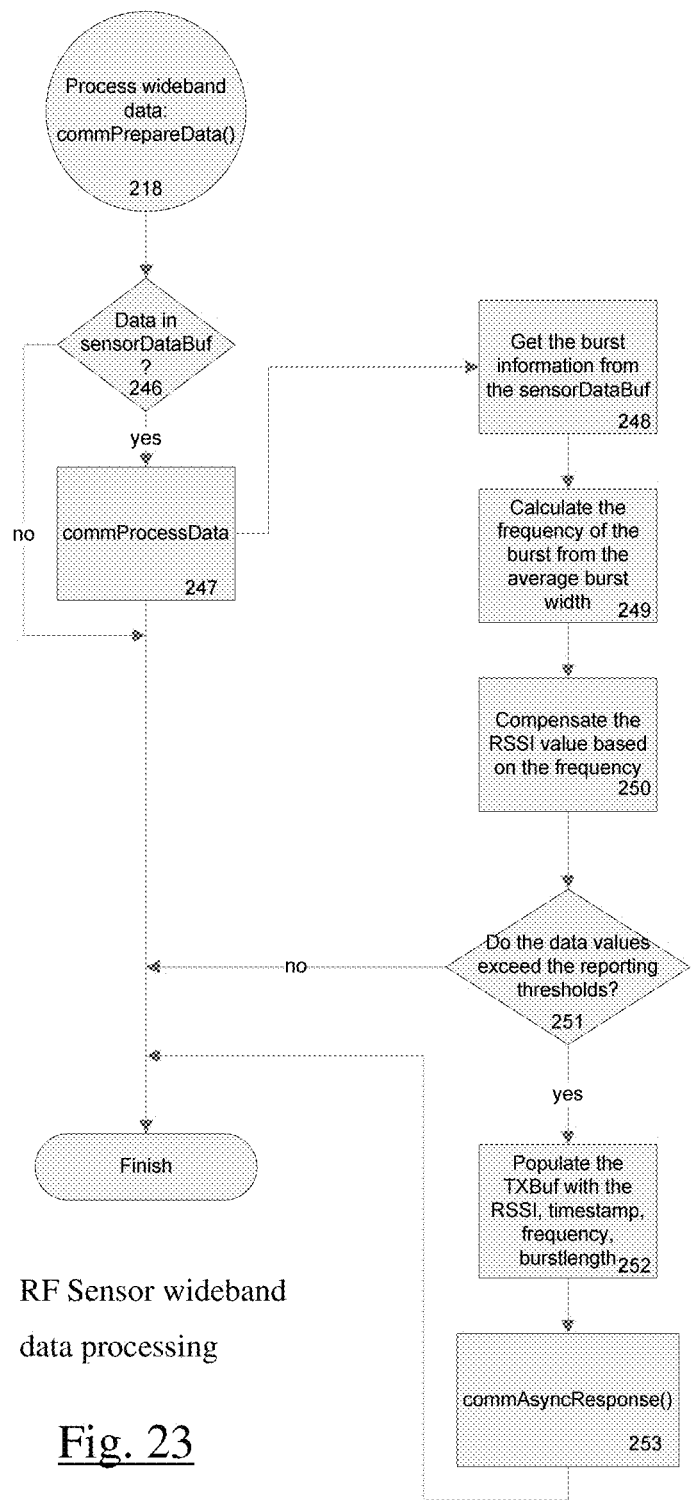
FIG. 23 is a flow chart showing a method for processing the wideband RF data in accordance with one or more embodiments.
Figure 24:
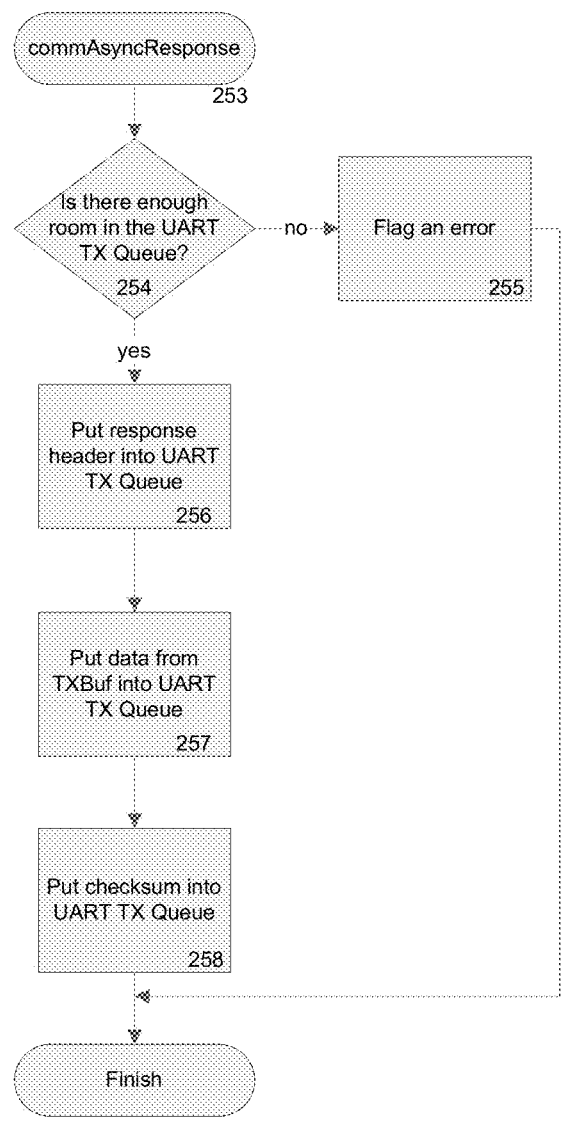
FIG. 24 is a flow chart showing how detected RF data information is sent to the management system in accordance with one or more embodiments.
Figure 25:
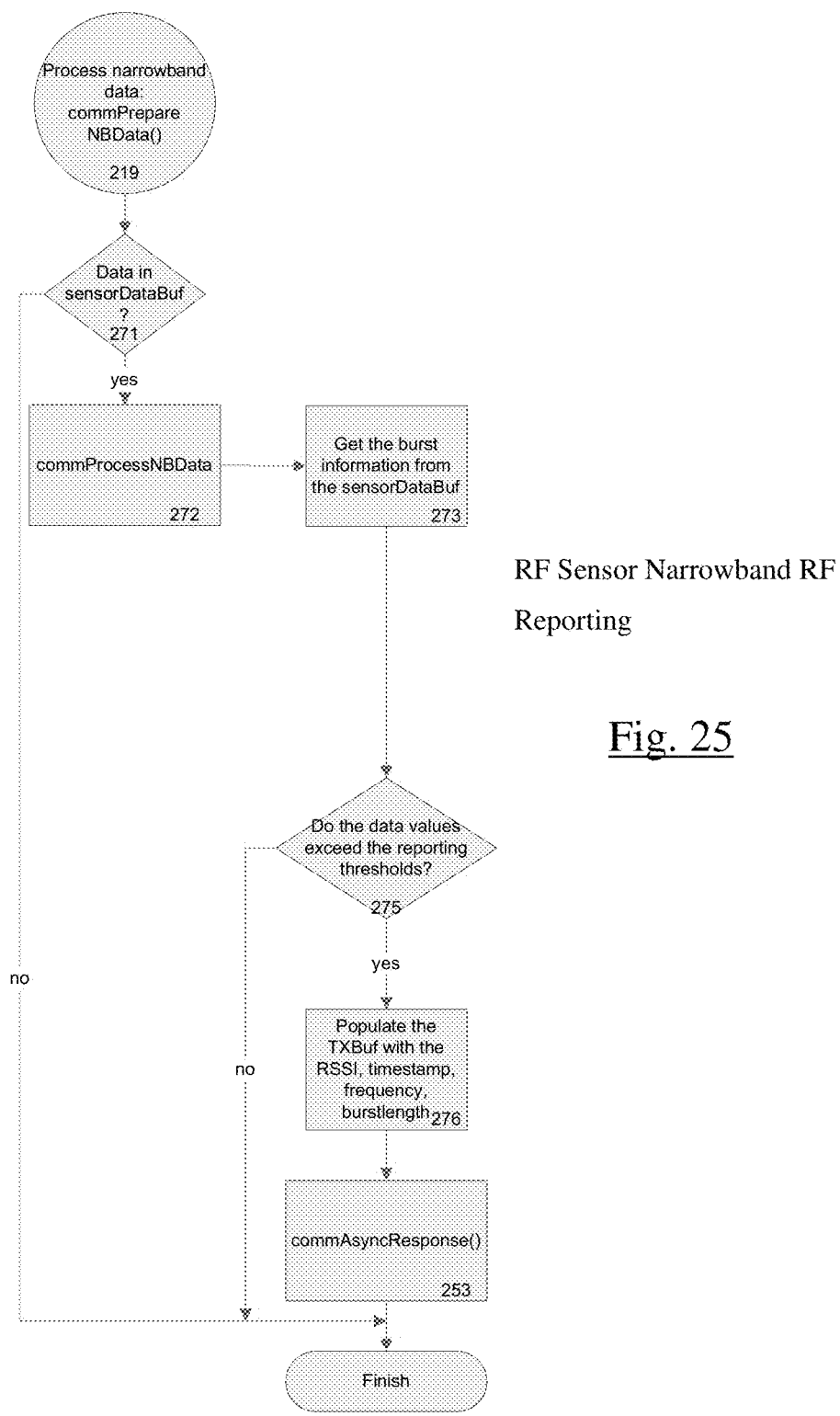
FIG. 25 is a flow chart showing a method to report narrowband RF data in accordance with one or more embodiments.
Figure 26:
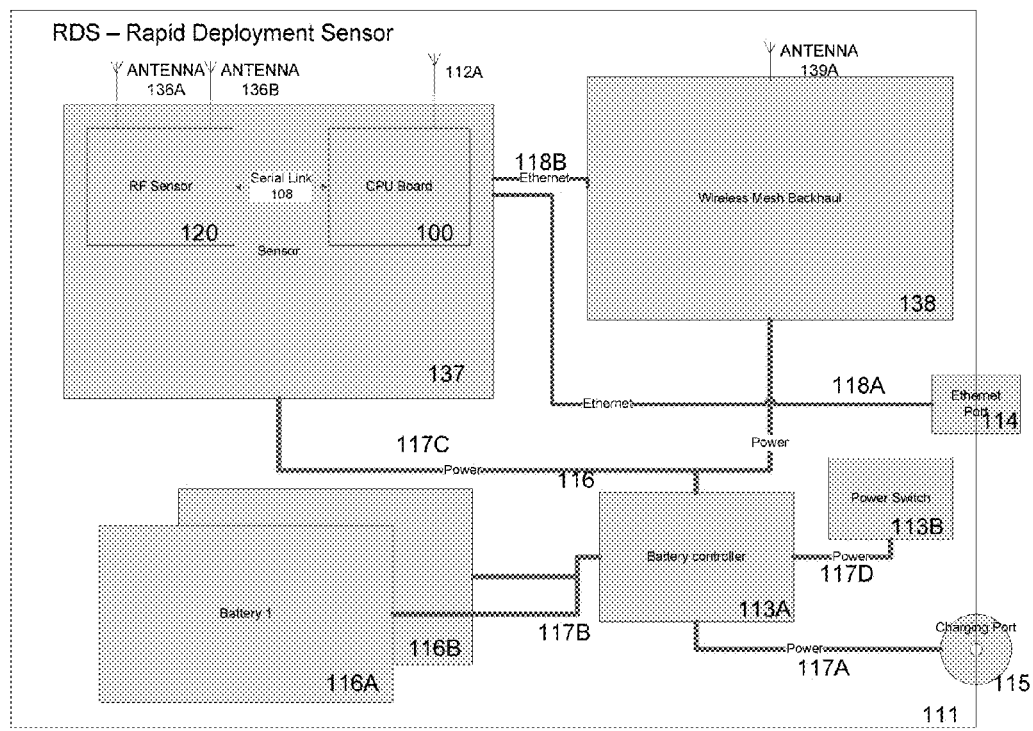
FIG. 26 is a block diagram showing a Rapid Deployment System (RDS) in accordance with one or more embodiments.

FIG. 12 shows a high level data flow diagram for the RF sensor. Starting with command and control data, incoming serial data causes the UART interrupt to the CPU to fire 160.

The UART receive interrupt routine 222 places the received data into the UART RX Queue 165. Data from this queue is then processed 167 and the appropriate response sent 169. The response is placed in the UART transmit queue 172 where it is transmitted out the serial port 173.

Wideband receiver data consists of two basic components; a frequency component and an RSSI component. The frequency component output from the wideband receiver is fed into an input capture input 161 on the microcontroller running on the RF sensor board. The input capture input is used to capture the width of a frequency pulse, therefore, the frequency of the sample can be calculated and stored in the sample queue 166A. The RSSI component output from a wideband receiver is converted from an analog voltage to a digital reading 162 and then associated with the frequency component and timestamp and placed in the queue 166A. The wideband data from the queue 166A is then processed 168A to determine signal characteristics that are stored in another buffer 170A. These signal characteristics are then examined 171A to see if the data is reportable to the management process. Responses are placed in the UART Transmit queue 172 where they are subsequently transmitted 173.

The narrowband receivers are polled after a timer interrupt fires 163. When the timer expires, the RSSI for the currently programmed frequency is retrieved from the narrowband receiver 165. The frequency, RSSI information and timestamp for the sample is then put into the sample queue 166B. The sample queue is then processed 168B and placed into another queue 170B. These signal characteristics are then examined 171B to see if the data is reportable to the management process. Responses are placed in the UART Transmit queue 172 where they are subsequently transmitted 173.

There are two main components to the firmware running on the RF sensor. The first component is the bootloader and the second component is the application firmware.

The bootloader is responsible for system reset and initialization as well as programming updates to the application firmware. The bootloader starts at the processor reset state 140 and then initializes the system 141. A countdown timer is started 142 that causes the application firmware to start when the timer expires 149. During this time period, command can be sent from the management process which are then interpreted by the bootloader 143. If a command is present 144, the command is parsed 145. If the command is a reset command 146, the system is reset. Other commands may send a response 147 based on the command request. Some commands can cause the countdown timer to become disabled 148, which is required when the application firmware is upgraded. Once the countdown timer expires, the system transfers control to the application FW 150.

The application firmware running on the RF sensor runs with an operating system (OS), implemented by FreeRTOS in this embodiment. When the main function 174 is called by the application firmware, the OS is initialized 175, variables are initialized 176, and hardware peripherals are initialized 177. Once the OS and hardware are initialized, the required operating tasks are created 178 and the OS task scheduler starts 179. Tasks can be run at varying priority levels and the amount of time allocated for the tasks before switching to a new task is configurable.

A UART interrupt 222 is generated when data is received on the serial port. If there is data available 223, the data is read from the UART register 224 and placed into the UART receive queue 225. The interrupt flag is then cleared 226 and the interrupt relinquishes control back to the OS.

The frequency output from the wideband receivers is connected to the input capture input on the processor. This input capture input may generate an input capture interrupt 227 when a falling edge is detected. Each subsequent falling edge generates an interrupt and the difference between two falling edges is directly related to the frequency of the original signal. Due to the high frequencies involved, a prescaler is used to divide down the input frequency to reduce the number of interrupts while still allowing for good frequency resolution. When the interrupt occurs, the width of the pulse is calculated based on the time of the previous interrupt 229. If there is room in the data queue 231 the width of the pulse, the timestamp and the ADC reading of the RSSI is stored in the data queue 232. As the queue is a circular queue, the write pointer to the queue is incremented 233. When no other data is available in the input capture queue, the interrupt flag is cleared 230.

Four tasks are implemented in this embodiment. There is a task for low level routines 174 that have a lower priority as they have no real time component. A task to interface with the UART for command and response data 179 is implemented. A task to control the narrow band receivers is implemented 201. A task to process the received RF data is implemented 214.

The low level tasks 174 consists of resetting the watchdog to prevent a system reset 175, updates to non-critical timers 176, periodically updating 177A, 177B, 177C the output LEDs 178A, periodically reading the board temperature 178B used to compensate for variations in temperature and updating the DC offset 178C for use in calibrating the RSSI readings.

The UART polling tasks 179 are responsible for reading serial data, interpreting that data and sending the appropriate responses. The data has been stored in the UART TX queue 180, the data is then transmitted out the serial port under the control of this task 181. If data has been stored in the UART RX queue 182 from the UART interrupt 222 the data is processed to find a command sequence 190. If a command has been found in the serial stream 184, the command is processed 186. The incoming serial data is processed 190 byte by byte 191, 192. If a command start sequence has been detected 193 the command is built with subsequent data 195. If no command start sequence has been detected, attempt to find the start of the command sequence 194. If the byte is a command start byte, set the flag that indicates we can start decoding the command sequence 196. Once the command sequence is complete 197 the checksum is verified 198. If the checksum is valid, the cmdReady flag is set 200 to allow for command processing 186. If the checksum is incorrect the process starts again 199.

After a valid command has been received 186, the command data is parsed 187 and the command action is performed 188. The appropriate command response is then placed into the UART transmit queue 189 for future transmission.

The main processing engine for the RF data is performed in the RxProcessing task 214. This task is responsible for examining all the data queues to find valid data to send back to the management process based on the various parameters that have been configured. This task checks to see if the processing of data is enabled 215 and may process both wideband 218 and narrowband 219 signals. The signals at this level consist of sequences of aggregated RF data. Each RF data sample consists of a timestamp when the sample started, the frequency of the sample, the RSSI of the sample and the length of the sample or burst length that is determined by how long the signal was present for. If the wideband receivers are enabled 216, the raw data buffers are processed 220 to determine if valid signals are present. If the narrowband receivers are enabled 217 the raw data buffers for the narrowband receivers are processed 220.

If data is available in the raw data queue 234, get the sample from the queue 235. The RSSI of this sample is calculated 236 and the read pointer of the circular queue is incremented 237. If a burst start was previously detected 238, check to see if the new sample has a low enough RSSI or a long enough timestamp to declare that this burst is finished 239. If the burst has not finished, update the information for the current burst 240. If the burst has finished, store the information about this detected burst in the sensorDataBuf queue 241 and increment the write pointer to this circular buffer 242. If a burst has not yet been detected 238, determine if the RSSI of this latest sample exceeds the trigger threshold to declare a burst start 243. If a burst start is declared, initialize a structure containing burst information 244 and set the flag indicating a burst has started 245.

If bursts have been detected by polling the raw data queue 220, information about these bursts must be sent asynchronously to the management process. Wideband data is processed 218 in a very similar manner to narrowband data 219, however there are some minor differences.

For wideband burst data 218, if there is data in the sensorDataBuf 246 the data is processed 247. The burst information is retrieved from the buffer 248. The average frequency is calculated from the average period of the data 249 that was acquired from the input capture pin. This period is directly related to the frequency of the signal. Based on the calculated frequency, compensate the RSSI value due to frequency variations 250. If the value of the RSSI exceeds the reporting threshold and the length of the burst exceeds the reporting thresholds and the frequency is within the range of the reporting thresholds 251, send a response back to the system by creating a packet 252. The packet is sent as an asynchronous response 253 to the management process.

For narrowband burst data 219, if there is data in the sensorDataBuf 271 the data is processed 272. The burst information is retrieved from the buffer 273. The frequency is known since the frequency of the receivers was known when the sample was taken. If the value of the RSSI exceeds the reporting threshold and the length of the burst exceeds the reporting thresholds and the frequency is within the range of the reporting thresholds 275, send a response back to the system by creating a packet 276. The packet is sent as an asynchronous response 253 to the management process.

Any RF data reported back to the management process is sent if the UART transmit queue has space to hold the data 254. If there is no space, flag an error 255. The header 256, payload 257 and checksum 258 are all put into the queue. The data is then transmitted to the UART in the UART Polling task 179.

The narrowband receivers can be programmed to various frequencies to facilitate scanning of various bands 201. If the scanning receivers are enabled 202, the type of scan to perform is determined 203, 204. If a frequency range scan is to be performed, the start frequency is selected and programmed into the narrowband receiver. As a mixer 129 might be in the receiver chain to facilitate scanning of a larger number of frequencies than would normally be possible with the narrowband receiver 131A, if the mixer is required 206A, 129 the mixer frequency is calculated 207. Then the receiver frequency is calculated 208 and the narrowband receiver 131A, 131B is programmed 209. If the mixer 129 is required 206B the mixer is programmed with the calculated frequency 210. After a short delay to allow for settling time, the task then waits for the dwell time 211 to be completed before switching to the next frequency 212. If the stop frequency has been reached, the frequency range scan is complete. If channel list scan 204 is to be performed, the channels are sequentially scanned 204B.

Rapid Deployment Sensor (RDS)

The Rapid Deployment Sensor (RDS) 111 is a combination of a wireless multi-band RF sensor with batteries, a battery controller, and a wireless mesh node for sensor data backhaul. In the preferred embodiment, a waterproof case 111 houses a sensor 137, wireless mesh node 138, battery controller 113A, batteries 116A and 116B, a charging port 115 and a wired Ethernet port 114.

Battery controller 113A circuit is a printed circuit board which provides termination points for wiring harness 117A, 117B, 117C, and 117D. Output circuit switch 113B controls power for sensor 137 and wireless mesh node 138 independently of charging. Battery charging of 116A and 116B is provided by connection of a 15.0V 1.3 A power supply at the charging port 115. Battery controller 113A provides reverse or shorted input voltage protection, battery charge control, overcharge limiting, a charge state indication LED, dual battery support, and multi-chemistry battery capability.

Ethernet wiring 118B carries data from sensor 137 over wireless mesh backhaul 138 in normal mode of operation. Ethernet wiring 118A provides a wired connection for local configuration of mesh node 138 and sensor 137 prior to attachment to a wireless mesh.

3.0 Data Processing Server Application

Figure 27:
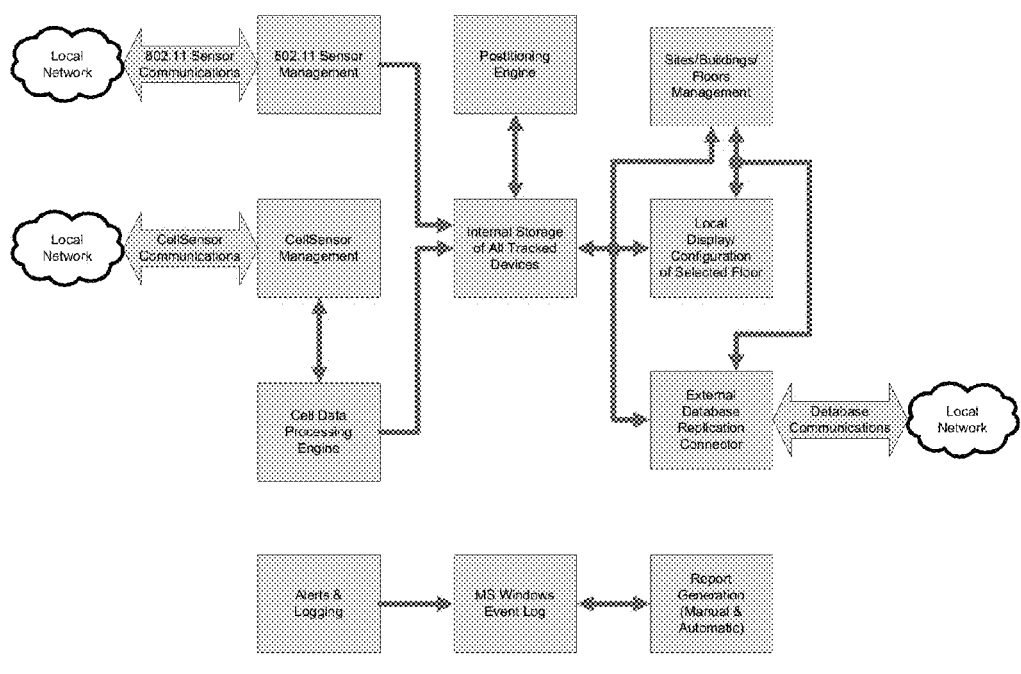
FIG. 27 is a block diagram showing a Data Processing Server Application in accordance with one or more embodiments.

As is shown in FIG. 27, the central data processing server application is responsible for identifying, & positioning the tracked devices of interest from the data obtained from the distributed sensor network. These tracked devices (and their relevant data) are then stored in an external database for use by the presentation layer.

Figure 28:
FIG. 28 is a screenshot showing a user interface screen of a floorplan in accordance with one or more embodiments.

The screenshot in FIG. 28 demonstrates the results of the data processing block, as displayed for the user. In this screenshot, a portion of the floorplan image (401) supplied by the user can be seen in the background. The list of currently Tracked Devices (402) is displayed on the left. A particular tracked cellular call in progress has been selected (404), which has been detected within an Alert Zone (403). This Call has been detected by a number of sensors. A line (406) is drawn between the Tracked Call (404) and the Sensor (405) that has detected the call. In this example the seven lines radiating from the tracked cell call (404) show that this call has been detected by seven sensors in total. The screenshot also shows examples of a number of other Tracked Devices, such as 802.11 Access Points (407) and 802.11 Client Devices (408). The color and shape of the icon used to represent each device indicates the type of device.

Sensor Management

Figure 29:
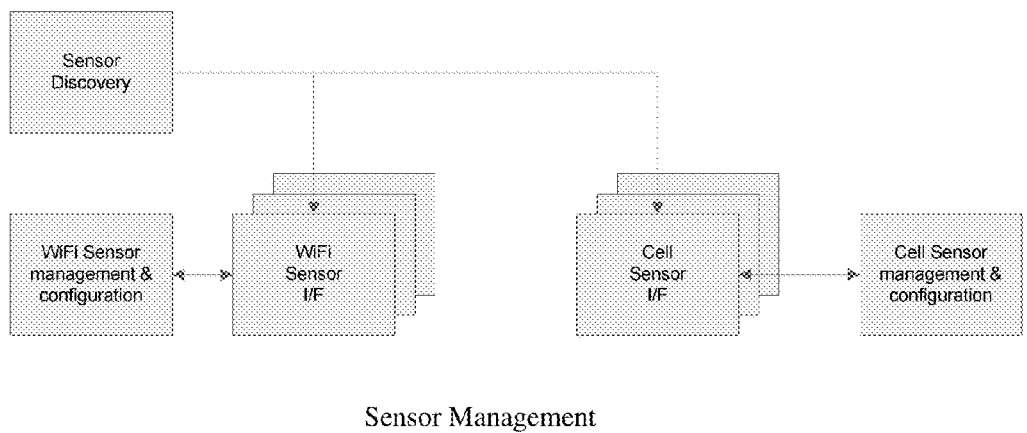
FIG. 29 is a block diagram of a sensor management system in accordance with one or more embodiments.

The sensor management block (FIG. 29) is responsible for direct communications with all the sensors comprising the distributed sensor network.

Sensor Discovery

Figure 30:
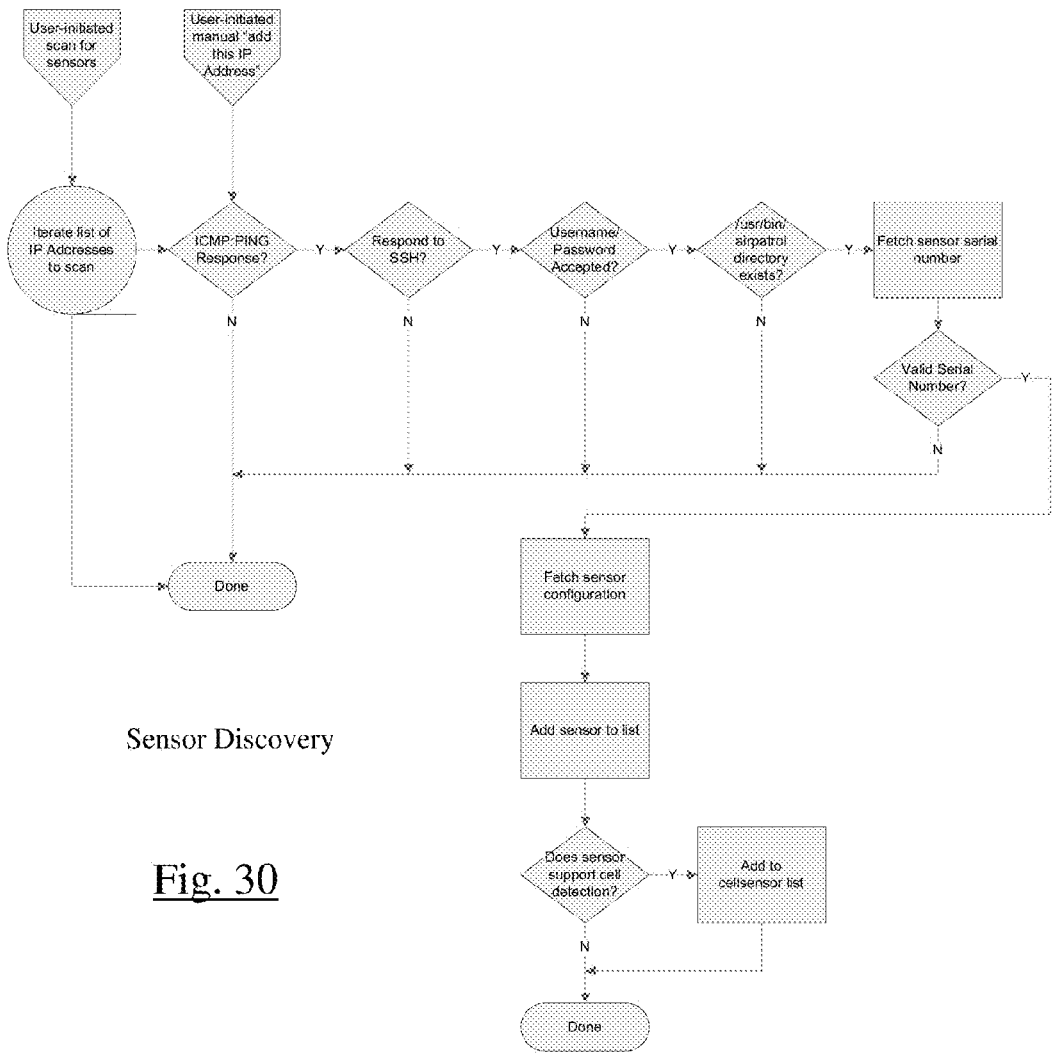
FIG. 30 is a flow chart showing a sensor discovery process in accordance with one or more embodiments.

Sensor Discovery is used to identify and add new sensors to the system. As is shown in FIG. 30, the user may either indicate a range of IP Addresses to scan, or may supply a single IP Address that is to be validated. ICMP:PING networking protocol is used to first check for the existence of a network device at this IP Address on the network. If a valid response is obtained, an SSH connection is then opened with this IP Address, and an attempt to login is made using the default sensor Username and Password. If this login attempt succeeds, then an attempt is made to navigate to the directory in the sensor's file system. If this is successful, then a command may be executed to retrieve the sensor's manufacturing serial number. If this serial number validates properly and matches the sensor's MAC Address, then the sensor's current configuration is read back and the sensor is added to the system.

Additional Sensor Discovery Method

A UDP broadcast and/or TCP/IP Multicast packet can also be sent out that may contain the IP Address of the management server. Each sensor that receives the broadcast or multicast packet may respond in kind back to the management server with their IP Address that they are currently using. The management server may compile a list of all the responses and may then use this list to query each IP Address (using the same method described above) in order to confirm the presence of a proper sensor.

802.11 Sensor Configuration

The sensor configuration user interface gives the user the ability to view and/or reconfigure the following elements:

TABLE 1

802.11 Sensor configurable elements

| | | |
|---|---|---|
| R | | Sensor Model |
| R | | Sensor Firmware Version Number |
| R | | Sensor Uptime (time it was last rebooted) |
| | W | Upgrade Sensor Firmware Image |
| | W | Reboot Sensor |
| R | | Sensor MAC Address |
| R | W | Enable/Disable Automatic IP Address assignment via DHCP network protocol |
| R | W | Sensor Network IP Address |
| R | W | Sensor Network Subnet Mask |
| R | W | Sensor Network Gateway Address |

802.11 Data Processing

The sensors are polled periodically in order to retrieve a list of all 802.11 devices seen by that sensor. The sensor returns a list of Access Points (which includes the MAC Address, SSID, Channel, & security mode) and a list of Clients (which includes the MAC Address, whether it is in Adhoc mode, and the MAC Address of the Access Point that the client is associated with—if any). The list also contains an indication of the signal strength (RSSI) of transmissions received from each device. Devices are indexed in the Tracked Devices list by their unique MAC Address. This data processing block attempts to look up the entry for each device in the list from the list of Tracked Devices. If an entry is found, it is updated with this new data. If no entry is found, then an entry is created.

Cell Data Processing

Figure 31:
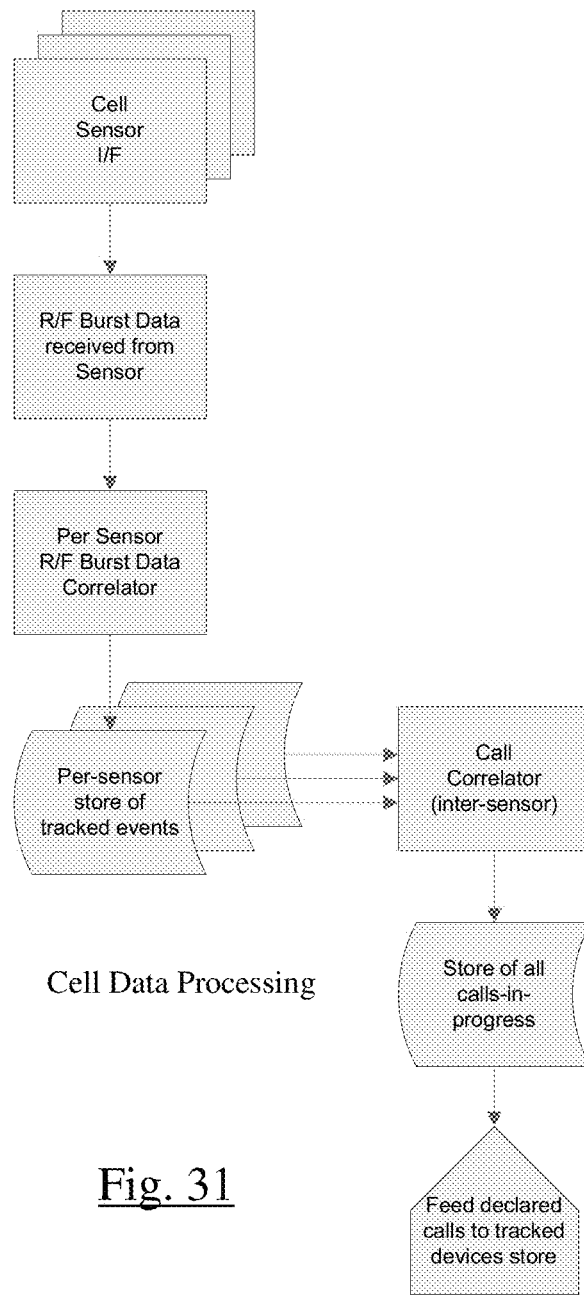
FIG. 31 is a block diagram showing a cell data processing system structure in accordance with one or more embodiments.

As is seen in FIG. 31, each sensor sends information summarizing each burst of R/F energy that it detects. These R/F bursts are identified with their burst length, frequency, signal strength, and time of reception. For each R/F burst, the data from that sensor is grouped into R/F events. Bursts are compared to all events being tracked for that sensor. If the frequency falls within a configurable frequency threshold and within a configurable time threshold, then the burst is added to a previously tracked event, and the signal strength added to the signal strength averaging buffer for that event. If the burst does not match any currently tracked events for that sensor, then a new tracked event is added to the list.

As new tracked events are added to the list for each sensor, the tracked events from all the sensors are then compared. If the average frequency falls within a configurable frequency threshold and within a configurable time threshold, then the individual tracked events are grouped together into a single call-in-progress. The entire list of calls in progress is periodically used to refresh the central tracked devices list. The call list is also parsed periodically in order to determine when the last seen burst of energy was detected for each call. If no R/F bursts have been seen for the call for a particular threshold of time, the call is declared as completed and the tracked devices list updated.

The cell data processing engine is described in more detail below:

1. A CellSensor detects a signal and sends serial data at 115200 baud data over an Ethernet connection. This data consists of one or more samples from the RF domain. Each sample consists of an RSSI reading, a timestamp, a frequency, a burst length, a peak RSSI and a bandwidth indicator. Currently only the timestamp, frequency, burst length and RSSI are used in the data processing. For a full explanation of the protocol, see the document 'AirPatrol CellSensor Software Interface.pdf'. Essentially, configuration commands are sent to the sensor to configure thresholds and ranges then a start command is issued. After this, any time the CellSensor detects RF, packets are sent back to AirPatrol Enterprise for processing. This may be quite a bit of data in a busy environment and is an indication that this current architecture is not scalable. This is a separate issue from the ones addressed in this document.
2. New data is handled in CCellSensorManagementProxy::ProcessCellSensorDetectionActive( ). This message handler looks up the sensor in the CCellSensorManagementProxy::m_CellSensors map and then calls CCellSensorDataBase::ProcessNewData( ).
3. The first sample received may instantiate a 'CellSensorEvent' and an associated entry in the CCellSensorDataBase::m_EventMap. The event map stores a list of events associated with a given CellSensor indexed by the MAC address of the CellSensor. The CellSensor event is stored in a CCellSensorEvent class that contains information about the event as well as functions to access, modify and classify the event.
4. The next sample received from the same sensor may either create another 'CellSensorEvent', or if it is within a set of bounds (TestEventWithinBounds( . . . )) to an existing event in the list, it may be processed by the existing event's functions to filter the information received. (i.e. it may average the samples together and keep track of the initial received time, last seen time, number of samples, etc). A single CellSensor may create a new event for every sample that does not meet the restrictions in the function TestEventWithinBounds. This means that if the frequency changes too much or the time between samples is too great, a new event may be created.
5. CCellSensorDataBase::UpdateEventList( ) called from ProcessNewData( ) updates the single 'CellSensorEventList' for a cell sensor with the new data, which may be a new event, or an existing event that is within the bounds that are tested for by CCellSensorEvent::TestEventWithinBounds( ) in the CCellSensorEvent::UpdateEvent( ) call for the event.
6. The call map in CCellSensorDataBase::m_CallMap is indexed by a unique ID (essentially a number in the same format as a MAC address) and entries for a call are created by grouping together events from multiple sensors when CCellSensorDataBase::UpdateCallMap( ) is called from various places in the code.
7. UpdateCallMap calls the CCellSensorEvent::TestCallEventWithinBounds( ) function to determine how events from various sensors are grouped together into calls.

8. The function CCellSensorDataBase::UpdateFloorPlanList is used to insert new information into a list that eventually gets sent to the FloorPlan for processing.
9. Data that is destined for the floor plan eventually gets sent in the function CCellSensorManagementProxy::PostInformationToFloorPlan( ). This function creates a shadow of the call map and posts it to the message queue using WM_CELL_SENSOR_DETECTION_FOR_FLOORPLAN.
10. CAPMFloorPlan::ProcessCellSensorDetectionActive receives the shadow call map and processes it accordingly. Creating the 'cloud' effect when required and calling the CCellPhoneNodes::ProcessCellSensorResponse( ) to update the node list accordingly.
11. Periodically, a timer fires that calls CCellSensorManagementProxy::ProcessCellSensorEventCleanup that deletes old calls (event maps, event lists etc) out of the internally managed database.

Site Management

Figure 32:
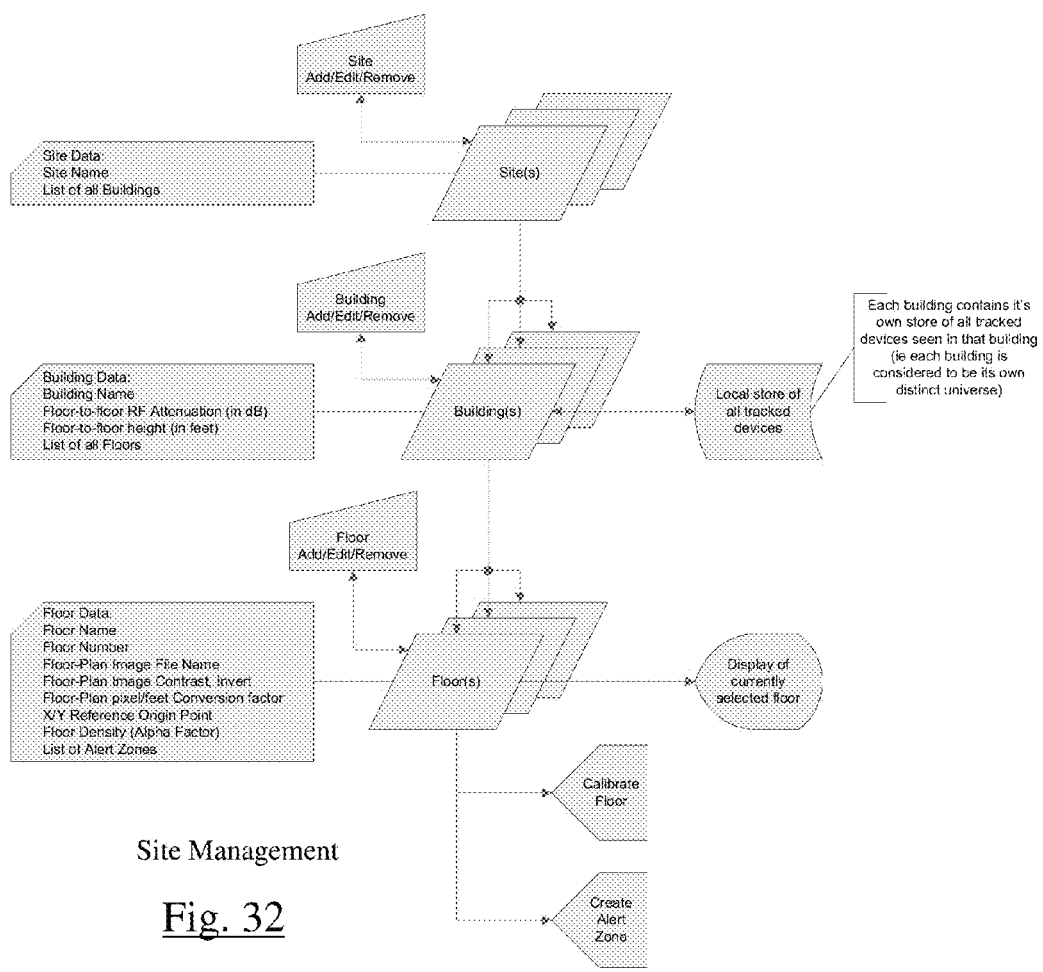
FIG. 32 is a block diagram showing a site management information tree in accordance with one or more embodiments.

Referring to FIG. 32, the user must configure the system with a representation of the sites, buildings, and floors that the deployed sensors have been installed in. This allows the system to translate the information received from the sensors into 3-dimensional space. Essentially, a site can be thought of as a group of one or more buildings. A building can be thought of as a group of one or more floors, each one on top of the other.

In order to keep the data processing simpler, each building is considered to be its own distinct universe. In other words, each building contains its own list of sensors and tracked devices, and lists of signal strengths seen for these tracked devices. No comparisons are made between buildings, even if the same tracked device can be seen by the sensors from adjacent buildings.

In order to display an image that is a representation of physical space, the user is expected to supply a floor-plan image of each floor in each building. This floor-plan is then used as a background image for the display of all the tracked devices on that floor. The floor-plan image also allows the user to accurately indicate the position of each sensor, using the floor-plan image as a frame of reference.

Floor-Plan Calibration

Figure 33:
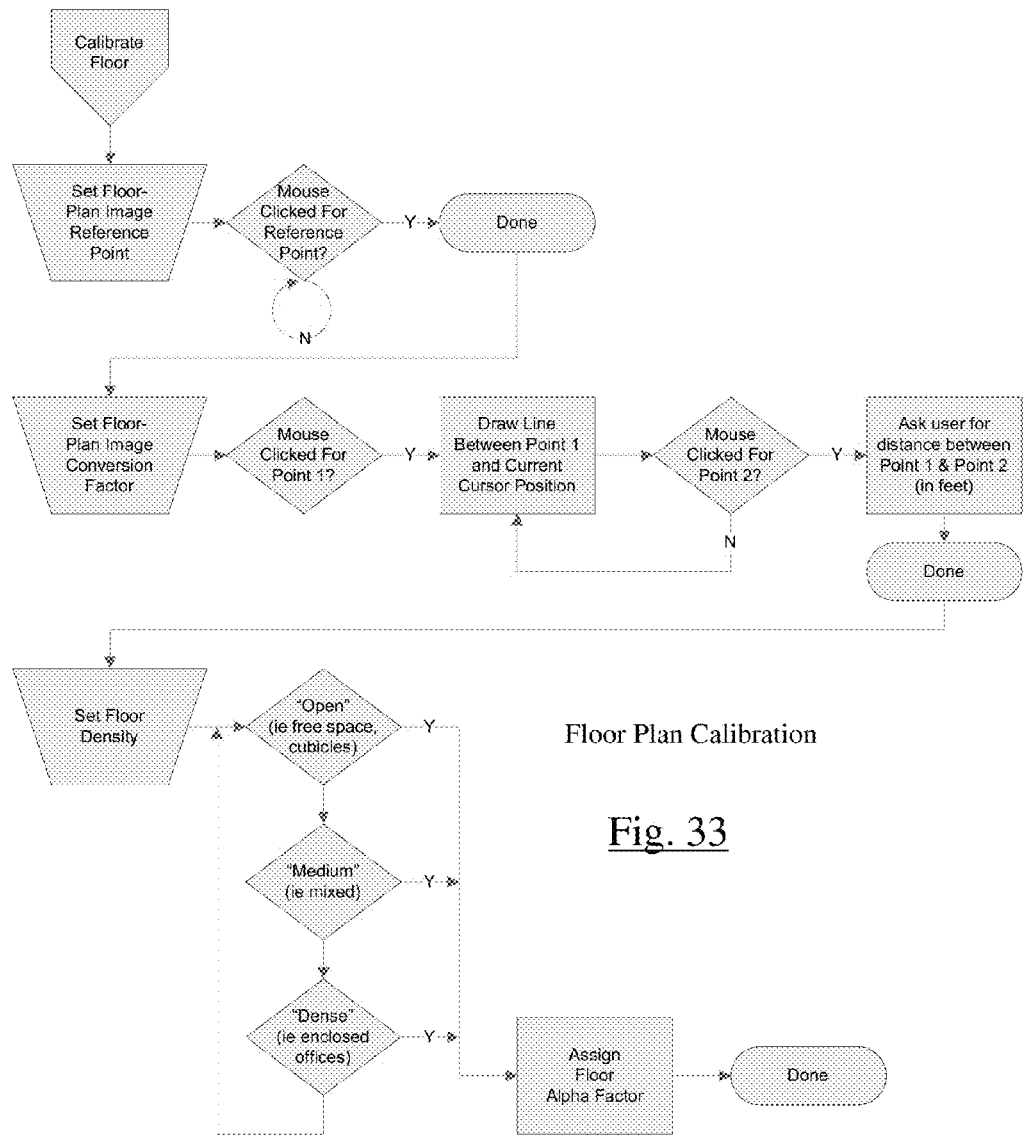
FIG. 33 is a flow chart showing a floor plan calibration system in accordance with one or more embodiments.

Referring to FIG. 33, in order for the system to utilize the supplied floor-plan image, it must be calibrated so that the system knows the scale (i.e. pixels to feet) of the image, as well as other pertinent information regarding the physical space that the image represents. The 'scale' of the image is calibrated by having the user click on two points in the image, and then supply the number of feet between these two points in the real world. This establishes the "pixels to feet" conversion factor for this image. In addition, the user is asked to set a reference point for the image. This point, in conjunction with the pixels to feet conversion factor, then allows the system to identify tracked devices as being "on a particular floor, X/Y feet from the reference point".

Lastly, the user is also asked to identify the type of space that dominates this floor, i.e. is it predominantly "open space" (such as cubicles or an auditorium), is it "dense" (such as a collection of enclosed offices), or is it a mix of the two. This setting allows the system to make a guess as to the rough signal attenuation as signals transmitted by the tracked devices are received by the sensors on that floor.

Alert Zones

Figure 34:
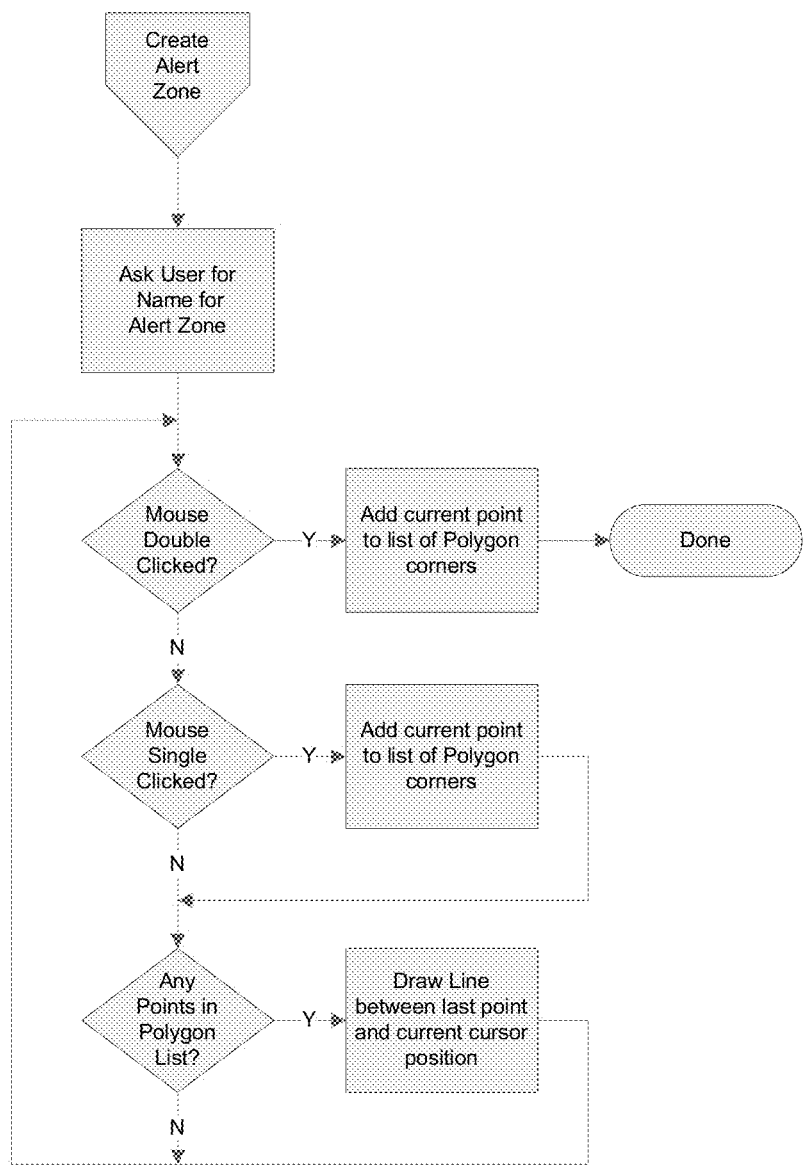
FIG. 34 is a flow chart showing creation of alert zones in accordance with one or more embodiments.

Referring to FIG. 34, in many situations, users of the system may only be concerned with what is happening within their own physical office space. However, the sensors within their office space may receive information from tracked devices both within and without of their space. Therefore the user has the ability to identify particular "regions of interest", and have the system ignore tracked devices outside of these regions of interest. The devices may still be tracked (so that their position can be reliably determined), however no alerts may be generated for these tracked devices. Hence the identification of these regions of interest as Alert Zones.

The user creates these Alert Zones by drawing a complex polygon on top of the floor-plan image that they have supplied. They do so by "clicking" on each corner point in the region of interest. The system then connects these points by lines in order to create a complex polygon that identifies the Alert Zone. Each Alert Zone is drawn in a different color, and can optionally be drawn with a cross-hatched pattern within the polygon so as to make it stand out better on the background floor-plan image.

Virtual Shield Zone

A second type of zone (created using the same method as for Alert Zones) can be used to restrict the use of 802.11 wireless networking to within the zone only. Any 802.11 device that is detected outside of this zone may be added to a list of MAC Addresses to block. This list is then passed to the publicly available configuration interface of a third party firewall in order to dynamically create temporary "block" rules in the firewall, effectively preventing these 802.11 devices from obtaining a connection through to the wider network. In situations where the third party firewall rules require IP Addresses instead of MAC Addresses, the translation is made by comparing the list of MAC Addresses to the ARP table on the firewall.

Display of a Selected Floor

In order to display for the user all of the tracked devices in the system, in a frame of reference that is more easily understood by the user, the user has the ability to select individual floors for display in a graphical viewer.

This graphical viewer may display the user-supplied floor-plan image for that floor and draw any created Alert Zones on top of this floor-plan image. The resulting combined image becomes the background for the graphical viewer. Each sensor and tracked device (or a selected subset of tracked devices based on device type) is then shown on top of this background image using an icon whose shape and color gives an indication of the tracked device type. The user also has the option of selecting device type specific information that may be displayed as text next to the icon representing the device's position (e.g. MAC address for a tracked 802.11 client, SSID for a tracked 802.11 access point, or call start and end time for a tracked cell call).

In addition, lines can be drawn between each tracked device and the sensors that have seen that tracked device. These lines are drawn in the color of the icon representing the tracked device. Since these lines can be distracting if there are a large number of tracked devices for a particular floor, the user has the option of configuring the system to display all signal strength readings, only those for a particular selected device or sensor, or only those for the device that the user has temporarily positioned their mouse cursor over.

Lastly, modifiers can be drawn on top of each device's icon that indicate the state of the particular device. A large red X is drawn over devices that are offline (i.e. no longer detected). Any 802.11 access points that are detected may be drawn with a small padlock symbol above the lower right corner of the icon if that particular access point is configured to use some form of 802.11 authentication and encryption. If a particular 802.11 client has been detected to be associated with an access point that is also being tracked in the system, then a dashed line is also drawn indicating that associated state.

This two dimensional graphical representation of the devices that are being tracked on that floor can be zoomed in or out, panned left, right, up, or down in order to more easily see each of the tracked devices.

In some situations, the calculated position of a device may tend to drift over time in a particular area (such as for a detected cellular call where the transmit power is changing frequently over time, or for an 802.11 client device where the signal is subject to temporary fades due to constructive and destructive interference patterns). An alternative display mode can be used in situations such as this in order to obtain a more precise indication of the actual position of the tracked device. A FIFO list is maintained that contains a sample of each device's current position, that is updated periodically (typically once a second). Then, instead of drawing the device using a larger icon at its current known position, a small dot is rendered on the display at each of the last known sampled positions. The resultant group of dots may have an apparent concentration at the expected actual location of the tracked device. The dots themselves can all be displayed to the user, allowing them to visually deduce a more accurate position of the transmitted device, or alternatively the sampled locations can be statistically analyzed in order to mathematically deduce a more accurate position for the transmitting device.

Figure 35:
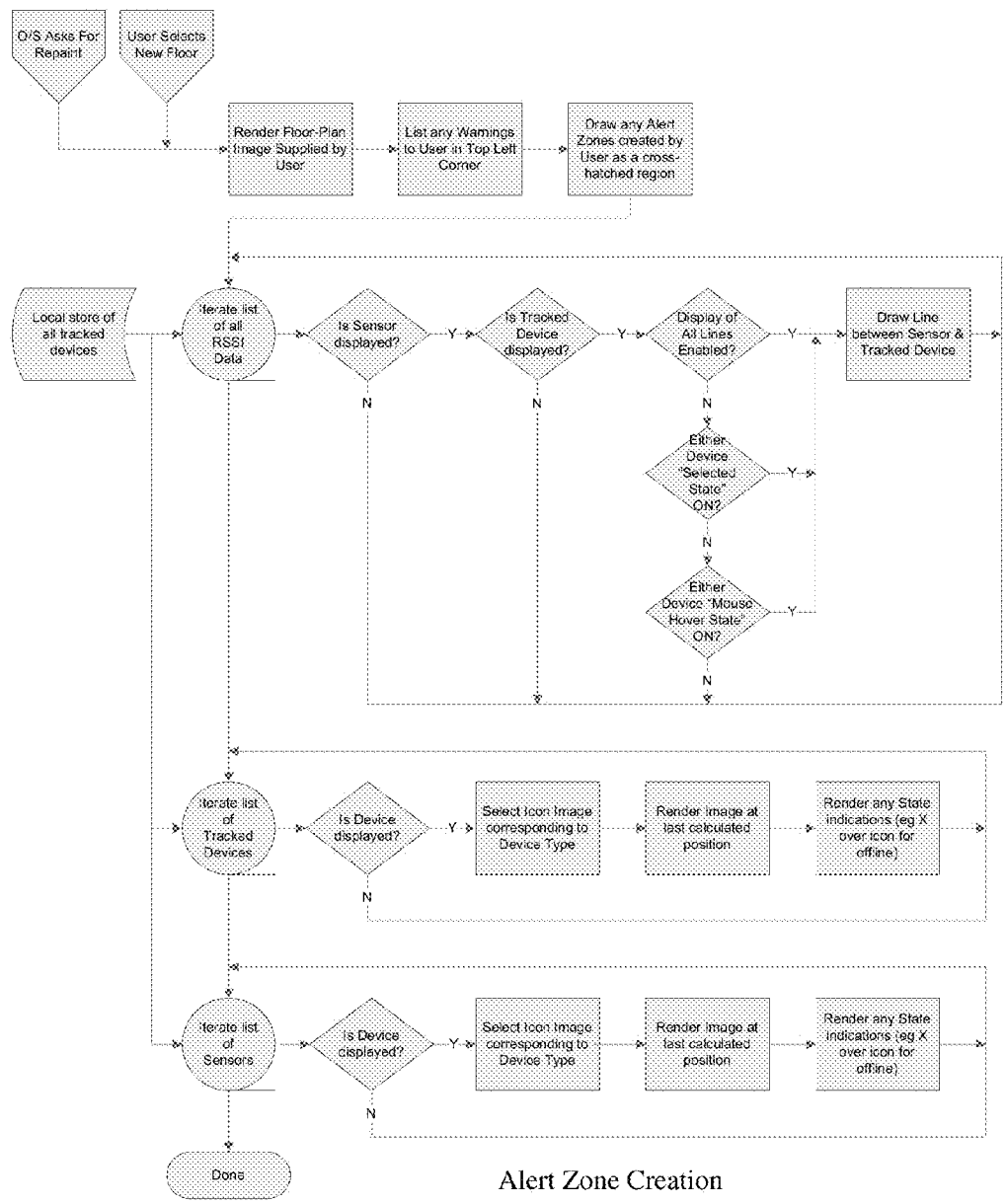
FIG. 35 is a flow chart showing the displaying of tracked devices for a particular floor in accordance with one or more embodiments.

Referring to FIG. 35, in order to more easily facilitate navigating between the various sites, buildings, and floors that the user has created in the system, a "site tree" is shown beside the floorplan viewer. The site tree uses a branched list type of display that shows the name of each of the sites, buildings, and floors. For each tree branch corresponding to a floor, a branched list of the various tracked device types is shown. Beneath each of these is a list of each one of the tracked devices of the particular device type. Clicking on a particular floor may cause that floor to be displayed. Clicking on a specific tracked device may cause that device's floor to be displayed, and the display zoomed and centered on the specific device. This "selected device" is then indicated with a green circle drawn around it.

The user can interact with the floor display view in order to learn more about the tracked devices being shown, and/or configure the devices and sensors shown there.

Figure 36:
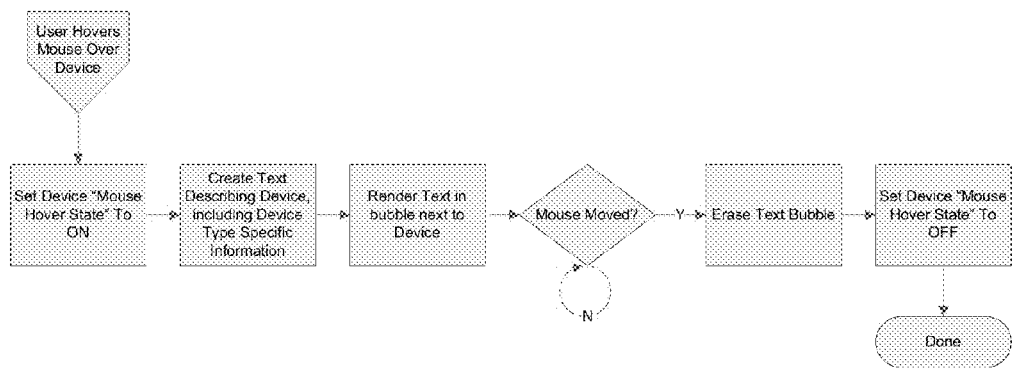
FIG. 36 is a flow chart showing an operation of displaying information in response to a mouse hover in accordance with one or more embodiments.

FIG. 36, shows that the user can quite quickly learn the details about particular tracked devices or sensors by "hovering" their mouse cursor above the icon for the device. This may cause a small text bubble to be displayed next to the mouse curser that lists all the known information about that device or sensor.

Figure 37:
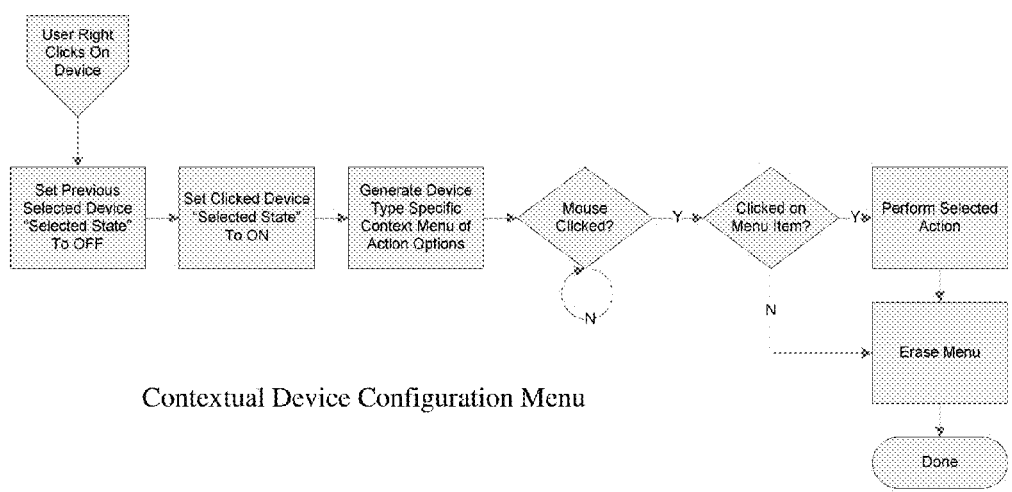
FIG. 37 is a flow chart showing an operation of displaying contextual menus in accordance with one or more embodiments.

Referring to FIG. 37, if the user right-clicks their mouse while the mouse cursor is above a particular device, then a menu of options may be shown for that device. This menu allows the user to do such things as delete a particular tracked device, configure the device to be "known" (i.e. not a threat), or fix a particular device in place (effectively causing the positioning engine to no longer reposition that tracked device).

Figure 38:
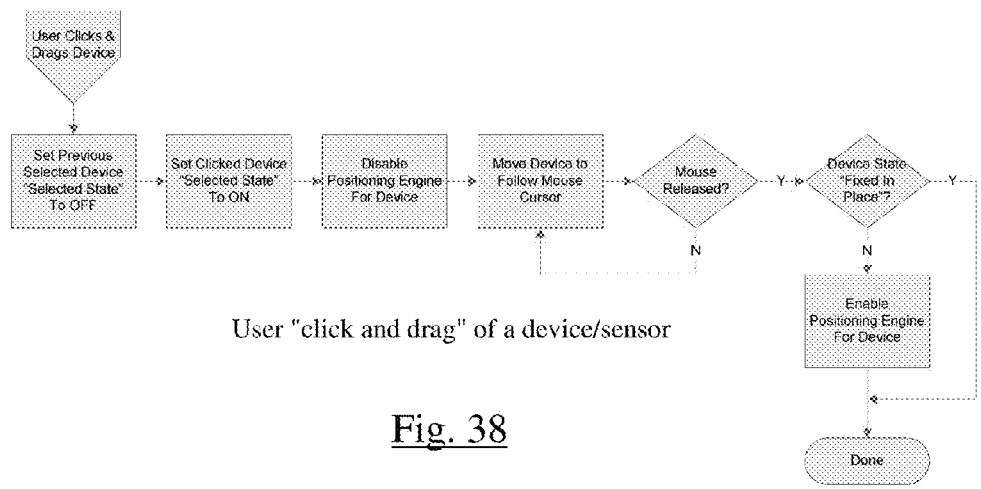
FIG. 38 is a flow chart showing an operation of clicking and dragging of a device/sensor in accordance with one or more embodiments.

Referring to FIG. 38, the user has the ability to click and drag any device that is being displayed. They may do so in order to position the icons representing their sensors to the appropriate location on the floor-plan image. They can also do so to drag a particular device that they have configured to be "fixed in place" (i.e. not be processed by the positioning engine).

External Database Replication Connector

The system may connect to an external 3$^{rd}$ party commercial database for more permanent storage of the devices being tracked in the system. The system uses an internal list of these tracked devices for performance reasons, however an external database allows other aspects of the overall system to access the list of tracked devices.

Periodically, a process runs that copies the internal list of tracked devices and then replicates/updates this information in an external database. In addition, all sites, buildings, floors and their respective configurations are also stored in the external database as the user edits and updates these configurations. In order to simplify and abstract the interface to this commercial database, Microsoft's ODBC (Open DataBase Connectivity) API is used.

Device Positioning Engine

Figure 39A:
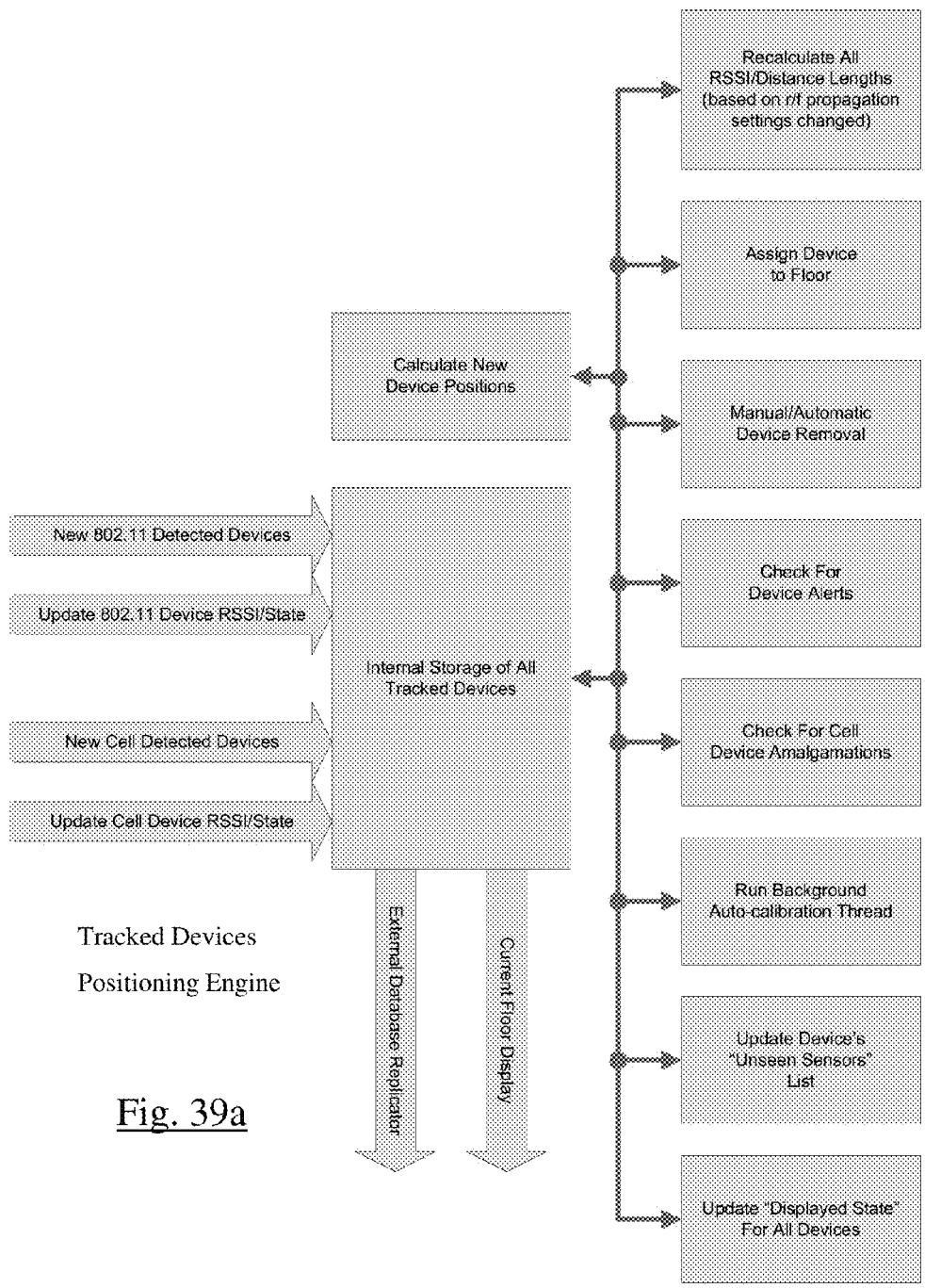
FIG. 39a is a block diagram showing a tracked devices positioning engine in accordance with one or more embodiments.

Referring to FIG. 39a, the Positioning Engine is responsible for calculating each tracked device's position based on the signal strength readings obtained from each device that has detected the tracked device. The positioning engine uses a process commonly referred to as trilateration. Trilateration is the process of determining something's position geometrically by using the exact distance to the device from three known fixed reference points in space. These three distances may converge on a single unique point in space, as long as three (or more) reference points are used and the distances accurate. Although simple in principle, accurately applying this principle to a real-world situation is not.

Update Tracked Device Signal Strength (RSSI)

Each time that a Tracked Device's RSSI value from a particular sensor is updated, that RSSI value is converted to an expected distance. This conversion is loosely based on the well known formula that in free (open) space RF energy loss (Transmit—Receive power) drops according to one over R squared, where R is the distance between the two devices. In this case, the free space equation is used for distances less than 20 feet, given that for distances shorter than this the sensor is likely line-of-sight from the transmitting device. For distances greater than 20 feet, it is assumed that the signal is also being attenuated by building walls, cubicle walls, decorations, plants, people, etc. Therefore, if the distance is beyond 20 feet the calculation becomes one over R to the power of alpha. The value of alpha that is used ranges between 2 and 4. The exact value is dependent on the building floor's configuration assigned by the user (i.e., whether they have selected an "open", "closed", or "mixed" environment for this floor).

Calculate New Device Positions

All Tracked Devices' positions are periodically updated. For each tracked device, all known sensor readings for that device are compared to the device's current position. The two dimensional weighted vector sum of the differences between the distance from the sensor to the device's current position, and the expected distance based on the received signal strength (RSSI). The resultant sum gives a vector direction in which the device is to be moved. This vector is capped in magnitude for both the X and Y direction, and subsequently added to the device's current position in order to yield the new position for this pass.

Assign Device to Floor

The list of Tracked Devices is periodically checked in order to determine the expected floor for each device. All known signal strength (RSSI) readings for each device are compared. The assigned floor for the sensor that has the highest RSSI reading for that device is used to assign a floor to that tracked device. This is based on the assumption that floor to floor attenuation is significantly higher than the in-floor signal attenuation.

Manual/Automatic Device Removal

The user is given the option of deleting some or all of the current Tracked Devices, based on the device types and discovery time of the devices. In addition, the Tracked Devices list is periodically checked for size. Since the number detected and tracked cell calls may be constantly growing, a user configurable maximum number of tracked cell calls is implemented. If the maximum number of cell calls exceeds this number, then the oldest detected tracked cell calls are deleted in order to bring the total number of tracked cell calls back to the enforced maximum.

Check for Device Alerts

The list of Tracked Devices is periodically inspected to determine if any device state change (e.g., online/offline transitions, initial device position stabilized, transition into or out of an Alert Zone, etc) has triggered an alert. If so, this alert is logged.

Check for Detected Cell Call Amalgamations

Given that a particular cellular device can broadcast on widely disparate cellular frequencies, these disparate frequencies can result in multiple tracked cell calls being declared for a particular physical cell phone. The tracked list of cell calls I periodically inspected in order to determine whether multiple cell calls are being positioned within the locationing accuracy of plus or minus 15 feet (this value is user configurable). If multiple calls are positioned within this distance of each other, and if the initial calls' positions have stabilized (i.e., the incremental positional update amount from the last calculation of device's positions is below a configurable threshold), then these calls are amalgamated together. This consists of keeping the tracked device with the newest received data update and deleting all other amalgamated cell calls.

Update Tracked Devices' Unseen Sensors list.

The "Calculate New Device Positions" routine can be optionally configured to also include effects from sensors that should have been close enough to see the transmitting device, but reported no RSSI readings for that device. A small repulsion (or negative positional vector) is added to the weighted vector sum that is calculated for every pass of the "Calculate New Device Positions" routine. This repulsion is based on the distance between the sensor that did not report an expected RSSI value for that transmitting device. The Tracked Devices list is periodically scanned in order to compare the distance from each tracked device to all known sensors. If the distance is below a threshold that approximates the maximum distance over which a signal can be detected (based on the configured attenuation of the floor type and the minimum signal/noise ratio of the sensors), and if this sensor has not reported any RSSI readings for this detected device, then the sensor is added to an "unseen sensors" list for that particular Tracked Device.

Update Tracked Devices' Display State.

The user is capable of selecting what types of devices they wish to have displayed via the selected floor display. The user can select the types of devices to display or not display, the minimum number of sensors that must be detecting a device in order to have it displayed, the minimum positional accuracy (expressed in percent) for a device to be displayed, whether a device may be displayed before its initial position has stabilized (i.e., its velocity dropped below a user configurable threshold), and whether to show devices from other floors of the same building. The list of Tracked Devices is periodically scanned in order to set the displayed/not displayed state of each device, based on this list of user configurations.

Run Background Auto-Calibration Process

The process of converting a received signal strength (RSSI) value from a sensor to an expected distance to a tracked device is highly dependent on the transmitted signal strength from that device, which is of course unknown. Therefore, a background process is launched that periodically attempts to make a best-guess of the transmit power for that device. For each tracked device in the system, an iterative process steps through the possible transmit powers for that tracked device. For each pass, the resultant vector sum of the difference between expected and actual distance is calculated (as in section Calculate New Device Positions), which is referred to as the positional error value. The transmit power that resulted in the smallest positional error value is then kept as the best-guess transmit power for that device. This positional error is then also converted to a percentage value (in the range of 0% to 100%) and the Tracked Device data is updated.

Identification of Floor Areas of Localized High or Low RF Signal Attenuation

Figure 39B:
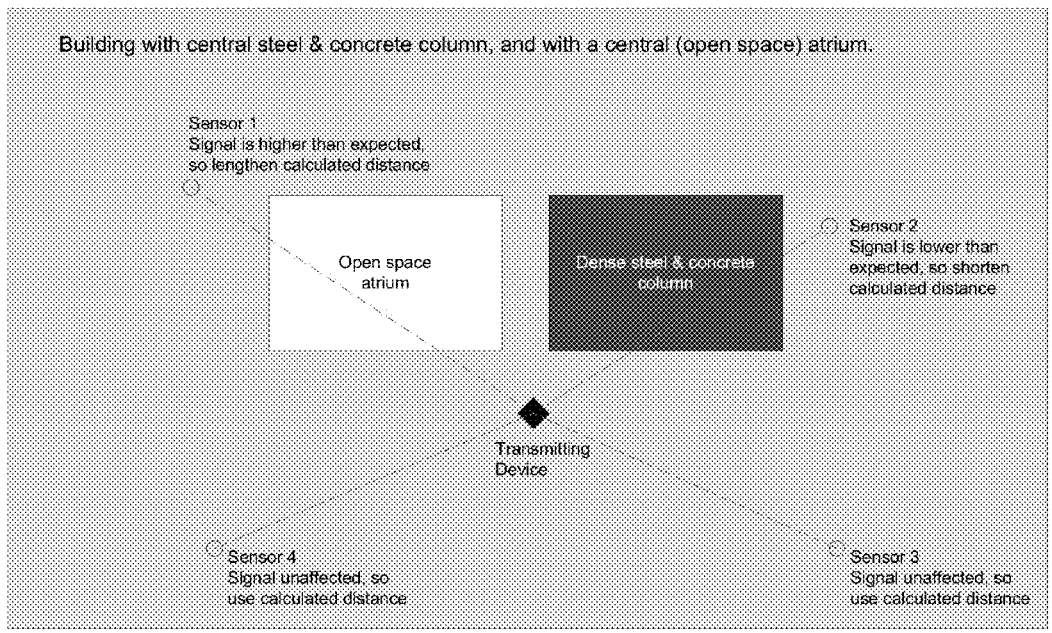
FIG. 39b is a block diagram showing a floor layout with various obstructions in accordance with one or more embodiments.

Referring to FIG. 39b, the floor configuration contains an alpha factor (indicating how open or dense the floor layout is) that is used across the entire floor. However, certain types of building construction can have significantly different RF properties. A central building atrium may be essentially free space. A very dense concrete central pillar (containing bathrooms, elevator shafts, etc.) can heavily reduce or even block entirely RF signals. The user is given the option of identifying on the floorplan such regions. They do so by drawing an outline around the region with a series of mouse clicks, each click point connected by a line. The user may then identify whether the region is very open or very dense.

As the new device positions are being calculated (described above), if a line joining the current device position and the sensor that saw that device crosses one of the identified regions, the current RSSI to distance converted value may be either shortened or lengthened depending on whether the regions is comparatively less dense or more dense than the surrounding floor environment. The amount of lengthening or shortening may be proportional to the relative amount that the line joining the sensor and tracked device spends in the identified region, and may be proportional to the difference between the alpha value setting for the floor and an alpha of 2 (for less dense regions) and 4 (for denser regions). Additionally, the previous calculated amount of lengthening or shortening may be stored and compared to the current value. Very small changes between the previous value and the current value may result in the current value being ignored and the previous value used, in order to prevent oscillations back and forth.

Self-Calibration of Floor RF Attenuation Characteristics

Self-Calibration of Floor 802.11 RF Attenuation Characteristics

The sensors can be optionally configured to periodically throughout the day enter a self-calibration cycle. Each sensor may sequentially send out a small 802.11 packet (an Access Point Beacon packet) at a precise known transmit power level. All other sensors may capture this packet and return its signal strength to the management application. The data processing application may convert these signal strength readings to a distance (described above) and compare this distance to the known distance between the transmitting and receiving sensors. A consistent difference across all sensors is used to tweak the floor's configured alpha attenuation value up or down slightly. The results are also checked in order to detect any significant anomalies (sensors that detect each other that shouldn't be able to, or sensors that don't detect each other that should). Any significant anomalies are reported to the user as a possible sensor placement error on the floorplan.

Self-Calibration of Floor Cellular RF Characteristics

The user may choose a time of limited to no external cellphone usage, typically off-hours. They may initiate a cellular calibration cycle by clicking on a sensor that they may be standing beside, and indicate how far away from that sensor that they may be placing a call from. The user may then proceed to stand beside the sensor that they have indicated, and place a 30 second test cell call. The system, knowing the distance from the sensor, knowing the received RSSI for that call, and assuming a free-space signal path to the sensor, can then calculate the actual transmitted signal strength of the call. The system can then use the received RSSI values for that call from other sensors, convert these signal strength readings to a distance (described above) and compare this distance to the known distance between the transmitting cellphone and receiving sensors. A consistent difference across all sensors is used to tweak the floor's configured alpha attenuation value up or down slightly. This may be done by using phones/carriers in both the 850 MHz and 1900 MHz cellular bands.

Self-Calibration of Floor Cellular RF Characteristics from Cell Base Stations

The sensors may periodically throughout the day enter a cell base station calibration cycle. During this cycle the sensors may momentarily be configured to listen to all nearby cell base stations, and report their signal strength. The system may first analyze the overall pattern of signal strength drops in order to determine a best guess at the direction of the base station. Next, the system may compare each pair of sensors in turn, analyze the distance delta from each sensor to the base station (by knowing its approximate direction), and then comparing the actual signal strength drop to the expected drop (using the distance and the floor attenuation selected by the user). A consistent difference across all sensors is used to tweak the floor's configured alpha attenuation value up or down slightly.

Cellsensor Wide-Band Receiver Noise Floor Compensation

The system may periodically query the sensors for their current noise floor reading and the strongest RSSI of any Out Of Band (OOB) signals detected. This OOB RSSI reading becomes the artificial noise floor for the sensor, since it may be unable to detect and report any In Band cellular data that is below this threshold. The user may be notified of any consistent OOB signal received by a single sensor, or by sensors in a certain region. This may allow the user to ascertain whether any action can be taken to help isolate the sensor from this OOB interference.

Additionally, the sensor may use this information when processing the list of unseen sensors for a particular tracked cell call (described above). If this "unseen sensor" is unseen due to its artificial noise floor being too high, then this sensor may be ignored in the unseen sensors list.

Selective Use of Sensor RSSI Readings

Figure 39C:
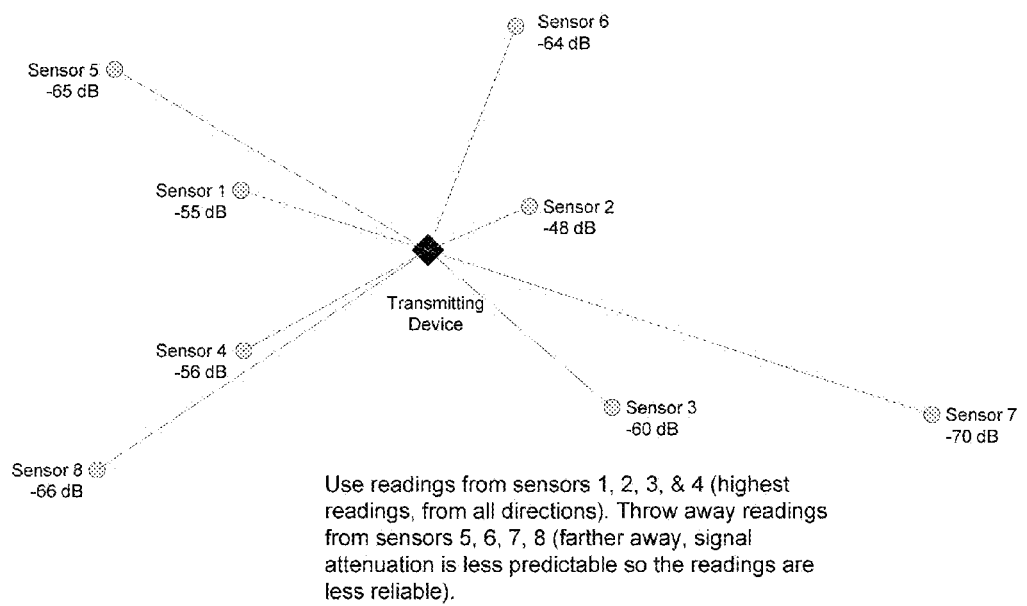
FIG. 39c is a diagram showing a sensor readings for a detected device in accordance with one or more embodiments.

Referring to FIG. 39c, if a large number of sensors are contributing RSSI readings to a particular tracked device, the system may use a limited subset of readings, up to a user configurable number. The system may use two criteria to select readings to use. It may attempt to use the strongest readings (since the weakest readings are less reliable due to the fact that the signal has potentially passed through a greater number of signal attenuators such as walls, filing cabinets, people, etc). The system may also select readings from all directions and may not select a subset of readings from only one or two directions (even if these are the strongest readings).

Alternatively, the system can also be configured to still use all RSSI readings from all sensors. However, greater weight is given to the strongest readings. The weaker readings may be given less weight in the calculation of tracked devices' positions (described above).

Use of Height in Positioning Calculations

In addition to each sensor's position on the floorplan, the user may enter the height of the sensor, as it is mounted on the wall, in the ceiling, etc. The system may also use an estimated height of 30 inches for 802.11 devices (the average height of a desk), and 5 feet 6 inches for cellular devices (the average height of a person's ear). These heights may be used in all position calculations (described above). The estimated heights used for both 802.11 devices and cellular devices are also user configurable, if the user wishes to make allowances for the expectation that all cellphone users are sitting at a desk instead of standing up, for instance.

Use Per-Floor Settings for Floor Height and Attenuation

Currently, the floor spacing and inter-floor attenuation are building settings. These should be made floor settings, as some buildings may not be uniform. Some buildings may have different settings for ground, mezzanine, and then higher floors, for example.

Pre-Placement Algorithm

The core positioning algorithm of WLS works with a small to medium number of sensors detecting and positioning a wireless device, and this positioning works best when the wireless device is within a perimeter formed by the outermost sensors used in the positioning resolution. This algorithm works well with wide-band receivers which have a relatively low sensitivity and limited range. In the case of narrow-band receivers with high sensitivity and long range, it is expected that a large number of sensors (possibly all sensors in a given installation) may detect a wireless transmitting device. In this case, it is desirable to have a pre-placement algorithm to resolve an initial wireless device placement. This initial device placement may then be used to determine a subset of the sensors (detecting the wireless transmitter) to be used for the fine positioning using the existing positioning algorithm. The intent is to provide a faster, more accurate location with minimal impact on computational intensity due to the large number of sensors potentially involved if no pre-placement is performed.

The pre-placement algorithm envisioned is embodied by performing a numerical differentiation and maxima determination on sensor signal strength data. This maxima location determination provides a rough indication of the transmitter location. The transmitter initial position is placed at this maxima location, then used with the top 5 or 6 sensors (by signal strength readings) with the current positioning algorithm for final positioning (as described above).

An alternate embodiment to this pre-placement algorithm is to use a multitude of 'signal directionality vectors' determined by signal strength differences between adjacent pairs of sensors. The vector direction in each pair's case is in the direction of the sensor with the highest signal strength. The relative slope of the signal strength change vector (greatest differences between sensor readings) is an indication of proximity of the transmitter to the sensor pair. A confluence of vector directions and proximity indications may be used to give a pre-placement location determination.

Use of Non-Omnidirectional Antennas with the Positioning Algorithms

Use of Directional Antennas

Figure 39D:
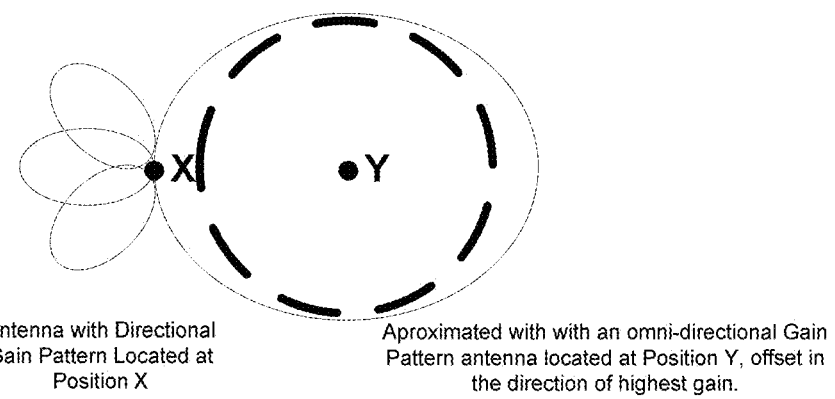
FIG. 39d is a diagram showing directional antenna characteristics and omni-directional antenna characteristics in accordance with one or more embodiments.

Referring to FIG. 39d, the WLS wireless device positioning algorithm works on the assumption of isotropic (equal sensitivity in all directions) antennas used by the sensors used within the system. Omni-directional dipole antennas with low gain fit this assumption quite well, with the exception of reduced sensitivity directly above and below the antenna in the vertical plane. Given that the primary positioning operation of the algorithm occurs within two dimensional horizontal planes, this deviation from an isotropic assumption is not problematic.

The WLS positioning algorithm may be extended to support low to moderate gain directional antennas with gain patterns relatively circular in shape in the horizontal plane. The embodiment of this modification is to approximate the effect of the directional antenna within the algorithm by representing the sensor data received by said directional antenna as data from an isotropic antenna, but shifted from the physical sensor location to a location determined by the facing and gain of the directional antenna. This embodiment allows the isotropic positioning algorithm to be used without internal modifications, simplifying the use of directional antennas.

Use of Sectored Antennas

With the use of 3 or more directional antennas in a sectored array, a directional determination as well as a signal strength reading can be calculated from a sensor device. The directional determination can be calculated by starting with the direction of the peak gain of the antenna sector receiving the strongest reception of a given signal, then modified in the direction of the antenna receiving the second highest signal. The amount of the directional modification may be inversely proportional to the signal level difference between the two antennas, if there is a great difference the direction may be determined to be close to the peak gain of the strongest antenna, and if there is a small difference the direction may be determined to be almost half way between the directions of the two antennas.

Given both a signal strength and a directional indication, the WLS positioning algorithm may be changed to incorporate this information to improve positioning resolution. The signal strength may be used to determine the nominal length of the edge between the detected signal and the detecting sensor, as is done in the standard positioning algorithm. An additional force vector is then added to the node representing the detected signal which is proportional to the angle between the edge at the sensor to the current node plotted position, and the directional vector determined from the sensor sector antenna calculation. This force vector then incorporates the directional information from the sectored antenna in to the positioning calculation of the detected signal source.

Alerts & Logging

Alerts

Figure 40:
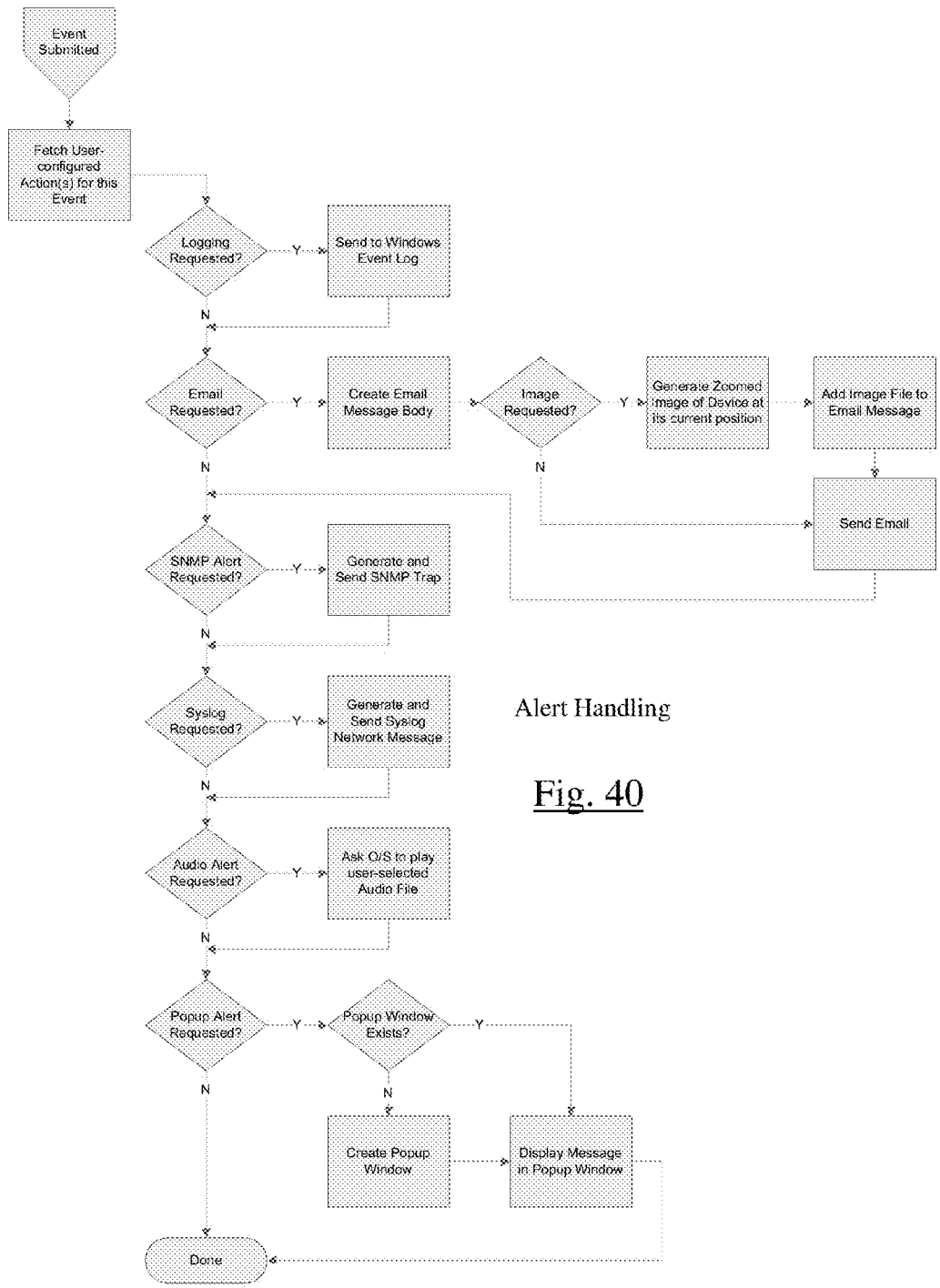
FIG. 40 is a flow chart showing an alert handling system in accordance with one or more embodiments.

Referring to FIG. 40, various types of events throughout the system (such as detection of a new 802.11 device, a sensor going offline, detection of a new cell call, etc) may cause the generation of an alert. The user configures what actions may be taken for the various event types. Each event type also contains an alert type specific text string that describes in more detail the specifics of how, when, and why the alert occurred.

TABLE 2

Event Definitions

| Event ID | Event Name | Event Description |
|---|---|---|
| 256 | Application Startup | Management Application has been started up |
| 257 | Application Stop | Management Application has been shut down |
| 260 | Disk Full | The host computer's hard drive is nearly full |
| 261 | Application Status | All other Management Application status notifications |
| 262 | Application Warning | All other Management Application warnings |
| 263 | Application Error | All other Management Application errors |
| 264 | Email Alert Generation Error | Email Alert Generation failed. Possible causes: Too many concurrent alerts, Email not configured properly, SMTP server problems, etc. |
| 265 | EventLog Error | An event failed to be saved to the Windows Eventlog. The Eventlog is either corrupt, or full and set to not overwrite old events |
| 266 | AP and/or Sensor limit has been reached | The total amount of allowed managed APs and/or sensors has been reached |
| 267 | Tracked Devices limit has been reached | The total amount of tracked devices has been reached |
| 1536 | First detected, not yet positioned | A new rogue/unknown wireless device has been discovered |
| 1537 | Rogue AP Suspected | A new suspected rogue wireless device has been discovered |
| 1538 | Rogue AP Online | A previously discovered rogue/unknown wireless device has come online |
| 1539 | Rogue AP Offline | A previously discovered rogue/unknown wireless device has gone offline |
| 1542 | Positioned inside Alert Zone | A recently discovered rogue/unknown wireless device has been positioned inside of the Alert Zone for this site/building |
| 1543 | Positioned outside Alert Zone | A recently discovered rogue/unknown wireless device has been positioned outside of the Alert Zone for this site/building |
| 1544 | Position not reliably determined | A recently discovered rogue/unknown wireless device could not be reliably positioned (most likely because it could be seen by less than 3 sensors) |
| 1552 | First detected, not yet positioned | A new known rogue wireless device has been discovered |
| 1554 | Known AP Online | A known rogue wireless device has come online |
| 1555 | Known AP Offline | A known rogue wireless device has gone offline |
| 1556 | No Alert Zones defined | A recently discovered Known Rogue AP has been positioned. No Alert Zones have been defined for this site/building |
| 1558 | Positioned inside Alert Zone | A recently discovered Known Rogue AP has been positioned inside of the Alert Zone for this site/building |
| 1559 | Positioned outside Alert Zone | A recently discovered Known Rogue AP has been positioned outside of the Alert Zone for this site/building |
| 1560 | Position not reliably determined | A recently discovered Known Rogue AP could not be reliably positioned (most likely because it could be seen by less than 3 sensors) |
| 1568 | HW Sensor Detected | A new wireless sensor has been discovered |
| 1570 | HW Sensor Online | A previously discovered wireless sensor has come online |
| 1571 | HW Sensor Offline | A previously discovered wireless sensor has gone offline |
| 1584 | First detected, not yet positioned | An Adhoc wireless network has been detected |
| 1585 | Adhoc Offline | An Adhoc wireless network has gone away |

TABLE 2-continued

Event Definitions

| Event ID | Event Name | Event Description |
|---|---|---|
| 1586 | No Alert Zones defined | A recently discovered Adhoc Network has been positioned. No Alert Zones have been defined for this site/building |
| 1588 | Adhoc Online | An Adhoc wireless network come back online |
| 1589 | Positioned inside Alert Zone | A recently discovered Adhoc Network has been positioned inside of the Alert Zone for this site/building |
| 1590 | Positioned outside Alert Zone | A recently discovered Adhoc Network has been positioned outside of the Alert Zone for this site/building |
| 1591 | Position not reliably determined | A recently discovered Adhoc Network could not be reliably positioned (most likely because it could be seen by less than 3 sensors) |
| 1792 | First detected, not yet positioned | A new Known Client has been discovered |
| 1793 | Known Client Online | A previously discovered Known Client has come online |
| 1794 | Known Client Offline | A previously discovered Known Client has gone offline |
| 1795 | No Alert Zones defined | A recently discovered Known Client has been positioned. No Alert Zones have been defined for this site/building |
| 1797 | Positioned inside Alert Zone | A recently discovered Known Client has been positioned inside of the Alert Zone for this site/building |
| 1798 | Positioned outside Alert Zone | A recently discovered Known Client has been positioned outside of the Alert Zone for this site/building |
| 1799 | Position not reliably determined | A recently discovered Known Client could not be reliably positioned (most likely because it could be seen by less than 3 sensors) |
| 1804 | Known client has connected to an unauthorized device | A previously discovered known client has connected to an unauthorized device |
| 1808 | First detected, not yet positioned | A new rogue/unknown client has been discovered |
| 1809 | Rogue Client Online | A previously discovered rogue/unknown client has come online |
| 1810 | Rogue Client Offline | A previously discovered rogue/unknown client has gone offline |
| 1811 | No Alert Zones defined | A recently discovered rogue/unknown client has been positioned. No Alert Zones have been defined for this site/building |
| 1813 | Positioned inside Alert Zone | A recently discovered rogue/unknown client has been positioned inside of the Alert Zone for this site/building |
| 1814 | Positioned outside Alert Zone | A recently discovered rogue/unknown client has been positioned outside of the Alert Zone for this site/building |
| 1815 | Position not reliably determined | A recently discovered rogue/unknown client could not be reliably positioned (most likely because it could be seen by less than 3 sensors) |
| 2304 | CellSensor Detected | A new CellSensor has been discovered |
| 2305 | CellSensor Online | A previously discovered CellSensor has come online |
| 2306 | CellSensor Offline | A previously discovered CellSensor has gone offline |
| 2307 | First detected, not yet positioned | Cellular activity Detected |
| 2308 | No Alert Zones defined | Recently detected cellular activity has been positioned. No Alert Zones have been defined for this site/building |
| 2309 | Positioned inside Alert Zone | Recently detected cellular activity has been positioned outside of the Alert Zone for this site/building |
| 2310 | Positioned outside Alert Zone | Recently detected cellular activity has been positioned inside of the Alert Zone for this site/building |
| 2311 | Position not reliably determined | Recently detected cellular activity could not be reliably positioned (most likely because it could be seen by less than 3 sensors) |
| 2312 | Cell Station Call End | A cell station call end event is detected |
| 2313 | Too many Cell Stations | There are too many Cell Stations detected. The oldest detected events have been deleted |
| 2314 | Too many Cell Stations | There are too many Cell Stations detected. The oldest detected events have been deleted |

Email Action

The email alert action may use the textual description that accompanies the alert to create the text of an email. This email may be sent to the email address that the user has configured the system with, using the SMTP (email) server that the user has indicated. An optional image attachment can also be created that generates a small image of the floorplan display showing the tracked device that caused the alert to occur (if relevant).

Event Log Action

The Microsoft Windows Event Log is a standard component of all Microsoft Windows installations, and has a common API for accessing it. This Windows Event log actually consists of a number of default logs and one or more optional custom logs for use by specific applications. The system installation script creates a custom log for the sole use of this system. This custom log is also configured to be circular in nature, in that once it is full the oldest logged events may be removed in order to make room for new events.

The system may add Alerts to this custom log, using the textual description that accompanies the alert as the "custom data" element of a standard Windows Event log entry.

Syslog Server Action

The Syslog Event Action generates a standard TCP/IP Syslog packet as defined in RFC 3164 and RFC 5424 and sends it to the IP Address of the syslog server that the user has configured. A syslog packet essentially consists of a text based payload. This payload has been standardized by the system to use a tag/data format. The textual description that accompanies the system alert is deconstructed into a group of standardized tags and associated data elements, as shown below.

All syslog messages follow the same format. They are separated by the '|' character. The basic format of a syslog message is shown below.

Syslog version number|Company Name|Application Name|Application Version Number|Event ID|Event Name|Severity|Event Message

TABLE 10

Syslog Payload Message Sections

| Data Field Name | Data Type | Definition |
| --- | --- | --- |
| Syslog version number | String | This may define what message format we are sending out. At this current time, we have one format defined with a CEF:0 |
| Company Name | String | Name of the company sending this syslog message |
| Application Name | String | Name of the application sending this syslog message |
| Application Version Number | String | Application version number |
| Event ID | Number | Application defined Event ID. Please see Appendix A for complete list of events |
| Event Name | String | Application defined Event Name. Please see Appendix A for complete list of events |
| Severity | Number | Severity of the event. 1-5 is the scale where 1 is the lowest severity and 5 is the highest |
| Event Message | String | The important data for the event. This may be discussed later in this document |

An example of a syslog message that is sent from WiVision Enterprise would look like the following:

CEF:0|AirPatrol Corp|AirPatrol WLS|1.0.2|1808|Rogue Client Detected|4|msg=First detected, not yet positioned cat=1808 smac=00:19:D2:5 B:A1:B2 cs3Label=Site cs3=AirPatrol cs4Label=Building cs4=baxter cs5Label=Floor cs5=$2^{nd}$ cs6Label=StrongestSensorMAC cs6=000818553322

Event Message Data Field Definition

The Event Message data field may hold wireless settings and location information. Depending on the type of event, the contents of the Event Message field may differ. All event messages may begin with a "msg=" prefix. All data may have a predefined prefix within the payload to clarify the type of data being sent.

Event Message Definition

Msg=Event Description cat=Event ID [src=IP Address] [smac=MAC Address] [cs1Label=SSID cs1=SSID Name] [cs2Label=BSSID cs2=BSSID MAC] [cn1Label=Channel cn1=Channel Number] [cn2Label=Security cn2=Type of Security] [cs3Label=Site cs3=Site Name cs4Label=Building cs4=Building Name cs5Label=Floor cs5=Floor Name] [cs6Label=StrongestSensorMAC cs6=Strongest Seeing Sensor MAC Address]

All items enclosed with [ ] are optional values in the payload. Depending on the type of event, some of these optional items may not apply.

An example of an event message:

msg=First detected, not yet positioned cat=1808 smac=00:19:D2:5 B:A1:B2 cs3Label=Site cs3=University Campus cs4Label=Building cs4=Lennox Building cs5Label=Floor cs5=$2^{nd}$ cs6Label=StrongestSensorMAC cs6=000818553322

TABLE 3

Syslog Payload Tag/Data Types

| Event Message Element | Description |
| --- | --- |
| Event Description | This is a predefined message associated with an event. Please see Appendix A for complete list of events and their descriptions. |
| cat=Event ID | This is a predefined ID associated with an event. Please see Appendix A for complete list of events and their descriptions. |
| src=IP Address | The IP Address from where the event originated from. If an IP Address is undefined, an "unknown" value is passed. This is an optional field. |
| smac=MAC Address | MAC Address of the item being reported on. The format of the MAC Address is 00:00:00:00:00:00. This is an optional field. |
| cs1Label=SSID cs1=SSID Name | The "cs1Label=SSID" is a fixed label for the field. The SSID Name may be attached to the cs1 field. This is an optional field. |
| cs2Label=BSSID cs2=BSSID MAC | The "cs2Label=BSSID" is a fixed label for the field. The BSSID MAC may be attached to the cs2 field. The format of the BSSID MAC is 000000000000. This is an optional field. |
| cn1Label=Channel cn1=Channel Number | The "cn1Label=Channel" is a fixed label for the field. The non-negative Channel Number may be attached to the cn1 field. This is an optional field. |
| cn2Label=Security cn2=Type of Security | The "cn2Label=Security" is a fixed label for the field. The non-negative Type of Security number may be attached to the cn2 field. 0 may indicate no security on this device. A value of 1 may indicate there is security used on this device. This is an optional field. |
| cs3Label=Site cs3=Site Name | The "cs3Label=Site" is a fixed label for the field. The Site Name may be attached to the cs3 field. This is an optional field. |
| cs4Label=Building cs4=Building Name | The "cs4Label=Building" is a fixed label for the field. The Building Name may be attached to the cs4 field. This is an optional field. |
| cs5Label=Floor cs5=Floor Name | The "cs5Label=Floor" is a fixed label for the field. The Floor Name may be attached to the cs5 field. This is an optional field. |

TABLE 3-continued

Syslog Payload Tag/Data Types

| Event Message Element | Description |
|---|---|
| cs6Label=StrongestSensorMAC<br>cs6=Strongest Seeing Sensor MAC Address | The "cs6Label= StrongestSensorMAC" is a fixed label for the field. The Strongest Seeing Sensor MAC Address may be attached to the cs6 field. This is an optional field. |

Examples of Syslog Messages

This section shows some of the typical syslog events being sent to the user.

Example 1

AirPatrol WLS Startup

CEF:0|AirPatrol Corp|AirPatrol WLS|1.0.2|256|Application Events|1|msg=AirPatrol WLS started up, Application Startup cat=256

Example 2

Wireless Rogue Client being detected by AirPatrol WLS

CEF:0|AirPatrol Corp\AirPatrol WLS|1.0.2|1808|Rogue Client Detected|4|msg=First detected, not yet positioned cat=1808 smac=00:19:D2:5 B:A1:B2 cs3Label=Site cs3=University Campus cs4Label=Building cs4=Lennox cs5Label=Floor cs5=$2^{nd}$ cs6Label=StrongestSensorMAC cs6=000818553322

Example 3

Rogue Access Point being detected by AirPatrol WLS

CEF:0|AirPatrol Corp|AirPatrol WLS|1.0.2|1536|Rogue AP Detected|4|msg=First detected, not yet positioned cat=1536 src=unknown smac=00:13:10:2 D:B2:2C cs1Label=SSID cs1=SSGTestNet cs2Label=BSSID cs2=0013102 DB22C cn1Label=Channel cn1=6 cn2Label=Security cn2=1 cs3Label=Site cs3=University Campus cs4Label=Building cs4=Lennox cs5Label=Floor cs5=$2^{nd}$ cs6Label=StrongestSensorMAC cs6=000818553322
SNMP Trap Generation Event Action The system sends out standard TCP/IP SNMP v2c traps to the IP Address(s) that the user has configured. The system uses the AirPatrol Corporation's private enterprise OID (a standard element of all SNMP traps) which was given by the IANA (Internet Assigned Numbers Authority) of 25323.

The SNMP trap may contain the Alert's Event ID (described previously) as well as the textual description that has accompanied the alert.
Popup Warning Event Action Popup Warnings show as a time-stamped list in a separate window. The list shows the Alert Type as well as the textual description that has accompanied the alert.
Audio Alert Event Action Audio Alerts can be played when an alert fires. The sound that is played is configured by the user, and is any Microsoft Windows compatible sound file. It is expected that the sound file may be short in duration (typically one or two seconds long).

Reports

The system is capable of using the Microsoft Windows Event Log as a simplistic database. The user must have also pre-installed the optional Microsoft LogParser version 2.2 Windows add-on. This add-on is obtained from the Microsoft website.

Figure 41:
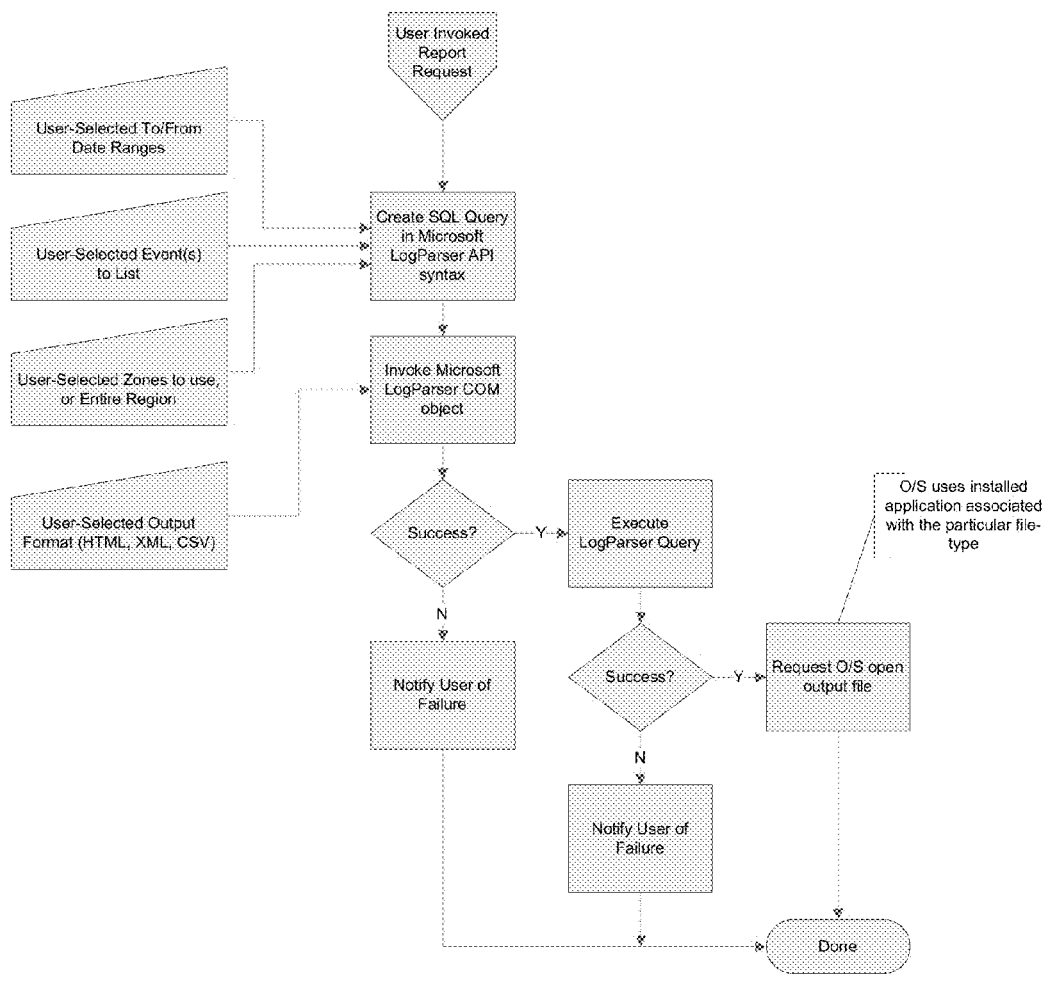
FIG. 41 is a flow chart showing a manual report generation system in accordance with one or more embodiments.
Figure 42:
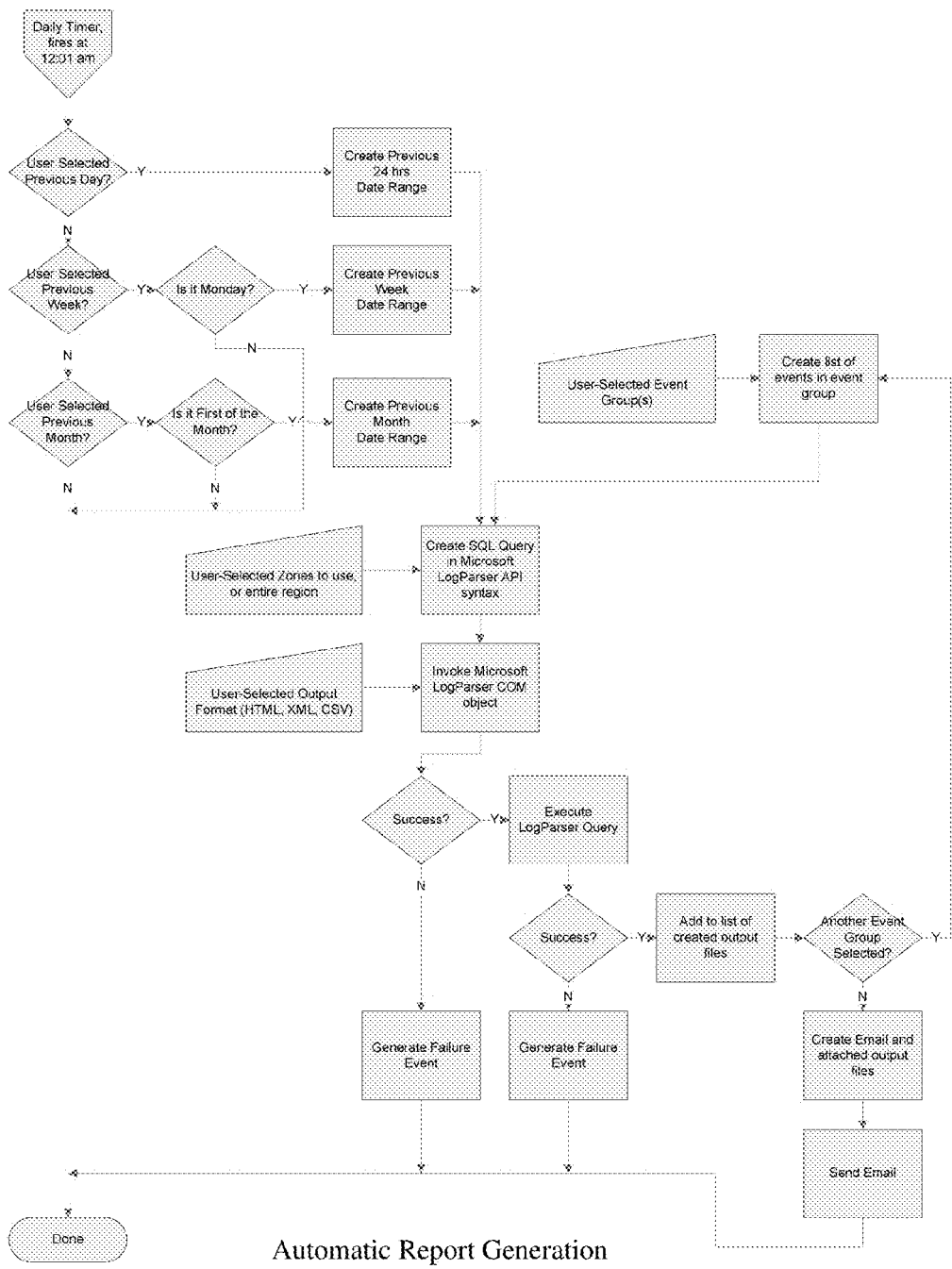
FIG. 42 is a flow chart showing an automatic report generation system in accordance with one or more embodiments.

LogParser allows the system to create and run queries on the Event Log, using an API that is very similar to an industry standard SQL type of interface. The query may specify the date range needed, one or more Alert Event IDs to look for, and any Alert Zones to restrict the query to.
Manual Reports Referring to FIG. 41, manual reports are generated at the user's request. The user manually enters the parameters that they wish to use to generate the report, and also selects one of three output formats: HTML (i.e. a webpage), XML (a standard web data exchange format), or CSV (a standard simple text file data exchange format). The manual report is then displayed using whatever Windows applications the user has installed and linked to the output format type (such as their default web browser if the HTML or XML format is used).
Automatic Reports Referring to FIG. 42, the user can optionally configure one or more automatic report to be generated and emailed to a list of email recipients. These reports can be configured to occur daily (at 12:01 am for the previous day), weekly (Monday at 12:01 am for the previous week), or monthly (at 12:01 am on the first of the month for the previous month). These may be the date ranges used for these queries. The user may have preconfigured one or more groups of Event IDs and Alert Zones that they wish to have the report generated for.

4.0 Productivity Monitoring Application

Figure 43:
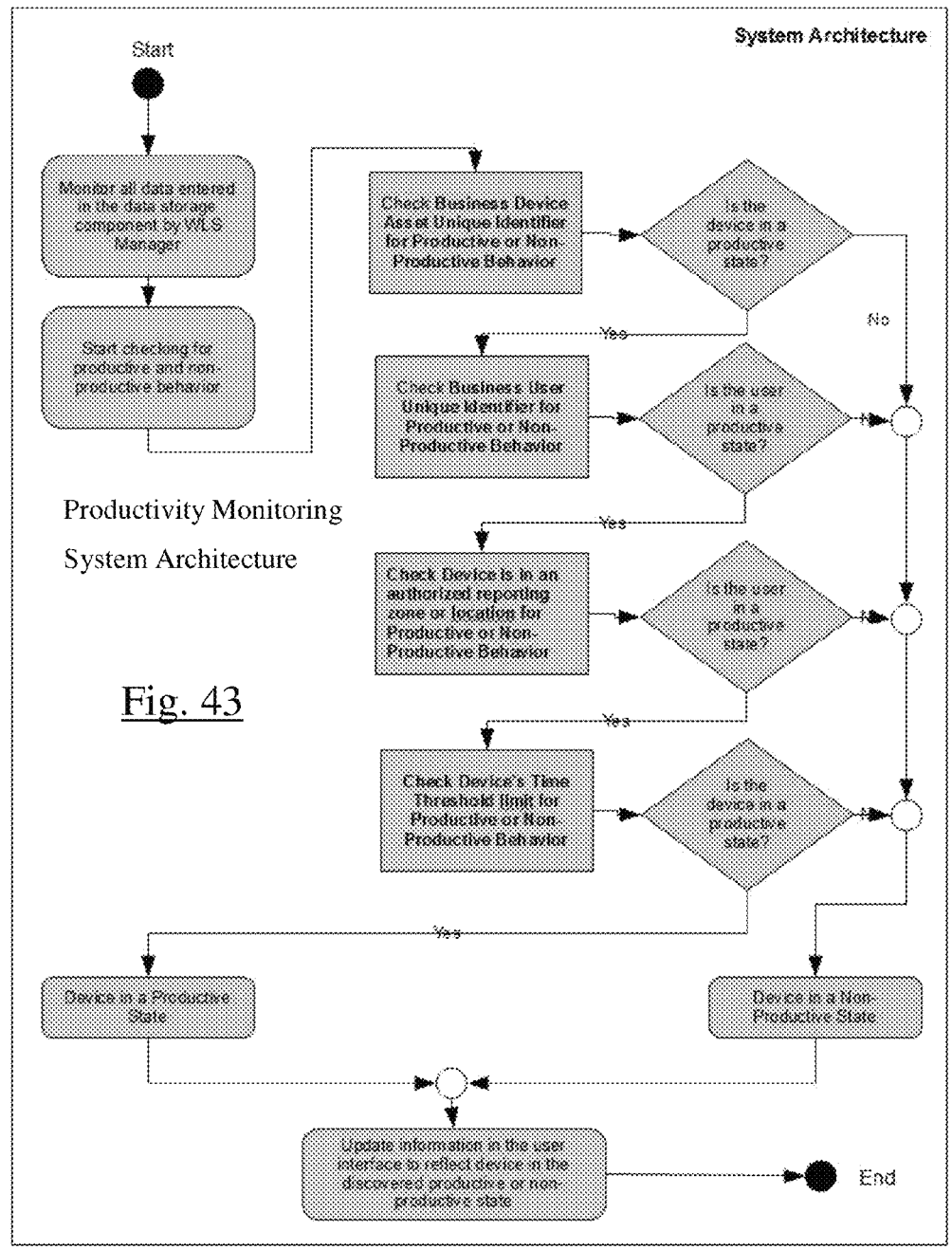
FIG. 43 is a flow chart showing a productivity monitoring system in accordance with one or more embodiments.

Referring to FIG. 43, with the increase usage and availability of the internet, mobile phones and laptops. Employers face an increasing problem of employees being unproductive in the workspace. Using company owned assets to conduct non work related activities is fast becoming a growing problem. The productivity monitoring application may allow the company's IT Administrator to view statistics and watch real time updates of usage of company assets in productive and unproductive manners. The administrator may be able to quantify and view detailed or summary reports in graphical or textual formats. User defined parameters may allow the administrative to specifically define what/where/when is an unproductive use of company resources. The product may include a mass data storage component, user defined controls to define productive/unproductive behavior, visual representation of the data to the user and reporting capabilities.
Data Storage Component To effectively store large datasets for future use. A data storage application may need to be used. This may allow the user to store year's worth of data that may be used for analysis.

Requirements

The data storage component should be capable of retrieving data through the use of queries or similar data retrieval techniques.

The component may need to be capable of storing over a year's worth of data. The data storage component may hold information regarding all device attributes, devices' location, and ability to store and archive all device data at a predefined snapshot interval.

Data Definition

To have an effective productivity monitoring solution, all critical data may need to be stored and accessed in a reliable data storage structure. This section outlines the data which needs to be stored and a description.

| Data Element | Description |
|---|---|
| Installation Configuration | The user may need to be able to store one or more installation(s) in the data storage component. An installation represents a distinct feed of data from a positioning engine to be stored. An installation may store a unique identifier, installation name, IP address of the positioning engine. |
| Sensors | The user may need to be able to store one or more sensor(s) in the data storage component. A sensor may need to store its physical location, location based on map coordinates, firmware version, physical radio capabilities, sensor uptime and last time sensor was online. |
| Site Information | Every installation may have one or more site(s) associated with it. The user may need to be able to store one or more site(s) in the data storage component. A site may include a user defined site name, buildings associated with the site. |
| Building Information | Every site may have one or more building(s) associated with it. The user may need to be able to store one or more building(s) in the data storage component. A building may include a user defined building name, floors associated with the building. |
| Floor Information | Every building may have one or more floor(s) associated with it. The user may need to be able to store one or more floor(s) in the data storage component. A floor may include a user defined floor name and the floor plan image in electronic format which may be entirely stored in the data storage component. |
| Discovered Devices | The user may store all devices that have been detected by the sensors. The type of discovered devices may depend on the sensor's detecting capabilities. Attributes which may be stored are the device's unique identifier (i.e. MAC Address), device name, device type, location based on map coordinates calculated by the positioning engine, frequency it was detected on, first discovered timestamp, last discovered online and an identifier to associate a device to one or more floor(s) from one or more building(s) in one or more site(s). |
| History Archiving | The data storage may need to record and store snapshots of data for future playback and/or reporting. The snapshots may include all discovered devices, timestamp when snapshot was taken, and the association between a device and floor it was discovered on. |
| Productivity Monitoring Parameters | The data storage may need to store all user defined parameters for determining productive and non-productive behavior. These may include the time threshold, location of the device, Business Device Asset Unique Identifier and Business User Unique Identifier |

-continued

| Data Element | Description |
|---|---|
| Login User Information | The productivity monitoring application may need to store all the user credential information for all users that may be allowed access to the application. Attributes may include username, password, lastlogintime, user status. |

Definition of Productive Usage versus Non-Productive Usage
System Architecture

There are a number of different conditions which each device must pass before we can deem it to be a productive part of the company or non-productive. The productivity monitoring solution may use all the data in the data storage component. This data may be inserted into the data storage component by the WLS Manager system.

Each device may go through four major conditions:
1. Check to see if the device being used is flagged as company owned asset
2. Check to see if the user logged into the machine is working for the company and also a check to see if the user is allowed on the machine the user is logged into
3. Check to see if the user is allowed in a certain region of the company with the use of administrator defined reporting zones
4. Check to see if the user is using a device for longer than an administrator defined time threshold Once the device goes through the four conditions, it may be flagged as either productive or non-productive based on the rules defined for each condition. This new information may be sent to the user interface in a number of different formats and views to help the administrator view, analyze and act upon the data displayed. This information can be shown in a dashboard interface, reports, charts and/or a real time location positioning map.

User Defined Parameters

Figure 44:
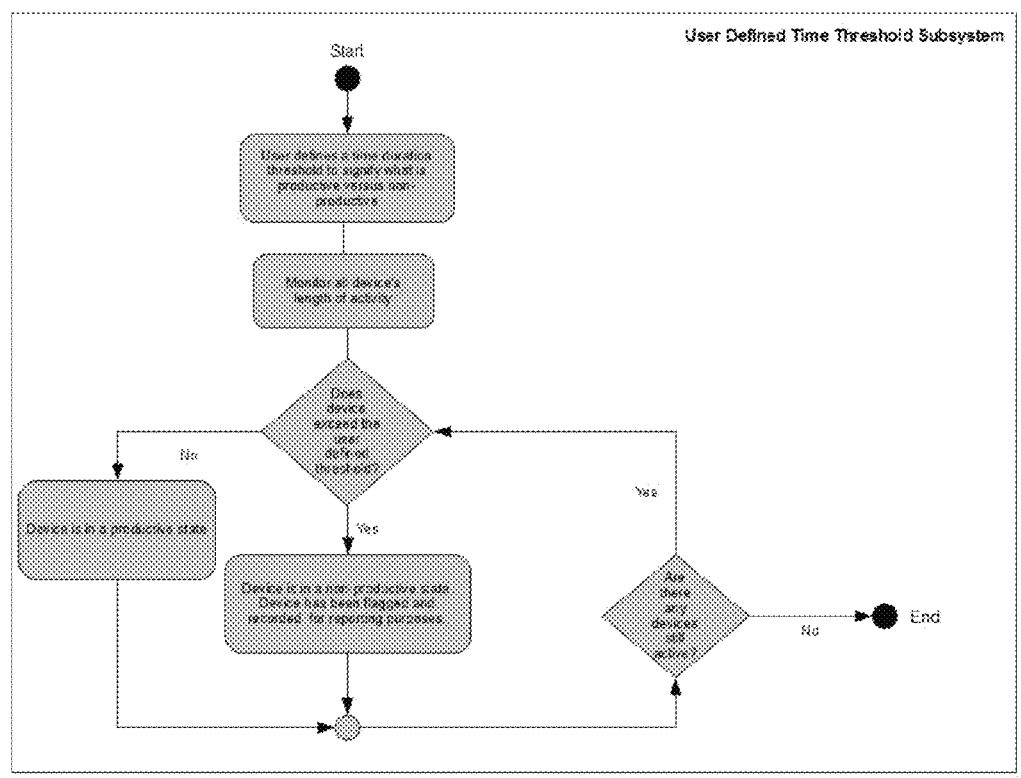
FIG. 44 is a flow chart showing a user-defined time threshold system in accordance with one or more embodiments.

Referring to FIG. 44, the user can define and configure parameters to determine what is a productive use as opposed to a non-productive use. The user can configure productive usage based on time duration, location, device unique identifier and/or business user using the device. All these parameters can be individually configured and used in conjunction with one another. It is up to the user as to what the definition of non-productive is.

Time Threshold

If a device exceeds a user defined time threshold, the device can be deemed non-productive. Devices exhibiting extended periods of constant activity can be viewed as non-productive. The threshold is exposed in the user interface with a unit of time in seconds. By default, the time duration value is 30 seconds. Once the threshold has been met, the device may be tagged and logged as unproductive.

This device may be used for reporting purposes using a variety of device information including the total length of time a device was in-use, what type of device it was, unique device identifiers, device's location, and device specific radio information.

Location

Figure 45:
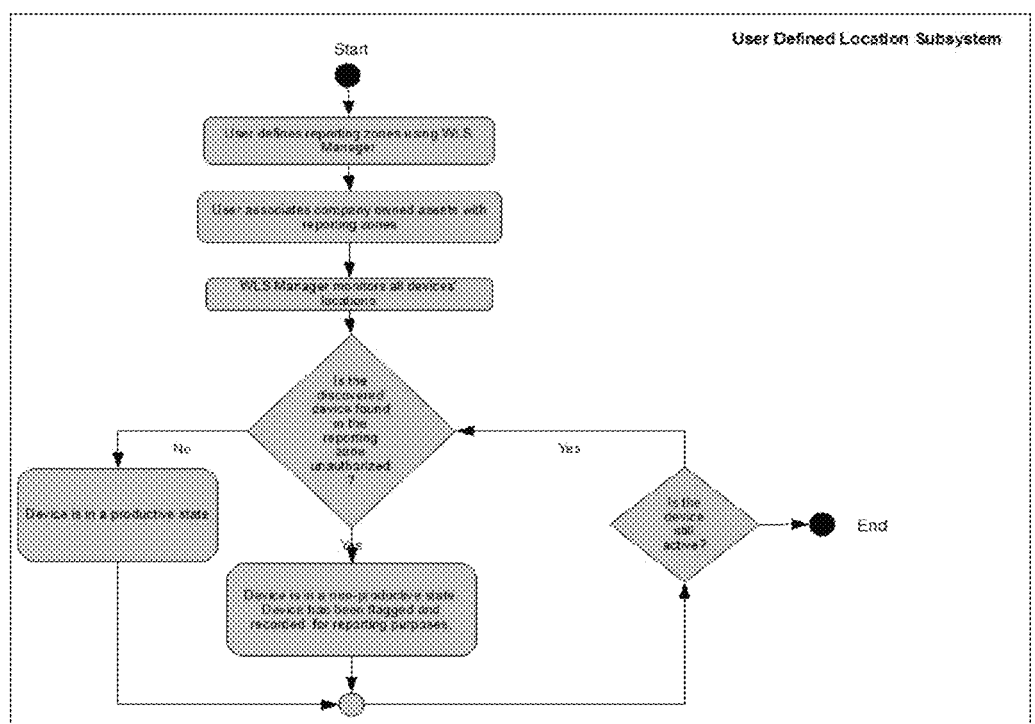
FIG. 45 is a flow chart showing a user-defined location system in accordance with one or more embodiments.

Referring to FIG. 45, in certain physical locations for a device, WLS Manager can determine if a certain device is being used in a productive or non-productive manner. The administrator can associate certain devices for use in specific regions of a site(s). Any device(s) which have not been allowed for use in a productive monitoring zone may be viewed as a non-productive device in the zone. Devices which have been allowed in a zone(s) may still be subject to monitoring based on the other configurable parameters such as time duration and the user logged into the device.

Using the WLS Manager, the administrator can define a number of productive monitoring zones to monitor device usage. Based on unique identifiers like a device's MAC Address, these devices can be configured to be allowed in one or more productive monitoring zones. Once the zone(s) have been setup, WLS Manager's positioning engine may determine the location of all devices in a specified area.

To define a productive monitoring zone, the administrator may bring up the WLS Manager floorplan and draw a multi-edged geometric shape to enclose a space on the map. Once this closed geometric shape is drawn, any device that is enclosed in the shape may be subject to being reported on for productive/non-productive usage.

This device may be used for reporting purposes using a variety of device information including the total length of time a device was in-use, what type of device it was, unique device identifiers, device's location, and device specific radio information.

Business Device Asset Unique Identifier

Figure 46:
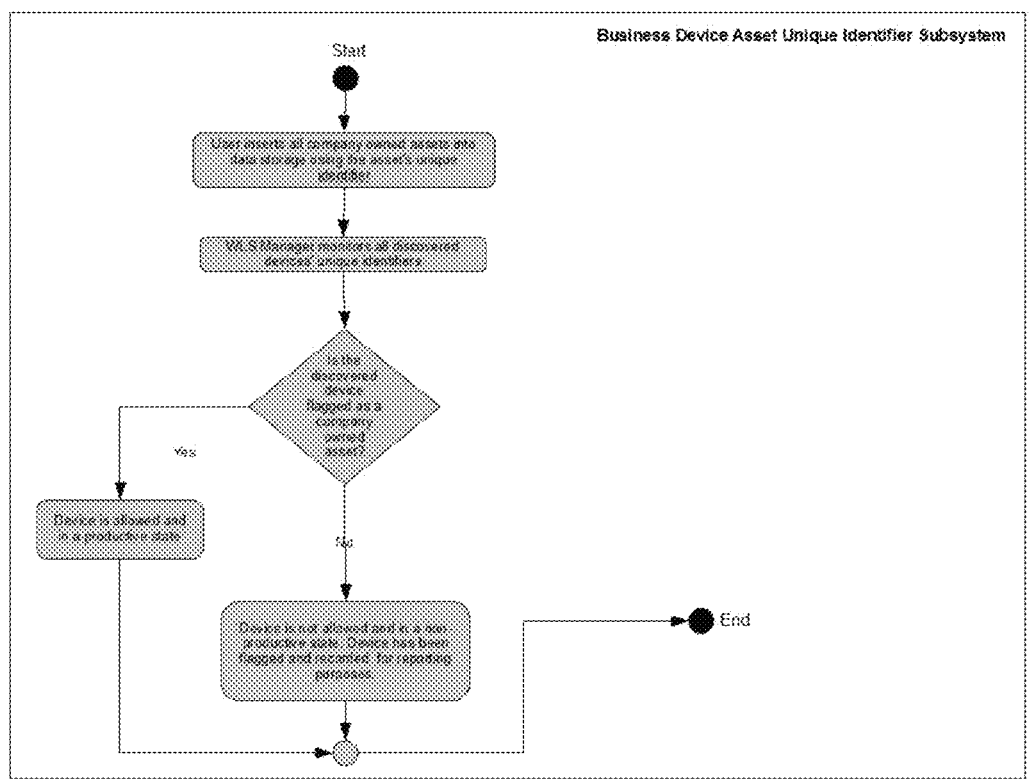
FIG. 46 is a flow chart showing a business device asset unique identifier system in accordance with one or more embodiments.

Referring to FIG. 46, the administrator has the ability to identify a device based on a unique identifier located within the device. The identifier can be a MAC Address, serial number or a combination of different hardware IDs.

Using the identifier, the administrator can distinguish between a company owned device and an unauthorized device. Any device that has not been flagged as company owned may be subject to being reported on. Devices which have been flagged as company owned may still be subject to monitoring based on the other configurable parameters such as time duration and the user logged into the device.

This device may be used for reporting purposes using a variety of device information including the total length of time a device was in-use, what type of device it was, unique device identifiers, device's location, and device specific radio information.

Business User Unique Identifier

Figure 47:
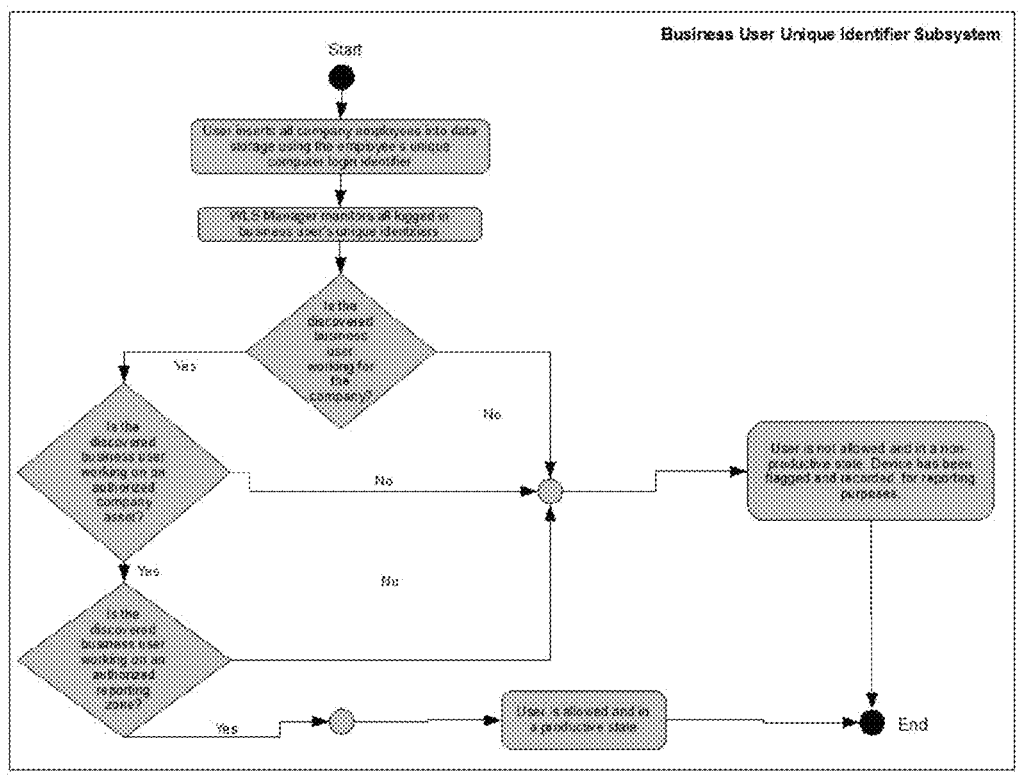
FIG. 47 is a flow chart showing a business user unique identifier system in accordance with one or more embodiments.

Referring to FIG. 47, with the use of an agent installed on a company owned device, the user of the device can be retrieved and sent back to productivity monitoring product. This may allow the productivity monitoring product to determine if the user logged into the company owned device is a valid user.

When the productivity monitoring software receives the user information, it may verify that the user exists by checking against the company's authentication server like Active Directory, radius server, etc. If the user does not exist, the device the user is using may be flagged as non-productive. Any device that does not have the agent installed may be treated as non-productive.

This parameter can be used for a number of different purposes. Using this identifier to make associations and white lists to determine productive and non-productive behavior.

Associations:
  The administrator can bind a user to a machine to make sure only valid users are using a particular machine. If a user is found on an unauthorized machine, this may trigger the device to be non-productive.
  The administrator can create lists of valid users for different reporting zone(s). If a user is found in an unauthorized zone, this may trigger the device to be non-productive.

Visual Representation of the Data

All productivity monitoring data needs to be presented in a format which is simple for the user to interpret. There needs to be a systematic approach to delivering the information. A drill down reporting technique may be used to give the user a summarized graphical report outlining events that have happened. If the user would like to see more information about a particular part of the summarized report, the user may be able to click on a portion of the report to obtain more information. The new information can be shown in a more detailed graph or a textual report. The drill down model of reporting may have one or more levels where the user can click on the report to see more detailed information.

There are a number of ways to display the reports to the users. Use of a application dashboard, on-demand and scheduled reporting, and advanced data mining techniques.

Dashboard

Referring to FIG. 48, the easiest way for a user to get an understanding and status for everything that is happening in the productivity monitoring application is to use a dashboard. An application dashboard may provide the user with a graphical view of one or more distinct user defined items.

When the user logs into the productivity monitoring application, the user may be taken to a screen where the user can add one or more boxes. Each of these boxes represents one view of the information stored in the data storage component. The user can choose to display preset views of the data or they can define views by submitting a query and defining the type of report output.

All views may require the query to be a product of the length of time. The user can amalgamate and show data for minute(s), hour(s), day(s), week(s), month(s) and year(s).

The user may be able to define real time views to monitor the latest productivity activity data that is stored in the data storage component. These real time views can be basic violation counts of non-productive behavior in a given reporting zone to a graphical pie chart illustrating non-productive behavior in all reporting zones.

The user can build views to follow trends over a longer period of time. These trends are typically followed over the course of a long period of time. For example, a user can define a view to find the total time duration where non-productive usage of company owned assets were happening in a user defined reporting zone. This view can start any time in the past and trend its way to the current time. As new data comes into the data storage component, it may be amalgamated into the view.

A sliding window view can also be used to define trends over a certain period of time. The user can define a view to follow the trend of non-productive usage over a period of time. The sliding window may constantly move in a FIFO motion by adding the latest data and removing the oldest data.

In the dashboard, the user can add or remove boxes on the screen. Each user may have control of their own dashboard based on the user account they logged in as.

Reports

The user may be able to generate reports on productive and non-productive behavior in a company's facilities. The reports can be graphical, tabular or a combination of the two. A report screen may be developed where a user can choose from a list of predefined reports or have the ability to choose from a list of options to customize the reports. The user can generate a report on-demand or schedule a time when it should be generated. The output of the reports can be chosen by the user from the list in FIG. 702.

On-Demand

A user logged into the productivity monitoring application may be able to generate reports on the fly. The user can choose from predefined reports and customized reports. These reports can be ran for a user specified date range.

Scheduled

A user can schedule reports to be generated on a one time or recurring basis. These reports can be sent to a specific user by email or uploaded to a specific location on the network or the internet in a specified file format. The user can specify a specific list of days, choose it to be generated daily, weekly, monthly or yearly. Every report (predefined or custom) can have different report generation schedules.

Data Mining

For advanced users, there is the ability to connect to the data storage component to run AdHoc queries for further data analysis. The user may be given restricted access to the data storage component using lesser user level privileges. These reports can be generated using a third party reporting tool.

5.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 49:
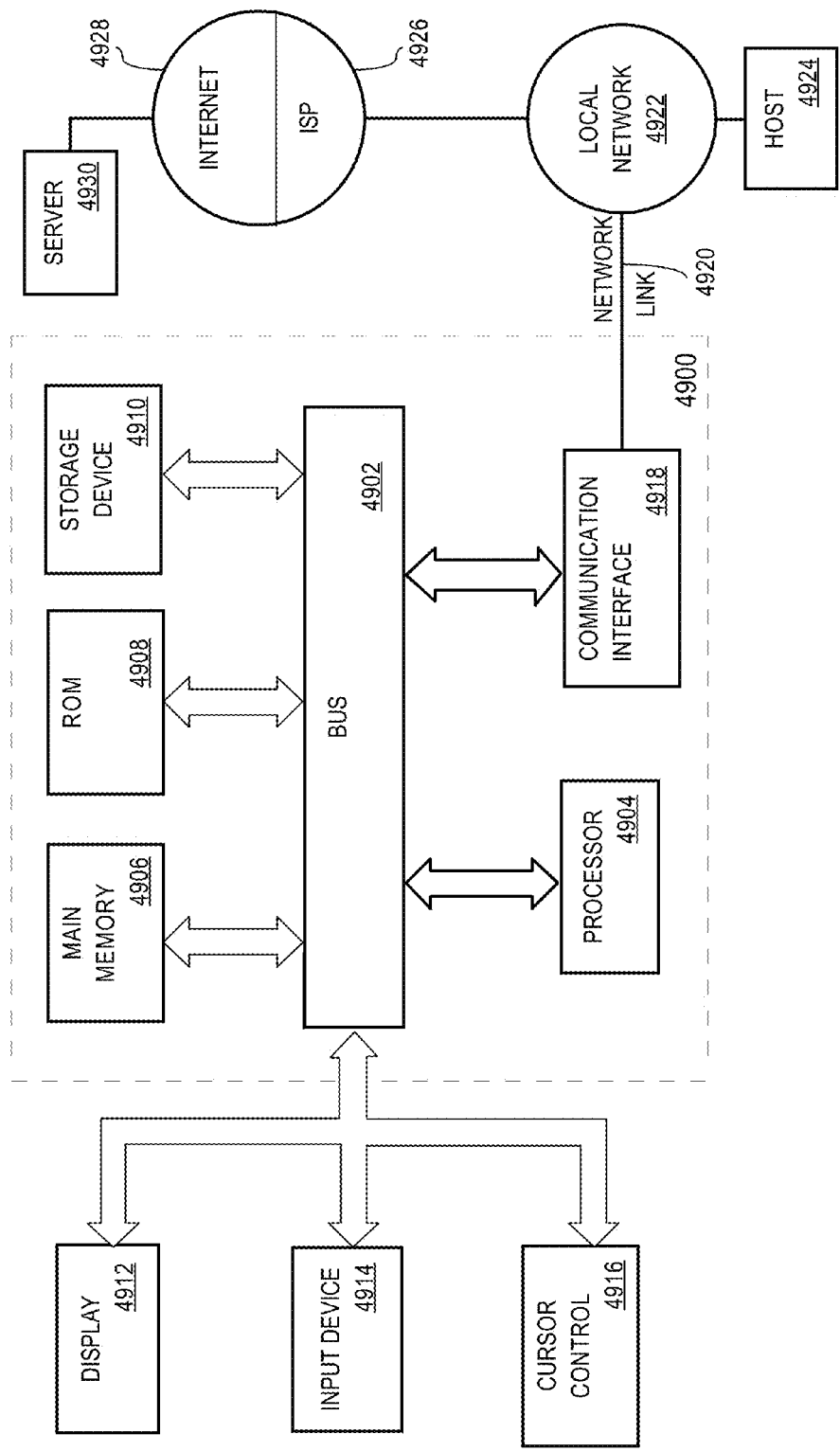
FIG. 49 shows a block diagram that illustrates a system upon which an embodiment of the invention may be implemented.

For example, FIG. 49 is a block diagram that illustrates a computer system 4900 upon which an embodiment of the invention may be implemented. Computer system 4900 includes a bus 4902 or other communication mechanism for communicating information, and a hardware processor 4904 coupled with bus 4902 for processing information. Hardware processor 4904 may be, for example, a general purpose microprocessor.

Computer system 4900 also includes a main memory 4906, such as a random access memory (RAM) or other dynamic storage device, coupled to bus 4902 for storing information and instructions to be executed by processor 4904. Main memory 4906 also may be used for storing temporary variables or other intermediate information during execution of instructions to be executed by processor 4904. Such instructions, when stored in storage media accessible to processor 4904, render computer system 4900 into a special-purpose machine that is customized to perform the operations specified in the instructions.

Computer system 4900 further includes a read only memory (ROM) 4908 or other static storage device coupled to bus 4902 for storing static information and instructions for processor 4904. A storage device 4910, such as a magnetic disk or optical disk, is provided and coupled to bus 4902 for storing information and instructions.

Computer system 4900 may be coupled via bus 4902 to a display 4912, such as a cathode ray tube (CRT), for displaying information to a computer user. An input device 4914, including alphanumeric and other keys, is coupled to bus 4902 for communicating information and command selections to processor 4904. Another type of user input device is cursor control 4916, such as a mouse, a trackball, or cursor direction keys for communicating direction information and command selections to processor 4904 and for controlling cursor movement on display 4912. This input device typically has two degrees of freedom in two axes, a first axis (e.g., x) and a second axis (e.g., y), that allows the device to specify positions in a plane.

Computer system 4900 may implement the techniques described herein using customized hard-wired logic, one or more ASICs or FPGAs, firmware and/or program logic which in combination with the computer system causes or programs computer system 4900 to be a special-purpose machine. According to one embodiment, the techniques herein are performed by computer system 4900 in response to processor 4904 executing one or more sequences of one or more instructions contained in main memory 4906. Such instructions may be read into main memory 4906 from another storage medium, such as storage device 4910. Execution of the sequences of instructions contained in main memory 4906 causes processor 4904 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 4910. Volatile media includes dynamic memory, such as main memory 4906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 4902. Transmission media can also take the form of acoustic or light waves, such as those generated during radio-wave and infra-red data communications.

Various forms of media may be involved in carrying one or more sequences of one or more instructions to processor 4904 for execution. For example, the instructions may initially be carried on a magnetic disk or solid state drive of a remote computer. The remote computer can load the instructions into its dynamic memory and send the instructions over a telephone line using a modem. A modem local to computer system 4900 can receive the data on the telephone line and use an infra-red transmitter to convert the data to an infra-red signal. An infra-red detector can receive the data carried in the infra-red signal and appropriate circuitry can place the data on bus 4902. Bus 4902 carries the data to main memory 4906, from which processor 4904 retrieves and executes the instructions. The instructions received by main memory 4906 may optionally be stored on storage device 4910 either before or after execution by processor 4904.

Computer system 4900 also includes a communication interface 4918 coupled to bus 4902. Communication interface 4918 provides a two-way data communication coupling to a network link 4920 that is connected to a local network 4922. For example, communication interface 4918 may be an integrated services digital network (ISDN) card, cable modem, satellite modem, or a modem to provide a data communication connection to a corresponding type of telephone line. As another example, communication interface 4918 may be a local area network (LAN) card to provide a data communication connection to a compatible LAN. Wireless links may also be implemented. In any such implementation, communication interface 4918 sends and receives electrical, electromagnetic or optical signals that carry digital data streams representing various types of information.

Network link 4920 typically provides data communication through one or more networks to other data devices. For example, network link 4920 may provide a connection through local network 4922 to a host computer 4924 or to data equipment operated by an Internet Service Provider (ISP) 4926. ISP 4926 in turn provides data communication services through the world wide packet data communication network now commonly referred to as the "Internet" 4928. Local network 4922 and Internet 4928 both use electrical, electromagnetic or optical signals that carry digital data streams. The signals through the various networks and the signals on network link 4920 and through communication interface 4918, which carry the digital data to and from computer system 4900, are example forms of transmission media.

Computer system 4900 can send messages and receive data, including program code, through the network(s), network link 4920 and communication interface 4918. In the Internet example, a server 4930 might transmit a requested code for an application program through Internet 4928, ISP 4926, local network 4922 and communication interface 4918. The received code may be executed by processor 4904 as it is received, and/or stored in storage device 4910, or other nonvolatile storage for later execution.

6.0 Equivalents, Extensions, Alternatives and Miscellaneous

In the foregoing specification, possible embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
providing a wireless communications sensor system that includes multiple individual RF sensors disposed at different physical locations at a site;
using each individual RF sensor to individually detect one or more RF energy bursts produced by one or more wireless devices;
using each individual RF sensor to identify burst data, which includes time of reception, frequency and signal strength information, for each of one or more RF energy bursts detected by the individual RF sensor;
for each individual RF sensor, producing one or more tracked events stored in a computer readable storage device, wherein each tracked event includes burst data identified using the individual RF sensor;
wherein for each individual RF sensor, producing one or more tracked events includes, comparing burst data identified by the individual RF sensor for different RF energy bursts detected by the individual RF sensor, and including within the same tracked event burst data for different RF energy bursts that include time of reception information that fall within a configurable time difference threshold and that include frequency information that fall within a configurable frequency difference threshold;
producing individual call-in progress events that are stored in a computer readable storage device and that correspond to individual calls-in progress by one or more wireless devices;
wherein individual call-in progress events include burst data information from multiple tracked events;
wherein producing the individual call-in progress events includes, comparing different burst data included within tracked events produced for different RF sensors, and including different burst data information from tracked events produced for different RF sensors within the same call-in progress event in response to a determination that the different burst data within tracked events produced for different RF sensors have frequencies that fall within a configurable frequency difference threshold and have times of reception that fall within a configurable time difference threshold;
for each of multiple call-in progress events, using different signal strength information, that is included in the call-in progress event from different tracked events produced for different RF sensors, to determine a position of a wireless device that corresponds to the event;
determining, for each of multiple call-in progress events, a unique identifier of a wireless device that corresponds to the call-in progress event;
providing a rules storage that provides one or more site location dependent wireless device usage rules that define one or more parameters to check to determine whether usage of an identified wireless device at the site meets the one or more wireless device usage conditions according to the one or more rules;
for each of multiple call-in progress events, using the wireless communications sensor system to check RF transmissions of a corresponding identified wireless device to determine values for the one or more of the parameters associated with the identified wireless device; and
using the one or more rules to determine whether the determined parameter values indicate that usage of the identified wireless device at the determined positions at the site meets the one or more device usage conditions.

2. The method of claim 1 further including:
using the wireless communications sensor system to determine use of the identified wireless devices at the site over a length of time; and
using the one or more rules to determine whether the determined use of the identified wireless devices meets the one or more device usage conditions over the length of time.

3. The method of claim 1,
wherein the one or more rules provide parameters to indicate device identity of one or more wireless devices; and
wherein using the wireless communications sensor system includes using the sensor system to determine device identity of the wireless device used at the site.

4. The method of claim 3 further including:
using the wireless communications sensor system to determine the unique identifier of the wireless device that corresponds to the call-in progress event at the site over a length of time; and
using the one or more rules to determine whether the wireless device having the determined device identity meets the one or more device usage conditions over the length of time.

5. The method of claim 1,
using a software agent running on the identified device determined to be in use determines a user of the wireless device used at the site;
wherein using the one or more rules includes using the one or more rules to determine whether the determined wireless device user meets the one or more device usage conditions.

6. The method of claim 5 further including:
using the wireless communications sensor system and the software agent running on the identified device determined to be in use to determine a user of the wireless device used at the site over a length of time; and
using the one or more rules to determine whether the determined user meets the one or more device usage conditions over the length of time.

7. A system comprising:
a wireless communications sensor system that includes,
multiple individual RF sensors disposed at different physical locations within a site to detect RF transmissions by one or more wireless devices within the site,
wherein individual sensors are configured to detect one or more RF energy bursts produced by one or more wireless devices, and for each burst, to identify burst data, which includes time of reception, frequency and signal strength information, for each of one or more RF energy bursts detected by the individual RF sensor, and
a central processing unit system that includes a processor and a non-transitory storage device and an interface circuit to provide communication with the RF sensors,
wherein the central processing unit system is configured to,
compare, for each individual RF sensor, burst data identified for different RF energy bursts detected by the individual RF sensor, and include in a respective tracked event, burst data for different RF energy bursts that include time of reception information that fall within a configurable time difference threshold and that include frequency information that fall within a configurable frequency difference threshold,
compare different burst data included within tracked events produced for multiple different RF sensors, and store in the storage device, different burst data information from tracked events produced for different RF sensors within a respective call-in progress event that corresponds to an individual call-in progress in response to a determination that the different burst data within tracked events produced for different RF sensors have frequencies that fall within a configurable frequency difference threshold and have times of reception that fall within a configurable time difference threshold;
compare different signal strength information, that is included in the call-in progress event from different tracked events produced for different RF sensors, to determine a position of a wireless device that corresponds to the event
determining, for each of multiple call-in progress events, a unique identifier of a wireless device that corresponds to the call-in progress event;
a non-transitory rules storage device that stores one or more site location dependent wireless device usage rules that define one or more parameters to check to determine whether usage of an identified wireless device at the site meets the one or more wireless device usage conditions according to the one or more rules;
wherein the central processing unit system is configured to,
check the RF transmissions of a corresponding identified wireless device to determine values for the one or more of the parameters associated with the identified wireless device, and
determine whether the determined parameter values indicate that usage of the identified wireless device usage at the determined positions at the site meets the one or more device usage conditions.

8. The system of claim 7,
wherein the wireless communications sensor system is configured to determine use of the identified wireless device at the at the site over a length of time; and
wherein the processing system is configured to use the one or more rules to determine whether the determined use of the identified wireless device meets the one or more device usage conditions.

9. The system of claim 7,
wherein the central processing unit system is configured to provide parameters to determine device identity of the wireless device used at the site; and
wherein the one or more rules indicate device identity parameters of one or more wireless devices.

10. The system of claim 9,
wherein the central processing unit system is configured to determine the unique identifier of the wireless device that corresponds to the call-in progress event used at the site over a length of time; and
wherein the central processing unit system is configured to use the one or more rules to determine whether the wireless device having the determined device identity meets the one or more device usage conditions over the length of time.

11. The system of claim 7,
wherein the central processing unit system is configured to determine location of use of the wireless device used at the site;
wherein the central processing unit system is configured to use the one or more rules to determine whether the determined location of use meets the one or more device usage conditions.

12. The system of claim 11,
wherein the central processing unit system is configured to determine location of use of the wireless device used at the site over a length of time; and
wherein the central processing unit system is configured to use the one or more rules to determine whether the determined location of use meets the one or more device usage conditions over the length of time.

13. The system of claim 7,
wherein a software agent running on the identified device determined to be in use determines a user of the wireless device used at the site;
wherein the central processing unit system is configured to use the one or more rules to determine whether the determined user meets the one or more device usage conditions.

14. The system of claim 13,
wherein the central processing unit system and the software agent running on the identified device determine a user of the wireless device used at the site over a length of time; and
wherein the central processing unit system is configured to use the one or more rules to determine whether the determined user meets the one or more device usage conditions over the length of time.

15. The method of claim 7,
wherein the central processing unit system is configured to determine a duration of usage of the wireless device used at the site;
wherein the central processing unit system is configured to use the one or more rules to determine whether the determined duration of usage meets the one or more device usage conditions.

16. The method of claim 7,
wherein the central processing unit system is configured to determine a duration of usage of the wireless device used at the site over a length of time; and
wherein the central processing unit system is configured to use the one or more rules to determine whether the determined duration of usage meets the one or more device usage conditions over the length of time.

* * * * *